(12) United States Patent
Kato et al.

(10) Patent No.: US 6,295,052 B1
(45) Date of Patent: Sep. 25, 2001

(54) SCREEN DISPLAY KEY INPUT UNIT

(75) Inventors: Yoshiya Kato; Syunji Kato, both of Hachiohji (JP)

(73) Assignee: Misawa Homes Co., Ltd., Tokyo (JP)

( * ) Notice: Subject to any disclaimer, the term of this patent is extended or adjusted under 35 U.S.C. 154(b) by 0 days.

(21) Appl. No.: 09/101,799

(22) PCT Filed: Feb. 18, 1997

(86) PCT No.: PCT/JP97/00425

§ 371 Date: Oct. 22, 1998

§ 102(e) Date: Oct. 22, 1998

(87) PCT Pub. No.: WO97/30386

PCT Pub. Date: Aug. 21, 1997

(30) Foreign Application Priority Data

Feb. 19, 1996 (JP) .................................................. 8-030930

(51) Int. Cl.$^7$ ...................................................... G09G 5/00
(52) U.S. Cl. .................... 345/179; 345/172; 345/168; 345/171; 345/173; 341/21; 341/22
(58) Field of Search ..................... 345/179, 173, 345/168, 171, 172, 339, 146, 169; 341/22, 21, 23

(56) References Cited

U.S. PATENT DOCUMENTS

| 4,531,119 | * | 7/1985 | Nakayama et al. ................... 340/712 |
| 5,457,454 | | 10/1995 | Jin . | |
| 5,717,425 | * | 2/1998 | Sasaki ................................. 345/157 |
| 5,812,117 | * | 9/1998 | Moon ................................... 345/169 |
| 5,874,948 | * | 2/1999 | Shieh ................................... 345/173 |
| 5,907,375 | * | 5/1999 | Nishikawa et al. ................... 349/12 |
| 5,956,021 | * | 9/1999 | Kubota et al. ....................... 345/179 |
| 6,005,549 | * | 12/1999 | Forest .................................. 345/157 |

FOREIGN PATENT DOCUMENTS

| 34 46 147 | 6/1986 | (DE) . |
| 0 603 669 | 6/1994 | (EP) . |
| 0 661 619 | 7/1995 | (EP) . |
| 0 670 554 | 9/1995 | (EP) . |
| 9-128134 | 5/1997 | (JP) . |
| 9-128148 | 5/1997 | (JP) . |

OTHER PUBLICATIONS

Patent Abstracts of Japan, vol. 014, No. 401 (E–0971), Aug. 30, 1990, & JP 02 151128 A (Hitachi Ltd.
Patent Abstracts of Japan, vol. 015, No. 068 (C–0807)), Feb. 18, 1991, & JP 02 293335 a. Asahi Optical Co. Ltd.
Patent Abstract of Japan vol. 018, No. 021 (P–1674), Jan. 13, 1994, & JP 05 257598 A. (Ricoh Co. Ltd, Oct. 08, 1993.

\* cited by examiner

*Primary Examiner*—Richard Hjerpe
*Assistant Examiner*—Jean Lesperance
(74) *Attorney, Agent, or Firm*—Oblon, Spivak, McClelland, Maier & Neustadt, P.C.

(57) ABSTRACT

A screen display key input unit. A screen display has a series of keys which can be operated by touching with a pen, a mouse or the like. Each of the keys are defined with first and second graphic character codes. A key input device points out a key display area on the screen while a selection processor selects one of the two graphic character codes on the key by determining the difference of key selection operations of the key input. The two graphic character codes are defined on each of the keys so that the number of keys shown on the screen is reduced as compared to conventional unit where each key is defined with a single graphic character code.

23 Claims, 47 Drawing Sheets

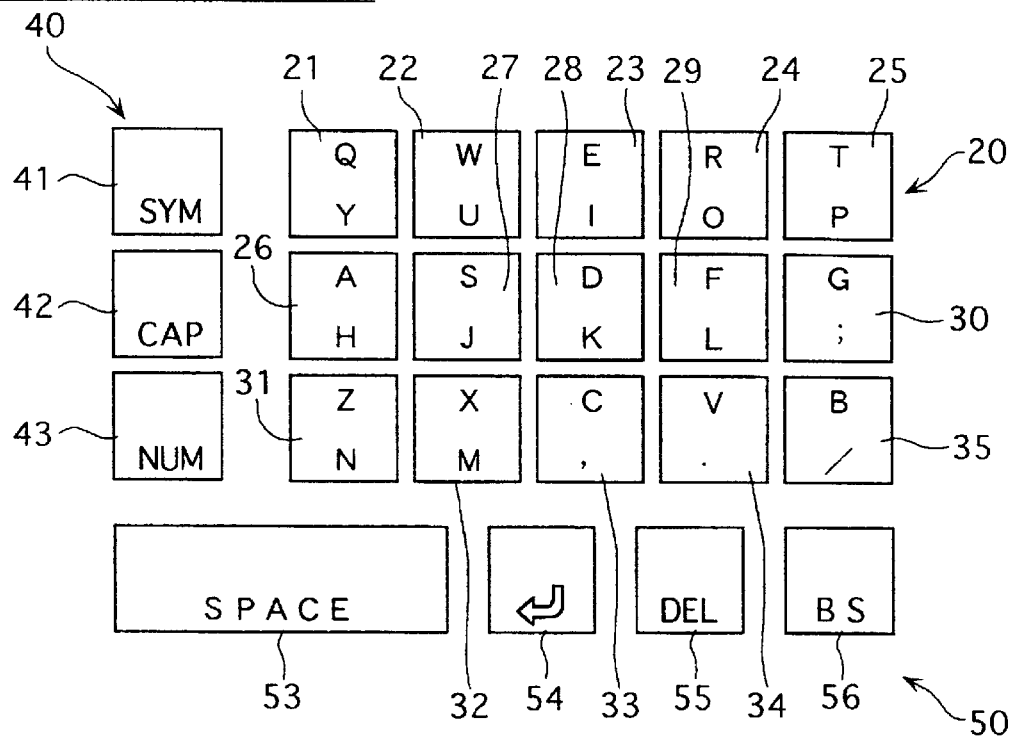
FIG. 29 QWERTY ENGLISH KEY ARRANGEMENT
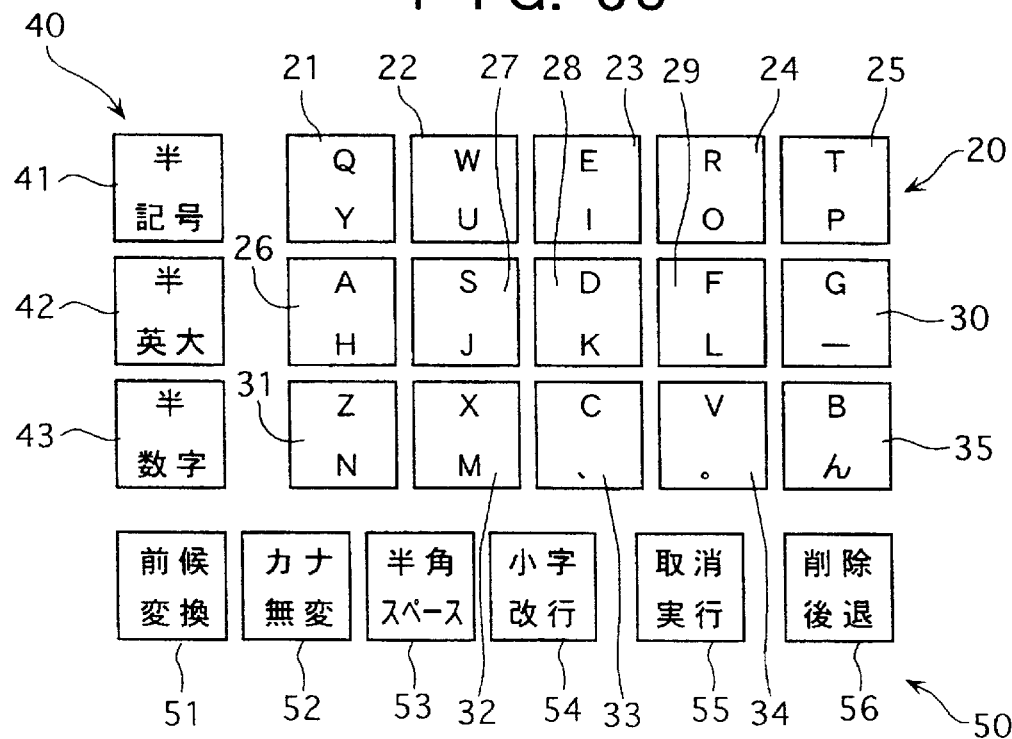
FIG. 30 JAPANESE KEY ARRANGEMENT

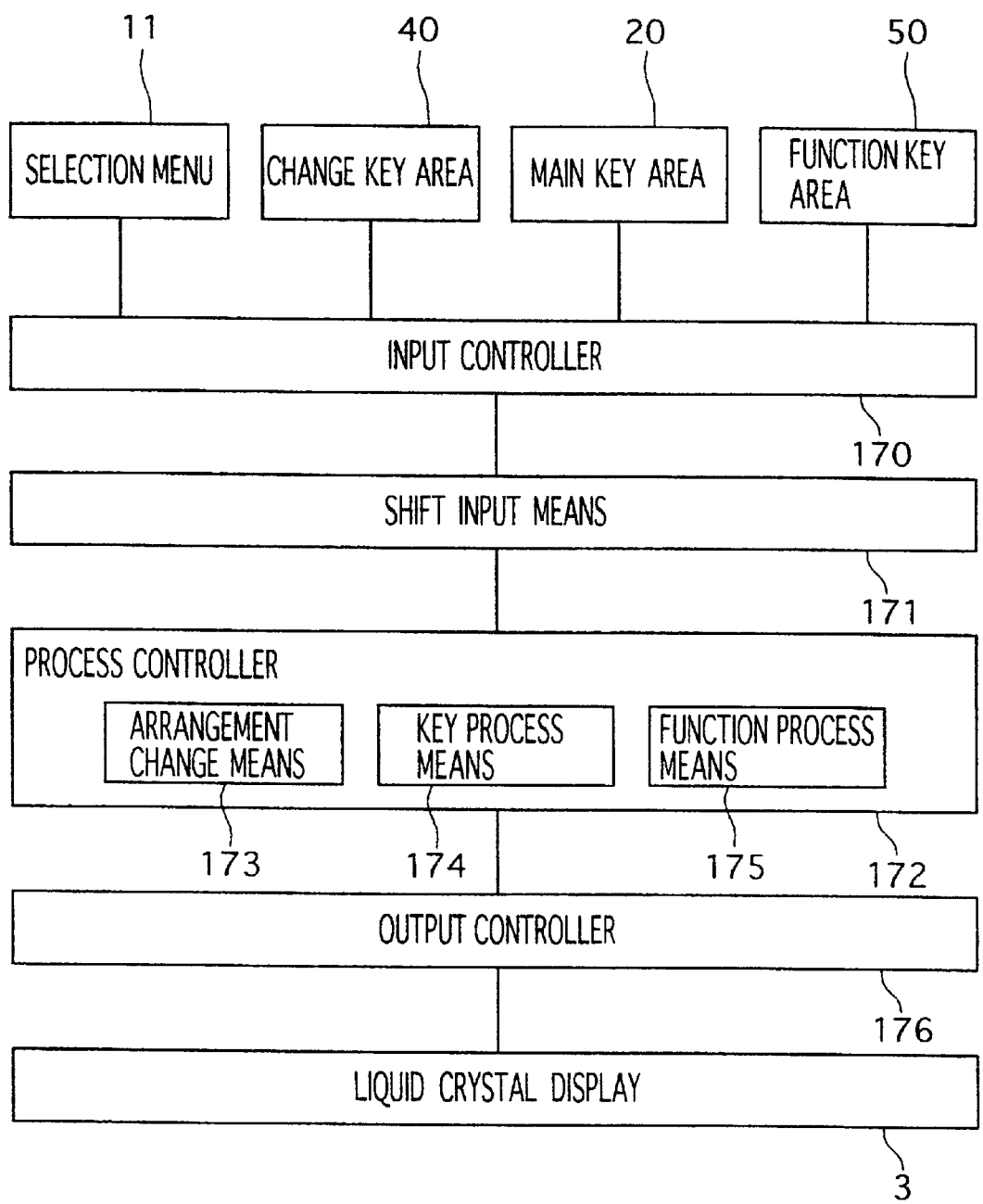

FIG. 41

| A | K | U |
|---|---|---|
| B | L | V |
| C | M | W |
| D | N | X |
| E | O | Y |
| F | P | Z |
| G | Q | 取消 |
| H | R | 実行 |
| I | S | モード |
| J | T | 空白 |

FIG. 42

| 1 | 2 | 3 | 4 | 5 | 6 | 7 | 8 | 9 | 0 |
|---|---|---|---|---|---|---|---|---|---|
| Q | W | E | R | T | Y | U | I | O | P |
| A | S | D | F | G | H | J | K | L | ; |
| Z | X | C | V | B | N | M | , | . | / |

INPUT BOARD FOR JAPANESE

HIGH-SPEED INPUT BOARD FOR JAPANESE

INPUT BOARD FOR ENGLISH

INPUT BOARD FOR DIGIT

INPUT BOARD FOR SYMBOL

ARRANGEMENT OF TELEPHONIC FUNCTION

FIG. 55

EXAMPLE OF QWERTY ARRANGEMENT

| 1 | 2 | 3 | 4 | 5 | 6 | 7 | 8 | 9 | 0 |
|---|---|---|---|---|---|---|---|---|---|

| Q | W | E | R | T | Y | U | I | O | P |
|---|---|---|---|---|---|---|---|---|---|
| A | S | D | F | G | H | J | K | L | ; |
| Z | X | C | V | B | N | M | , | . | - |

FIG. 56

EXAMPLE OF ARRANGEMENT FOR JAPANESE SYLLABARY

| わ | ら | や | ま | は | な | た | さ | か | あ |
|---|---|---|---|---|---|---|---|---|---|
| を | り | ゆ | み | ひ | に | ち | し | き | い |
| ん | る | よ | む | ふ | ぬ | つ | す | く | う |
| 、 | れ | ゛゜ | め | へ | ね | て | せ | け | え |
| 。 | ろ | ー | も | ほ | の | と | そ | こ | お |

SCREEN DISPLAY KEY INPUT UNIT

BACKGROUND OF THE INVENTION

1. Field of the Invention

This invention relates to an input unit available for a character input device and in an input technology and, more particularly, to a screen display key input unit for inputting characters and symbols indicated within key area displayed on a screen of an electric tool, for example electric notebook, small word processor or personal computer, by directly touching the keys with a pen or fingers, or by shifting a pointer on the screen with a mouse or a tablet.

2. Discussion of the Background

A personal computer, a word processor or the like is known well in the art as a general information processing unit and has been miniaturized wile keeping their high performance. A size of a computer has been shifted from a relatively large desk type general purpose computer to a laptop type small computer and further to a notebook type small-sized computer. But, such miniaturization recently makes no progress. Because, there is obviously a limit of miniaturization of keyboard when considering its handling.

Accordingly, it is remarkable for general companies which have utilized portable personal computers, electric notebooks, and portable remote terminals as their business portable tools to use a screen touch input system in which an input procedure is done by touching the screen with pen or fingers as hopeless.

Recently, as operating systems and software improved, a desktop computer and a note-size computer shift to utilize GUI (Graphic User Interface) in inputting operation without using a keyboard, wherein several icons displayed on a screen are selected by mouse.

But the present input system using a mouse and a pen on its screen is only appropriate for select inputting procedure of "MENU" and "COMMAND". They are not suitable to input characters when writing a composition.

A freehand input system as one of pen input system is convenient for persons that are hard to deal with keyboard. But, the freehand input system does not assure enough recognition rate and needs much time for converting characters into Kanji-character, Katakana-character, Hiragana-character and the like. The character conversion in freehand input system is carried out stepwise though "freehand input"→"recognition"→"conversion".

There is also known so-called "character input board" in which keys are arranged(displayed) on a screen (Soft Key) just like a general keyboard (Hard Key) so that the displayed respective keys are selected and inputted by an electric pen and a mouse.

These soft keys on the character input board are nothing but hard keys shown on a screen and are condensed within a narrow screen, which leads an operator into a bad operational environment.

One of the popular conventional character input board is so-called "QWERTY" keyboard as shown in FIG. 55 or "Japanese syllabary" keyboard to smoothly input Japanese characters as shown in FIG. 56. Both of keyboards are organized with 10 files, a moving area for pen and mouse is relatively large and size of each soft key is so small that the operator does not comfortably operate the keyboards.

SUMMARY OF THE INVENTION

It is an object of the present invention to provide a screen display key input unit for inputting keys displayed on a screen by using pen, mouse or the like, so that the number of keys is decreased and the operability for operators can be improved.

The present invention, which relates to a screen display key input unit for selecting and inputting keys displayed on a screen, is characterized by including keys displayed on the screen and being allocated at least first and second graphic character codes generating characters, digits and symbols; key input means for designating each key area showing said respective keys; and selection processing means for outputting either the first or second graphic character code based on a decision where said key input means designates within the key area.

According to the present invention as described above, a key can be allocated two graphic character codes, such as a letters, a digit, a symbol or the like, so that, for example, 26 alphabets can be defined on thirteen keys, thereby allowing the number of keys to be reduced to approximate half as compared with a conventional number of keys. As a result, the operability can be improved in view of the smaller degree of the movement of a pen, a mouse or the like for selecting the key and a larger size of each of the keys.

In the present invention, the key input means is touch-sensitive input means for touching the respective key area shown on the screen, and the selection processing means includes criterion means for deciding whether the touch-sensitive input means shifts over a predetermined length with continuous touch to the key area and character generation means for outputting the first graphic character code allocated to the key when the criterion means decides that a moving distance of the touch-sensitive input means is shorter than the predetermined length and outputting the second graphic character code allocated to the key when the criterion means decides that a moving distance of the touch-sensitive input means is longer than the predetermined length.

With the above structure, the key selection operations can be changed by changing the length which the key is touched with the touch input means, thus improving the operability of inputting.

In the present invention, the key input means is touch-sensitive input means for touching the respective key area shown on the screen, and the selection processing means includes criterion means for deciding whether the touch-sensitive input means keeps touching to the key area for a predetermined period of time and character generation means for outputting the first graphic character code allocated to the key when the criterion means decides that a touching period of time of the touch-sensitive input means is shorter than the predetermined period of time and outputting the second graphic character code allocated to the key when the criterion means decides that a touching period of time of the touch-sensitive input means is longer than the predetermined period of time.

With the structured described above, the key selection operation can be changed by changing the period of time while the key is touched with the touch input means, thus enhancing the operability of inputting.

In the present invention, the key input means is touch-sensitive input means for touching the respective key area shown on the screen, and the selection processing means includes criterion means for deciding whether the touch-sensitive input means pushes the key area under a predetermined pressure and character generation means for outputting the first graphic character code allocated to the key when the criterion means decides that a pressure degree applied by the touch-sensitive input means is lower than the predetermined pressure and outputting the second graphic character code allocated to the key when the criterion means decides that a pressure degree applied by the touch-sensitive input means is higher than the predetermined pressure.

With the above structure, the key selection operation can be changed by changing a pressure which the key is touched with the touch input means, thus improving the operability of inputting.

In the present invention, the key input means includes touch-sensitive input means for touching the respective key area shown on the screen and a push-button provided outside the screen, and the selection processing means has character generation means for outputting the first graphic character code allocated to the key when the key area is simply touched with the touch-sensitive input means without pressing the push-button and outputting the second graphic character code allocated to the key when the key area is touched with the touch-sensitive input means with pressing the push-button.

As to the above structure, in addition to a hand for carrying out the touch operation with the pen, a finger or the like, another hand is needed to push the button, but, the shift operation can be more easily carried out with both hands.

In the present invention, the key input means is touch-sensitive input means for touching the respective key area shown on the screen, the key area showing the key is composed by first half-area corresponding to the first graphic character code and second half-area corresponding to the second graphic character code, and further, the selection processing means includes criterion means for deciding which half-area the touch-sensitive input means touches and character generation means for outputting the first graphic character code when the criterion means decides that the touched area by the touch-sensitive input means belongs to the first half-area and outputting the second graphic character code when the criterion means decides that the touched area by the touch-sensitive input means belongs to the second half-area.

In the above structure, by showing characters, symbols or the like corresponding to the first and second graphic character codes on the first and second areas of each of the keys, the first graphic character code can be inputted when the first area is touched and the second graphic character code can be inputted when the second area is touched. A symbol or the like can be inputted by means of the intuitional operation of touching a part where shown with the inputted character, symbol or the like, thereby allowing the operation to be easily understood and the operability to be enhanced.

Here, as the key input means, a pen input means including a touch pen or a touch screen input means for touching the respective key area shown on the screen with fingers can be used.

In the present invention, the key input means is pointer input means provided with at least first and second buttons thereon, having a pointer shown on and moved within the screen for touching the respective key area shown on the screen, and the selection processing means includes criterion means for deciding which button provided on the pointer input means is pressed when the pointer placed within the key area and character generation means for outputting the first graphic character code allocated to the key when the criterion means decides that the first button of the pointer input means is pressed and outputting the second graphic character code allocated to the key when the criterion means decides that the second button of the pointer input means is pressed.

With the structure as described above, the key selection operation can be changed by appropriately selecting the clicked button while the inputted key is being pointed with the pointer input means, resulting in the improved operability of inputting.

As the pointer input means, in addition to a joystick, a mouse, trackball, a tablet, various input means, which has a button or a function corresponding to the button, and which is capable of moving the pointer shown on the screen, can be used, for example, a pad type operated by being touched on the pad with a finger, a control pad used for an operation of a game machine, and so on.

In the present invention, the key input means is pointer input means provided with a button thereon, having a pointer shown on and moved within the screen for touching the respective key area shown on the screen, and the selection processing means includes criterion means for deciding whether the button of the pointer input means is pressed or pressed with dragging of the pointer input means and character generation means for outputting the first graphic character code allocated to the key when the criterion means decides that the button of the pointer input means is pressed and outputting the second graphic character code allocated to the key when the criterion means decides that the button of the pointer input means is pressed with dragging of the pointer input means.

With the above structure, even when the pointer input means has only one button, the present invention can be applied.

In the present invention, the key input means is pointer input means provided with a button thereon, having a pointer shown on and moved within the screen for touching the respective key area shown on the screen, and the selection processing means includes criterion means for judging the number of button pressing times within a predetermined period of time and character generation means for outputting the first graphic character code allocated to the key when the criterion means decides that the number of button pressing times is once and outputting the second graphic character code allocated to the key when the criterion means decides that the number of button pressing times is twice.

In the above case, the input can be determined whether the key is touched once or twice within the predetermined time in the same way as a double-clicking of the mouse and so on. Provided that the time for determining the difference of the touches is adapted to be appropriately adjusted by an operator of the input unit, the input can be properly determined whether the key is touched once or twice even when the interval between the tow touches is differed in dependence on the adjustment of each of the operators.

In the present invention, the key input means is pointer input means provided with a button thereon, having a pointer shown on and moved within the screen for touching the respective key area shown on the screen, the key area showing the key is composed by first half-area corresponding to the first graphic character code and second half-area corresponding to the second graphic character code, and further, the selection processing means includes criterion means for deciding which half-area the pointer touches and character generation means for outputting the first graphic character code when the criterion means decides that the touched area by the pointer belongs to the first half-area and outputting the second graphic character code when the criterion means decides that the touched area by the pointer belongs to the second half-area.

In the above structure, by showing characters, symbols or the like corresponding to the first and second graphic character codes on the first and second areas of each of the keys, the first graphic character code can be inputted when the first area is touched and the second graphic character code can be inputted when the second area is touched. A symbol or the like can be inputted by means of the intuitional operation of touching a part where shown with the inputted character, symbol or the like, thereby allowing the operation to be easily understood and the operability to be enhanced.

In the present invention, the screen is shown thereon with fifteen main keys to be arranged in 3 ranks lengthwise and 5 files breadthwise, and each of the main keys is shown with characters, symbols or the like corresponding to at least the first and second graphic character codes.

In the above case, although only 15 main keys are provided, at least two keys (symbols or the like) can be allocated each of the keys, that is to say, at least 30 keys are defined in total. Therefore, the main keys can be defined with Japanese Punctuation Marks "ヽ" and "○", and further, with 19 alphabets used in the input with the Japanese Roman characters, namely, letters "A", "I", "U", "E" and "O" as a vowel sound; letters "K", "S", "T", "N", "H", "M", "Y", "R" and "W" for inputting Japanese characters of voiceless sounds from "Ka" group to "Wa" group of Japanese syllabary, which are formed by combing with a vowel sound; and letters "G", "Z", "D", "P" and "B" for inputting Japanese characters of a voice sound and the p-sound in the kana syllabary, which are formed by combining with a vowel sound, with the result that the Japanese input can sufficiently carried out without the change into the other key arrangements when the Japanese ken arrangement is defined.

Similarly, the main keys can be defined with a comma ",", a period "." and so on in addition to 26 alphabets, therefore, the English input can be sufficiently carried out when the English key arrangement is defined.

The fifteen keys are greatly smaller in number as compared with a conventional QWERTY arrangement or Japanese syllabary arrangement. Therefore, provided that each of the main keys is shown in the same size as a key in the conventional QWERTY arrangement or Japanese syllabary arrangement, the key display area can be smaller, so that the screen display key input unit can be further designed in a smaller version, and the degree of the movement of the finger, the pen, the pointer of the mouse or the like for touching the key can be reduced, resulting in the enhanced operability.

In the other way, provided that an area arranged with the main keys is designed to be in the same size as an area arranged the keys of the conventional QWERTY arrangement or Japanese syllabary arrangement, each size of the main keys can be larger than the conventional key, so that the key is easily touched with the pen or the finger, resulting in the improved operability.

The screen display key input unit according to the present invention is shown with the keys as follows: the main keys are respectively allocated to show letters "Q", "E", "T", "U", and "O" on each left half-area of the five keys from the left to the right in the top rank of the arranged fifteen main keys, letters "A", "D", "G", "J", and "L" on each left half-area of five keys from the left to the right in the middle rank, and letters "Z", "C", "B", and "M" on each left half-area of four keys from the left to the right in the bottom rank, and further, the keys, allocated to show "Q", "E", "T", "U", "O", "A", "D", "G", "J", "Z", "C" and "B" on the left half-areas thereof, are respectively allocated to show letters "W", "R", "Y", "I", "P", "S", "F", "H", "K", "X", "V" and "N" on the respective right half-areas thereof.

In the present invention as described above, two of alphabets are positioned on right and left on each of the keys, and each of alphabets are arranged to agree with the QWERTY arrangement, so that the key arrangement is designed in the same as a genera keyboard, thus enhancing the operability.

Here, the keys, allocated to show "L" and "M", may be respectively allocated a long vowel mark "ー" and one of Japanese Punctuation Mark "ヽ" on the right half-areas thereof, and, the key, arranged in the rightmost file of the bottom rank of the arranged main keys, may be allocated to show another Japanese Punctuation Mark "○" on the left half-area thereof and a symbol "•" on the right half-area thereof According to the aforementioned key arrangement, Japanese Punctuation Marks "ヽ" and "○" the long vowel mark "ー" and so on, which are frequently used in the Japanese input, can be inputted by directly selecting the key, thus enhancing the operability of inputting for Japanese.

Further, the keys, allocated to show "L" and "M", may be respectively allocated a semi-colon symbol ";" and a comma symbol "," on the right half-areas thereof, and, the key, arranged in the rightmost file of the bottom rank of the arranged main keys, may be allocated to show a period symbol "." on the left half-area thereof and a colon symbol ":" on the right half-area thereof. According to the aforementioned key arrangement, a comma ",", a period "." or the like, which are frequently used in the Japanese input, can be inputted by directly selecting the key, thus enhancing the operability of inputting for English.

In the present invention, the main keys are defined as follows: the six main keys, arranged in the two files relative to any one of the right and left sides in a main key area provided with the fifteen main keys, are respectively allocated vowel keys for inputting letters "A", "I", "U", "E" and "O", showing vowel sounds of Japanese, and a syllabic nasal key for inputting a character "ん" of the syllabic nasal; the nine main keys, arranged in the other three files of the main key area, are respectively allocated consonant keys for inputting letters "K", "S", "T", "N", "H", "M", "Y", "R" and "W"; and the keys, allocated letters "K", "S", "T", "N" and "H", are respectively allocated to input letters "G", "Z", "D", "P" and "B" in a shift state.

In this case, the keys for inputting the vowel sound and the keys for inputting the consonant sounds are arranged to separate from each other, so that the positions of the vowel keys frequently used can be easily found in the Japanese Roman character input mutually used with the consonant sound and the vowel sound, thus improving the operability. The consonant sound for the voiceless sound frequently used in the consonant sounds are defined on each of the keys in the non-shift state, so that the voiceless sound used frequently can be inputted without the shift operation, thereby allowing the operability to be enhanced. The shift positions of the keys, allocated letters "K", "S", "T", "N" and "H", in the consonant area are respectively allocated letters "G", "Z", "D", "P" and "B" for inputting the voiced sound and the p-sound in the kana syllabary which are formed by combining with the vowel sound "A", "I", "U", "E" and "O", in other words, the keys for inputting characters "が(Ga)", "ざ(Za)" and "だ(Da)" are respectively arranged to 1 Al 7X correspond with the inputting positions for characters "か(Ka)", "さ(Sa)" and "た(Ta)", and the keys inputting for characters "は(Pa)" and "ば(Ba)" are respectively arranged to correspond with the inputting positions for characters "な(Na)" and "は(Ha)", so that the key positions for inputting the voiced sound and the p-sound in the kana syllabary is easily memorized, thereby allowing the operability to be improved.

Further, when the non-shift position of the keys allocated letters "M", "Y", "R" and "W" are allocated a double consonant "っ(ttu)", Japanese Punctuation Marks "、" and "。", a long vowel mark "—" and so on, even in the small number of keys, the syllabic nasal "ん(n)", a double consonant "っ(ttu)", Japanese Punctuation Marks "、" and "。" a long vowel mark "—" can be inputted by touching only one key once, resulting in the improved operability. Especially, the syllabic nasal "ん(n)" is defined on one key in the vowel area in the non-shift state, so that the syllabic nasal "ん(n)" frequently used in kanji read in Chinese style in the Japanese input can be easily inputted.

In the present invention, the main keys are defined as follows: the five main keys of the six main keys, arranged in the two files relative to any one of the right and left sides in a main key area provided with the fifteen main keys, are respectively allocated letters "A", "I", "U", "E" and "O"; the nine keys, arranged in the other three files in the main key area, are respectively allocated to input letters "K", "S", "T", "N", "H", "M", "Y", "R" and "W"; the respective keys, allocated letters "A", "I", "U", "E" and "O", are allocated a letter "Q", a letter "J", a comma ",", a period "." and a letter "X" in a shift state; and the respective keys, allocated letters "K", "S", "T", "N", "H", "M", "Y", "R" and "W", are allocated to input letters "G", "Z", "D", "P", "B", "C", "F", "V" and "L" in a shift state.

Here, in addition to 26 alphabets, each symbol of a comma ",", a period ".", an apostrophe "'", and a hyphen "-" which are frequently used in the English input can be directly inputted with the touch input, resulting in the improved operability of inputting English.

Many keys of the English key arrangement are arranged to match the aforementioned Japanese key arrangement, so that the key positions are easily memorized even when the standard arrangement and the English key arrangement are combinedly used by changing mutually, resulting in the enhanced operability.

In the present invention, the fifteen main keys are respectively allocated to input a digit "0", a digit "1", a digit "2", a digit "3", a digit "4", a digit "5", a digit "6", a digit "7", a digit "8", a digit "9", symbol "+", a symbol "−", a symbol "×" or "*" a symbol "÷" or "/" and a symbol ".".

As to the aforementioned key arrangement, digits can be arranged in the same way of a numeric keypad in a conventional keyboard, and various arithmetic symbols used for calculations can be inputted, thereby allowing an operation of inputting digits or calculations to be easier.

In the present invention, the fifteen main keys are respectively allocated to input, as the first and second graphic character codes, bracket symbols "[", "]", "(", ")", "<", ">", "[", "]", "{", "}", "'", "'", """", and """", a colon symbol ":", a semi-colon symbol ";", an asterisk symbol "*", a sharp symbol "#", an and symbol "&", a question symbol "?", a qualifying symbol "!", a symbol "/", a symbol "/", a symbol "~", a qualifying symbol "@", a dollar symbol "$", a yen symbol "¥", a hyphen "-", and a symbol "=".

In this case, various symbols, which has been frequently used but hardly inputted conventionally, can be inputted with the touch input with showing on each of the main keys, therefore, various symbols can be easily inputted. And, the bracket symbols are collectively defined on the six main keys, arranged in the two files relative to the left or right side, in the shift state and the non-shift state, so that the key positions of the bracket symbols and the other symbols are easily distinguished, thereby allowing, the operability of inputting.

In the present invention, the main keys are defined as follows: the six main keys, arranged in the two files relative to any one of the right and left sides in a main key area provided with the fifteen main keys, are respectively allocated vowel keys for inputting letters "A", "I", "U", "E" and "O", showing vowel sounds of Japanese, and a syllabic nasal key for inputting a character "ん" of the syllabic nasal; the nine keys, arranged in the other three files of the main key area, are respectively allocated consonant keys for inputting letters "K", "S", "T", "N", "H", "M", "Y", "R" and "W"; the vowel keys allocated letters "A", "I", "U", "E" and "O", and a syllabic nasal key allocated a character "ん" are respectively allocated to input letters "AI", "UI", "UU", "EI", "OU", and "YUU" in a shift state; and the keys, allocated letters "K", "S", "T", "N", "H", "M", "Y", "R" and "W", are respectively allocated to input letters "G", "Z", "D", "P", and "B", a double consonant character "っ", one of Japanese Punctuation Mark "、", another Japanese Punctuation Mark "。", and a long vowel mark "—", in a shift state.

Here, "AI", "UI", "UU", "EI", "OU" and "YUU" can be inputted by touching only one key once, so that Japanese characters including a double vowel or palatalized syllable frequently used in kanji read with Chinese style, such as 会計(KAI KEI), 推定(SUI TEI), 空港(KUU KOU), 抽象(TYUU SYOU) and so on, can be easily inputted, thus increasing efficiency of the input.

In the present invention, the main keys are defined as follows: the six main keys, arranged in the two flies relative to any one of the right and left sides in a main key area provided with the fifteen main keys, are respectively allocated vowel keys for inputting letters "A", "I", "U", "E" and "O", showing vowel sounds of Japanese, and a syllabic nasal key for inputting a character "ん" of the syllabic nasal; the nine keys, arranged in the other three files of the main key area, are respectively allocated consonant keys for inputting letters "K", "S", "T", "N", "H", "M", "Y", "R" and "W"; the vowel keys allocated letters "A", "I", "U", "E" and "O", and a syllabic nasal key allocated a character "ん" are respectively allocated to input letters "ya", "yuu", "yu", "you" and "yo", and a double consonant character "っ", in a shift state; and the keys, allocated letters "K", "S", "T", "N", "H", "M", "Y", "R"and "W", are respectively allocated to input letters "G", "Z", "D", "P", and "B", a dot symbol " • ", one of Japanese Punctuation Mark "、", another Japanese Punctuation Mark "。", and a long vowel mark "—" in a shift state.

Here, palatalized syllables "ya", "yu" and "yo" and long palatalized syllables "yuu" and "you" can be inputted by touching the key once with the bar touch, resulting in the efficient input of Japanese.

Further, in the present invention, at least one of the fifteen main keys is defined with the third graphic character code in addition to the other two graphic character codes, and wherein the selection processing means includes criterion means for determining which key selection operation of three types is carried out for selecting from the first to third graphic character codes inputted by the key input means, and character generation means for selecting and outputting any one of the first to third generated codes, defined on each of the keys, in response to the key selection operation determined by the criterion means.

In the invention as described above, alphabets are defined on the first and second graphic character codes, and a digit, a symbol or the like excepting alphabets can be defined on the third graphic character code, thereby the digit or the symbol can be inputted by changing the key selection operations in the same way as the character (letter) input, therefore, the digit or the symbol can be easily inputted as necessary, resulting in the improved operability of inputting sentences including digits or symbols.

Further, in the present invention, at least one of the main keys is defined with the third graphic character code and the fourth graphic character code in addition to the other two graphic character codes, and wherein the selection processing means includes criterion means for determining which key selection operation of four types is carried out, and character generation means for selecting and outputting any one of the first to fourth generated codes, defined on each of the keys, in response to the key selection operation determined by the criterion means.

As to the invention as described above, for example, the first and second graphic character codes are defined with alphabets, the third graphic character code is defined with a digit, and the fourth graphic character code can be defined with a symbol or the like, in which the digit and the symbol can be inputted by changing the key selection operation in the same way of the character (letter) input. Thereby allowing the digit and the symbol to be easily inputted as necessary and the operability of inputting sentences including the digits or the symbols to be improved.

The present invention includes arrangement change means for changing the arrangements of the generated graphic character codes when a character, a digit or a symbol and the key shown with the symbol or the like, which are shown on the screen, is touched.

According to the invention described above, the arrangements of the graphic character codes defined on the main key can be changed in response to various key arrangements of the arrangement for the Japanese Roman character input, English key arrangement, the digit key arrangement, the symbol key arrangement and so on, so that the defined keys with only fifteen main keys are 15 keys×2 (characters or the like of the first and second graphic character codes)×the number of arrangements, namely 30 keys×the number of arrangements, in which any one of characters (letters), digits, symbols or the like can be directly and easily inputted with the touch input by changing the arrangements.

And further, the present invention includes a support key area provided in addition to a main key area, provided with fifteen keys arranged in 3 ranks lengthwise and 5 files breadthwise, to be provided therein with plural support keys, defined with various functions, adjacent to the main key area.

The support key area may be positioned in, for example, any one of places under and adjacent to the right and left side of the main key area, in which it is advisable that at least five support keys are provided therein. The aforementioned support keys can be defined with various functions needed in the character (letter) input operation, such as a mode change function changing the key arrangements shown on the screen, a kanji conversion, a space input, a return key, a back space key, a delete key and so on, thereby allowing the operability of inputting to be further improved.

Incidentally, the only mode change function is separated to be independent, and a mode change key besides the support key may be provided adjacent to the main key area. Here, the arrangement of the main keys can be easily changed by touching the change key.

And further, a menu key showing a mode selection menu may be defined in the support keys or the like, in which the mode selection menu is shown on the screen by pushing the menu key to changed modes.

In this case, the key arrangements can be defined much more than the mode change function is defined in the change key, so that various inputs can be practicable, resulting in the improved operability.

BRIEF DESCRIPTION OF DRAWINGS

FIG. 29 is a plane view showing a QWERTY English key arrangement in the screen touch input unit;

FIG. 30 is a plane view showing a QWERTY Japanese key arrangement in the screen touch input unit;

FIG. 31 is a block diagram showing an internal structure of the screen touch input unit;

FIG. 41 is a plane view showing a modification of the key arrangement in the screen touch input unit according to the present invention;

FIG. 42 is a plane view showing another modification of the key arrangement in the screen touch input unit according to the present invention;

FIG. 55 is a plane view for an explanation of a conventional QWERTY arrangement; and FIG. 56 is a plane view for an explanation of a conventional Japanese syllabary.

DETAILED DESCRIPTION OF THE PREFERRED EMBODIMENTS

The preferred embodiments of the present invention will now be described with reference to the drawings.

Figure 1:
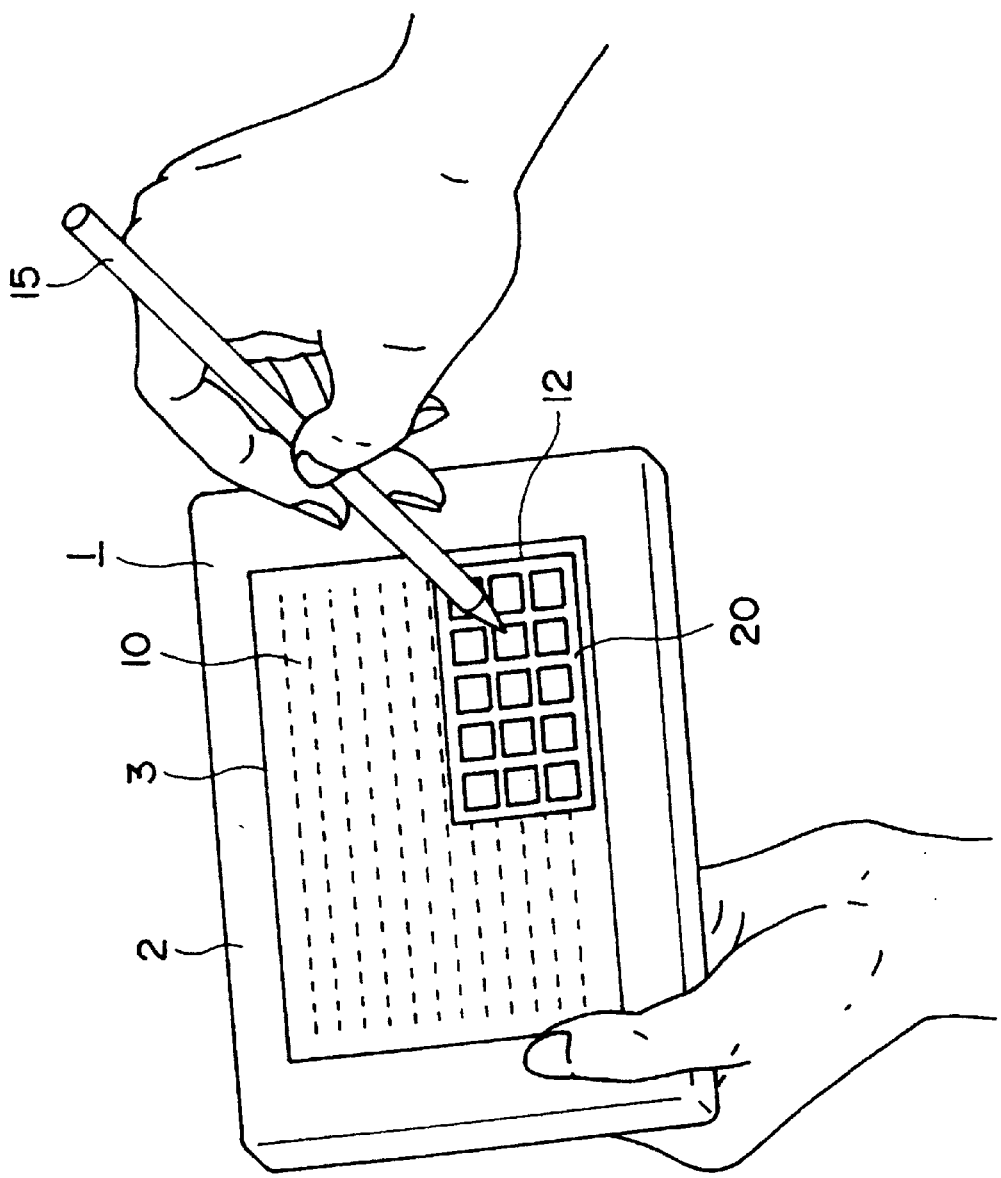
FIG. 1 is a perspective view showing a screen display key input unit of the first embodiment according to the present invention.

A screen display key input unit 1 in the first embodiment according to the present invention is illustrated in FIG. 1. The screen display key input unit 1 has a main body 2 provided with a liquid crystal display 3 to be used as a portable remote terminal. The display 3 may be protected by a cover pivotally move with reference to the main body 2.

The liquid crystal display 3 has a data display area 10 to input characters and display data when the screen display key input unit 1 is used to operate word processor, spreadsheet, address book, electric mail or schedule function. The actual graphic format in the data display area 10 may be arranged based on the function in operation.

There is a key input area 12 at a lower portion of the data display area 10. The key input area 12 may be constantly displayed. But, in view of operability of the unit, it is preferable to pop up the key input area 12 until using almost all of the data area 10 by designing the screen to have a key starting input operation.

The screen display key input unit 1 is further provided with a pen 15 used in a touch-sensitive input means as a key input means as shown in FIG. 1. The pen 15 may be held by a holder optionally provided to the main body, so that the pen 15 shall not be lost.

The actual operation of the screen display key input unit 1 is so carried out that the main body is taken by the left(right) hand or put on a table and the pen 15 is hold by the right(left) hand.

Figure 2:
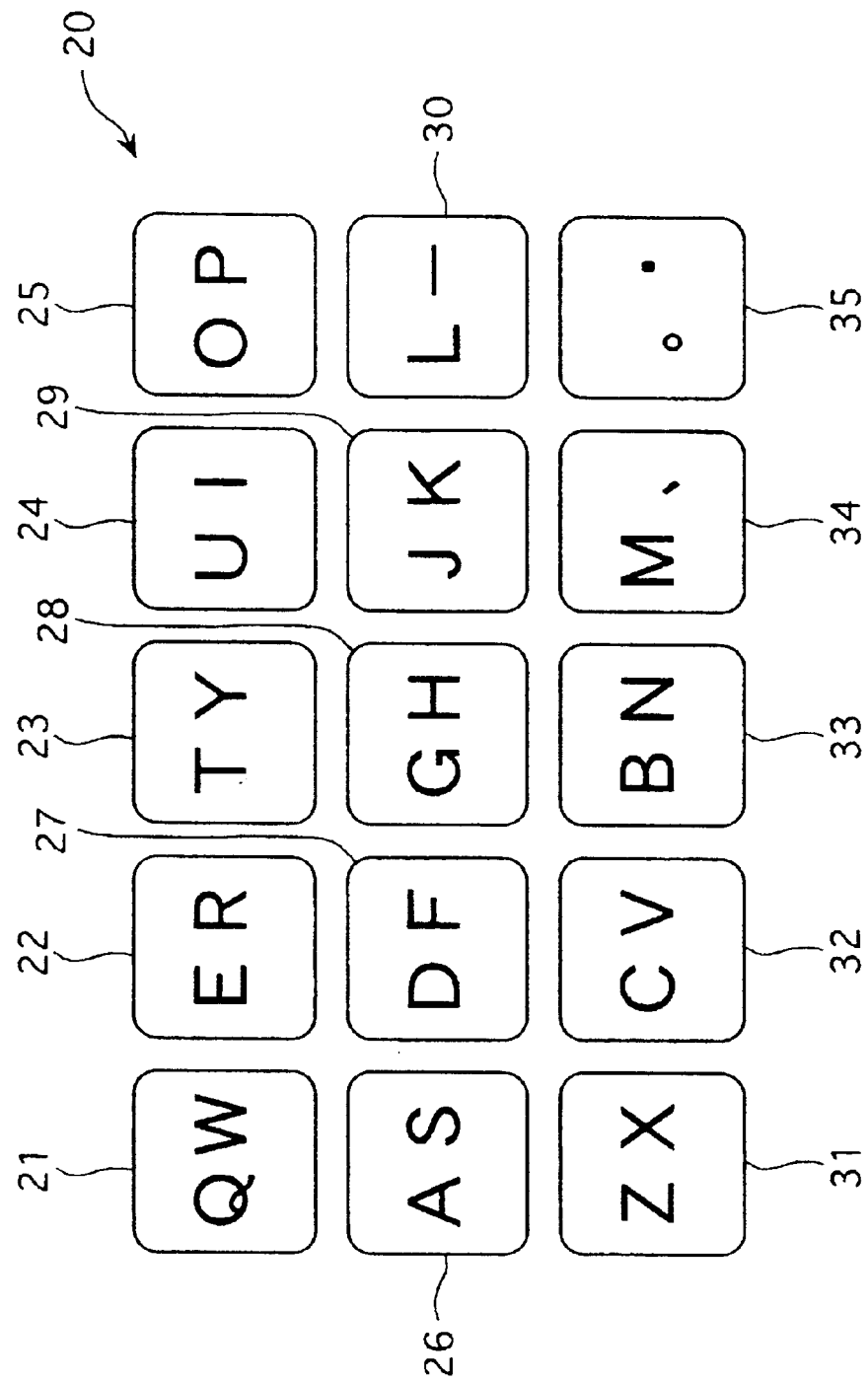
FIG. 2 is a plane view showing a Japanese key arrangement of the screen display key input unit.

The details of the key input area 12 is depicted in FIG. 2 in which there are lengthwise and breadthwise 15 main keys 21 to 35 in main key area 20.

The main keys 21 to 35 shown in the main key area 20 have two display modes changed by pressing a mode change key (not-shown) or operating or designating an area except the main key area 20 by the pen 15, one being a QWERTY Japanese key arrangement to input Roman characters and the other being a QWERTY English key arrangement.

The definite arrangement of the main keys 21 to 35 (alphabets) according to the QWERTY Japanese key arrangement conforms to a standard QWERTY arrangement used in the general keyboard.

In general, as shown in FIG. 2, the left half-area of the five keys 21 to 25 arranged at a top rank are respectively allocated to show "Q" on the key 21, "E" on the key 22, "T" on the key 23, "U" on the key 24 and "O" on the key 25. The left half-area of the five keys 26 to 30 arranged at a middle rank are respectively allocated to show "A" on the key 26, "D" on. the key 27, "G" on the key 28, "J"on the key 29 and "L" on the key 30. The left half-area of the five keys 31 to 35 arranged at a bottom rank are respectively allocated to show "Z" on the key 31, "C" on the key 32, "B" on the key 33, "M" on the key 34 and "○(one of Japanese Punctuation Mark)" on the key 35.

The right half-area of the keys 21 to 35 are respectively allocated to show "W" on the key 21, "R" on the key 22, "Y" on the key 23, "I" on the key 24, "P" on the key 25, "S" on the key 26, "F" on the key 27, "H" on the key 28, "K" on the key 29, "━ long vowel mark)" on the key 30, "X" on the key 31, "V" on the key 32, "N" on the key 33, "丶(one of Japanese Punctuation Mark)" on the key 34, and "●" mark on the key 35.

From another point of view, the five keys 21 to 25 from the left to the right in the top rank are respectively allocated to input "QW", "ER", "TY", "UI", and "OP". The five keys 26 to 30 in the middle rank are also allocated to input "AS", "DF", "GH", "JK", and "━" in the same way. The five keys 31 to 35 in the bottom rank are provided to input "ZX", "CV", "BN", "丶" and "○●".

The first graphic character code of each key 21 to 35 is applied to mean character shown at the left side of the respective key input area. The second graphic character code is applied to mean character shown at the right side of the respective key input area in the same way.

Figure 3:
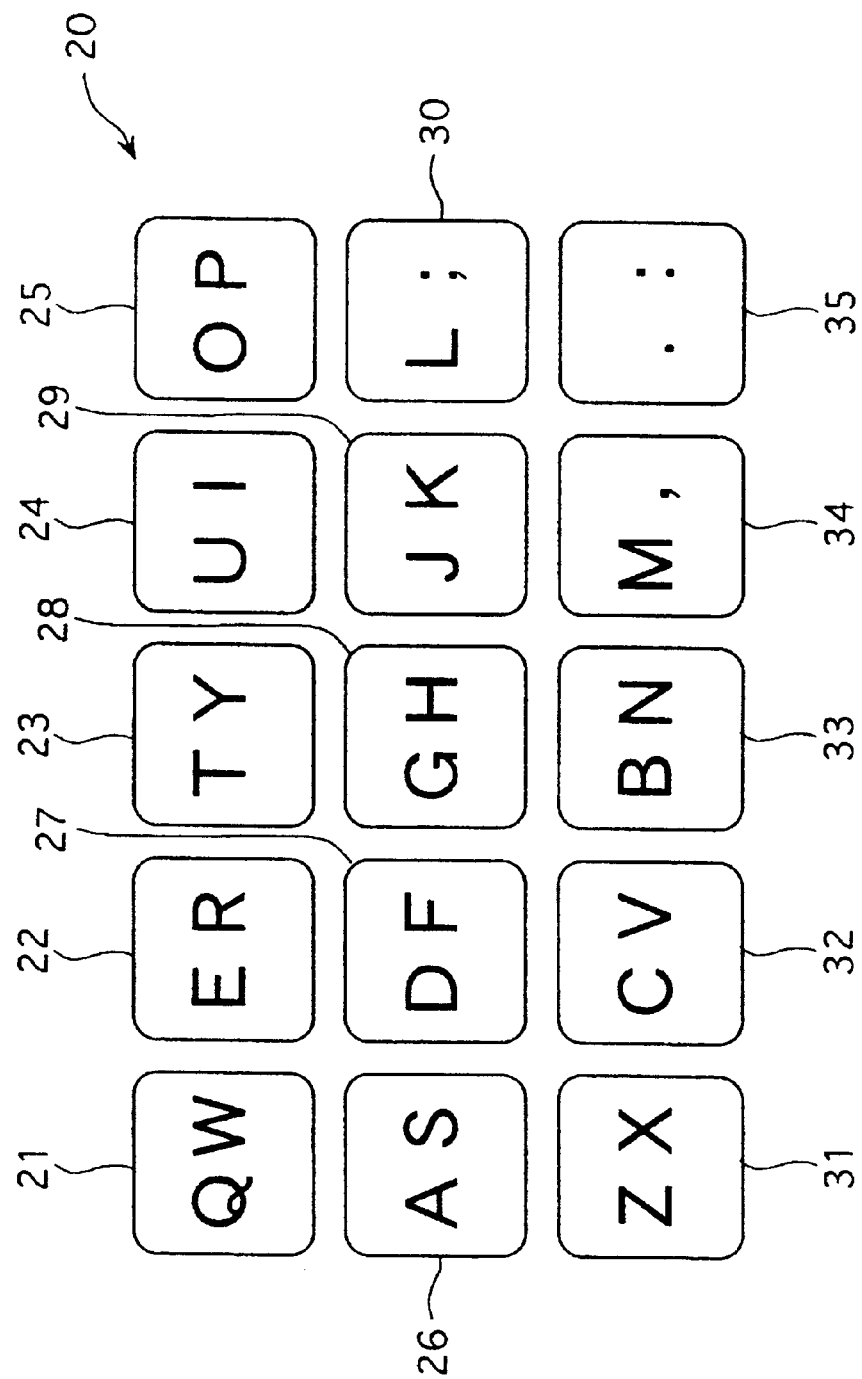
FIG. 3 is a plane view showing an English key arrangement of the screen display key input unit.

Turning to a character arrangement (alphabets) on the main keys 21 to 35 in FIG. 3 belongs to a QWERTY key arrangement as the mentioned QWERTY Japanese key arrangement. But, when inputting English characters, there is no need to input Japanese Punctuation Marks, so that a comma ",", period ".", semi-colon ";", and a colon ":" are preferably allocated to the keys considering a smooth input operation.

In general, as shown in FIG. 3, the left half-area of the five keys 21 to 25 (first graphic character code) arranged at a top rank are respectively allocated to show "Q" on the key 21, "E" on the key 22, "T" on the key 23, "U" on the key 24 and "O" on the key 25. The left half-area of the five keys 26 to 30 arranged at a middle rank are respectively allocated to show "A" on the key 26, "D" on the key 27, "G" on the key 28, "J" on the key 29 and "L" on the key 30. The left half-area of the five keys 31 to 35 arranged at a bottom rank are respectively allocated to show "Z" on the key 31, "C" on the key 32, "B" on the key 33, "M" on the key 34 and period; "." on the key 35.

The right half-area of the keys 21 to 35 are respectively allocated to show "W" on the key 21, "R" on the key 22, "Y" on the key 23, "I" on the key 24, "P" on the key 25, "S" on the key 26, "F" on the key 27, "H" on the key 28, "K" on the key 29, semi-colon ";" on the key 30, "X" on the key 31, "V" on the key 32, "N" on the key 33, comma "," on the key 34, and colon ":" on the key 35.

From another point of view, the five keys 21 to 25 from the left to the right in the top rank are respectively allocated to input "QW", "ER", "TY", "UI", and "OP". The five keys 26 to 30 in the middle rank are also allocated to input "AS", "DF", "GH", "JK", and "L;" in the same way. The five keys 31 to 35 in the bottom rank are provided to input "ZX", "CV", "BN", "M," and ".:".

An internal processing method in the screen display key input unit 1 according to the present invention will be explained hereunder in the light of FIGS. 4 and 5.

Figure 4:
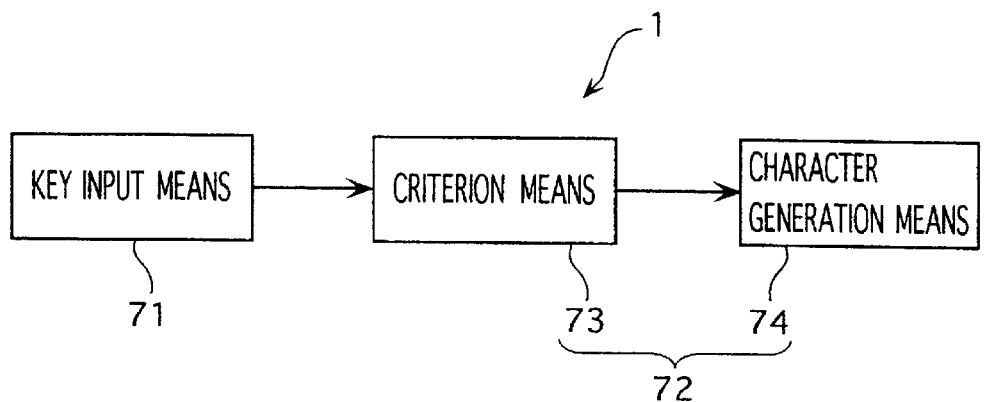
FIG. 4 is a block diagram showing an internal structure of the screen display key input unit.
Figure 5:
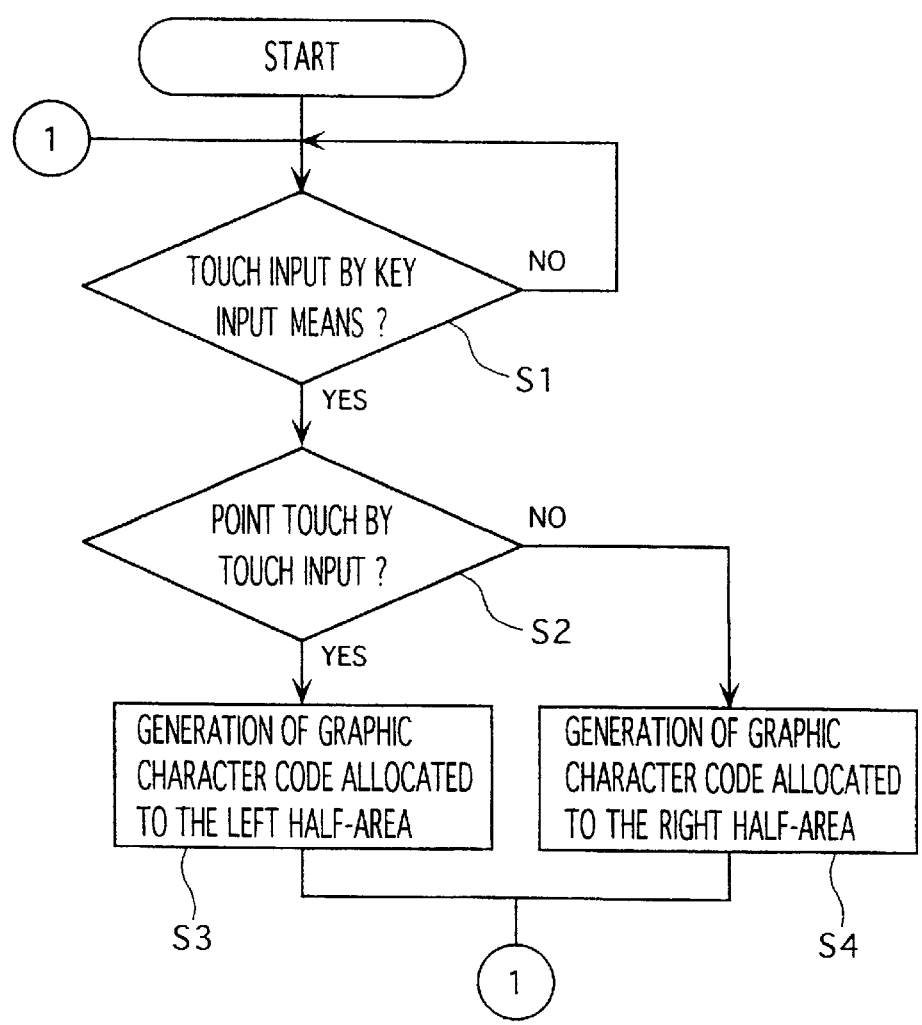
FIG. 5 is a flow chart showing procedure of an input operation for the screen display key input unit.

FIG. 4 is a block diagram to visually understand an internal structure in the screen display key input unit 1. FIG. 5 is a flow chart actually carried out in the unit 1.

The screen display key input unit I consists of a key input means 71 and a selection processing means 72 including a criterion means 73 and a character generation means 74.

The key input means 71 in this embodiment is a touch-sensitive input means using the pen 15 as already explained to sense a touch by this pen 15 within the main key area 20, which is represented as a Step 1 in the drawing. A step will be simply replaced with "S" to shorten a sentence.

When being touched by the pen 15, the criterion means 73 judges whether the pen 15 shifts over a predetermined length with continuous touch to a key (=Bar touch) or the pen 15 moves within the predetermined length (=Point touch) (S2).

In case of the point touch based on a decision in the criterion means 73, the character generation means 74 generates the first graphic character code allocated to the left half-area in the touched key as a standard process (S3).

It the touch is considered as the bar touch in the criterion means 73, the character generation means 74 generates the second graphic character code allocated to the right half-area in the touched key as a shift process (S4).

The results from the character generation means 74 are displayed on the liquid crystal display 3.

A whole process by one touch input is carried out as aforementioned and subsequent inputs are done in the same way. When using the Japanese key arrangement shown in FIG. 2, the inputted alphabets are recognized as Roman characters and displayed in the form of Japanese hiragana characters on the display 3 by a kana-kanji conversion program preliminary memorized in the screen display key input unit 1. If necessary, these Japanese hiragana characters are automatically converted or manually converted by a conversion key (not-shown) into kanji characters.

The judgment process of the criterion means 73 in the touch input is further explained in the following.

Figure 6:
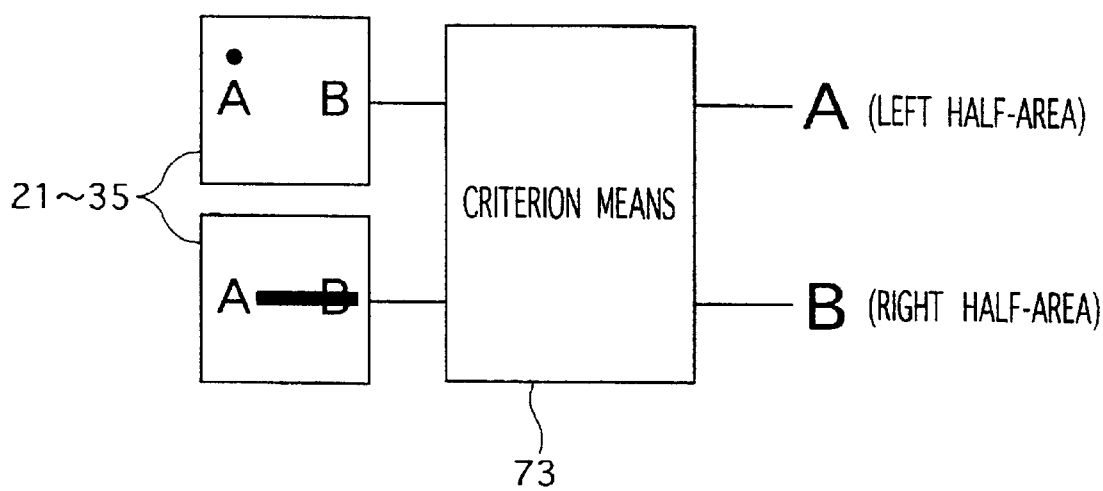
FIG. 6 is an explanatory view for an operation of a criterion means of the screen display key input unit.

As will be understood from FIG. 6, the criterion means 73 is provided to determine which half area; the left half-area (Letter "A" in FIG. 6) or the right half-area (Letter "B" in FIG. 6) in the respective keys 21 to 35 is selected by the pen 15.

Figure 7:
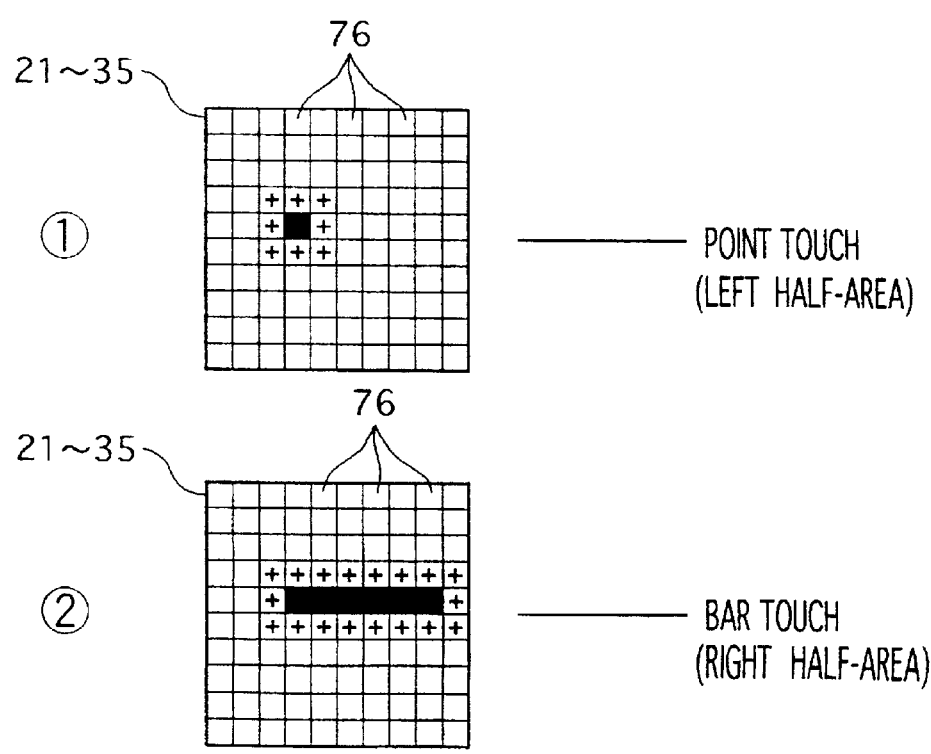
FIGS. 7①and ② are explanatory views for a determining method of a touch input.
Figure 8:
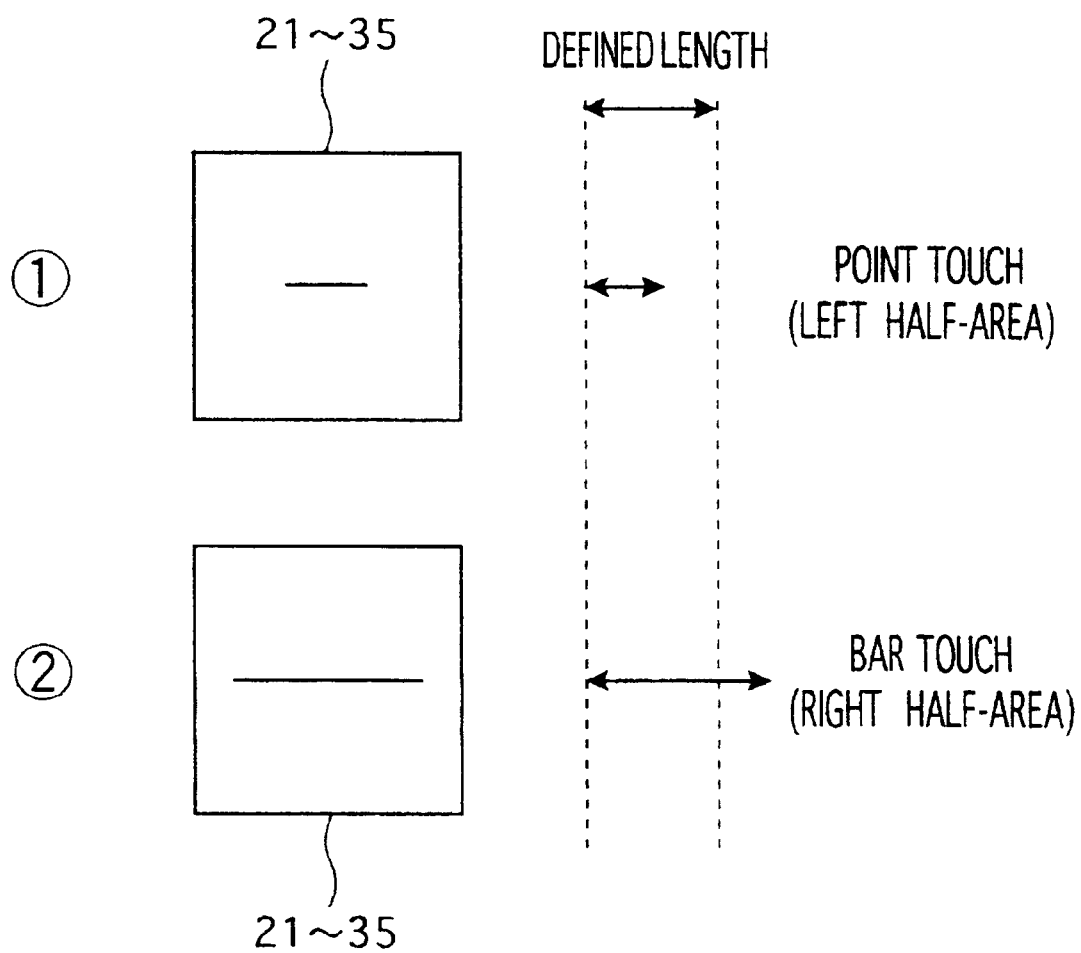
FIGS. 8①and ② are explanatory views for another determining method of the touch input.

Two decision criterion in the touch operation are visually shown in FIGS. 7 and 8.

One decision criterion is shown in FIG. 7 and the touch operation is confirmed every pixel 76 forming the respective keys 21 to 35. Where 100 pixels 76 are arranged in a grid 10 lengthwise and 10 widthwise in each display area of the keys 21 to 35, as shown in FIG. 7①, the criterion means 73 determines that the input is carried out with the point touch when the pen 15 touches the pixels 76 of less than the predetermined number of pixels 76 in any display area of the keys 21 to 35, for example, one of the pixels 76 in any display area of the keys 21 to 35 or the pixels 76 of the initial pixel 76 and at least one of the pixels 76 positioned around the initial pixel 76 (the pixels 76 illustrated with "+" in FIG. 7)(when the pixel is touched with the pointer). Further, the criterion means 73 determines, as shown in FIG. 7②, that the input is carried out with the bar touch when the more than four pixels 76 aligned in one direction are touched (when the pixels are touched to draw a bar of a hyphen "-").

FIG. 7 shows an example the pen 15 is moved in the horizontal direction, but the input is determined as the bar touch input insofar as the more than four pixels 76 are touched even when the pen 15 is moved in the vertical direction, in a slanting direction or along a shape "∧" or "∨". The touch input can be started from any point in each area of the keys 21 to 35 and finished to put the end of the touch (bar) at the outside of the key area so that the touch input is determined to be carried out with which of the point touch or the bar touch in dependence upon the number of pixels touched in the key area.

The number of pixels 76 as a criterion is not limited to be more and less than four, but may be defined to depend on, especially, the number of pixels 76 in the display area or the like. For example, where the number of pixels 76 is defined as 25 of a grid 5 lengthwise and 5 widthwise, the bar touch may be determined when the more than two pixels 76 are touched.

The other decision criterion is shown in FIG. 8 and the touch operation is confirmed with a distance between the starting point and the finishing point touched with the pen 15. The criterion means 73 determines that the input is carried out with the point touch when the length touched by the pen 15 is shorter than the previously defined length as shown in FIG. 8①, and that, as shown in FIG. 8②, the input is carried out with the bar touch when the length touched by the pen 15 is longer than the previously defined length.

Here, the pen 15 can move in the vertical direction or a slanting direction or move to change the moving direction at some midpoint to form a mark "√", in other words, the bar touch input is determined when a distance between the starting point to the finishing point, namely, the moving distance of the pen 15 is longer than the predetermined length.

Incidentally, the defined length as a criterion may be previously defined or defined as necessary by an operator.

Effects in the embodiment will be described below.

According to the embodiment, the first and second graphic character codes are defined in each of the keys 21 to 35, so that two of characters (alphabets) and symbols are allocated each of the keys 21 to 35. Therefore, the number of keys can be reduced to half as compared with a conventional key allocated with one character.

For example, although only 15 main keys 21 to 35 are provided as shown in FIG. 2, two graphic character codes can be allocated each of the keys 21 to 35, that is to say, 30 graphic character codes are defined in total. Therefore, in addition to 26 alphabets used in English input and in Japanese Roman character input, symbols used frequently, such as a comma ",", a period "." and so on in the English input and Japanese Punctuation marks " ﹅ " and " ◦ " and the like in the Japanese input, can be also allocated on the main keys 21 to 35, with the result that even with the small number of keys, the English input or the Japanese input is possible sufficiently.

As a result, Roman character input or English input can be carried out by using the fifteen main keys 21 to 35 which is much smaller number than the conventional QWERTY key arrangement or the conventional arrangement of the Japanese syllabary, so that the main key area 20 as the key display area can be defined in a smaller size provided that each of the keys 21 to 35 is displayed on the display 3 with the same size as the key of the conventional QWERTY key arrangement or the conventional arrangement of the Japanese syllabary, resulting in decrease of the degree that the pen 15 touching the keys 21 to 35 is moved, and in the improved operability.

By decreasing the size of the main key area 20, the size of the screen touch input unit 1 can be smaller, the display area 10 for data or the like can be extended, and the operational ease or the handling properties can be further improved.

Turning to, provided that the size of the main key area 20 is defined to be similar to the conventional key arrangement area of the QWERTY key arrangement or the arrangement of the Japanese syllabary, the size of the main key area 20 can be larger with compared as the conventional size, so that the keys 21 to 35 are easily touched with the pen 15 or a finger, resulting in the improved operational ease.

Symbols used frequently, such as a comma ",", a period "." and so on in the English input and Japanese Punctuation marks " ﹅ " and " ◦ " and the like in the Japanese input, can be directly inputted with the touch input by being displayed on each of the keys 30, 34 and 35, resulting in the further improved operability in the English input and the Japanese input.

The fifteen main keys 21 to 35 are arranged in order of the QWERTY arrangement accustomed and widely used conventionally, so that it is easy for most of persons accustomed to using the QWERTY arrangement to acquire the usage of the key arrangement of the embodiment, and naturally, immediately use the screen display key input unit.

Furthermore, the English key arrangement of FIG. 3 corresponds with the Japanese key arrangement of FIG. 2 excepting the key for symbols, so that the key arrangement is easily acquired and the operational ease can be improved, even when the English key arrangement is used in combination with the Japanese key arrangement by changing from each other.

For the input for two characters and/or symbols displayed on each area of the keys 21 to 35, the operation of two types can be carried out by slightly changing the movements of the pen 15, that is to say, by choosing between the point touch input carried out at a point and the bar touch input carried out by moving the pen for the predetermined length to keep touching, therefore, one of two characters and/or symbols allocated each of the keys 21 to 35, namely, one of the first graphic character code or the second graphic character code, can be inputted with the easy operation.

As a result, in the touch input with the use of the pen 15, the input operation of two characters allocated one key can be carried out like the shift operation of the conventional key board, and that with great facility, resulting in the improved operability.

Provided the degree that the pen 15 moves, which is determined as the bar touch input, is adjusted as necessary by an operator of the input unit 1, even when the degree that the pen 15 moves is differed with the usage of each operator, the input can be precisely determined whether to be carried out by the bar touch input or the point touch input, resulting in the further improved operational ease.

The keys 21 to 35 in the key input area 12 are arranged to be maintained with the intervals from one another, so that each area of the keys 21 to 35 is clearly divided, thus avoiding an error operation, for example, the input carried out across two keys of the keys 21 to 35. Especially, when the pen touches on a spacing part between two keys of the keys 21 to 35, the touch input, carried out beyond the spacing part touched with the pen, is defined to be canceled, thus surely avoiding the error operation.

The second embodiment according to the present invention will be explained below. Incidentally, in the description of the following embodiment, the same reference numerals will be used to designate the same or similar components as those in the first embodiment, so that the description will be omitted or simplified.

In the embodiment, the different point from the first embodiment is that a mode key area 40 and a function key area 50 are newly provided in the key input area 12, in addition to the main key are 20. Therefore, the explanation as to the same or similar components as the first embodiment will be omitted or simplified.

Figure 9:
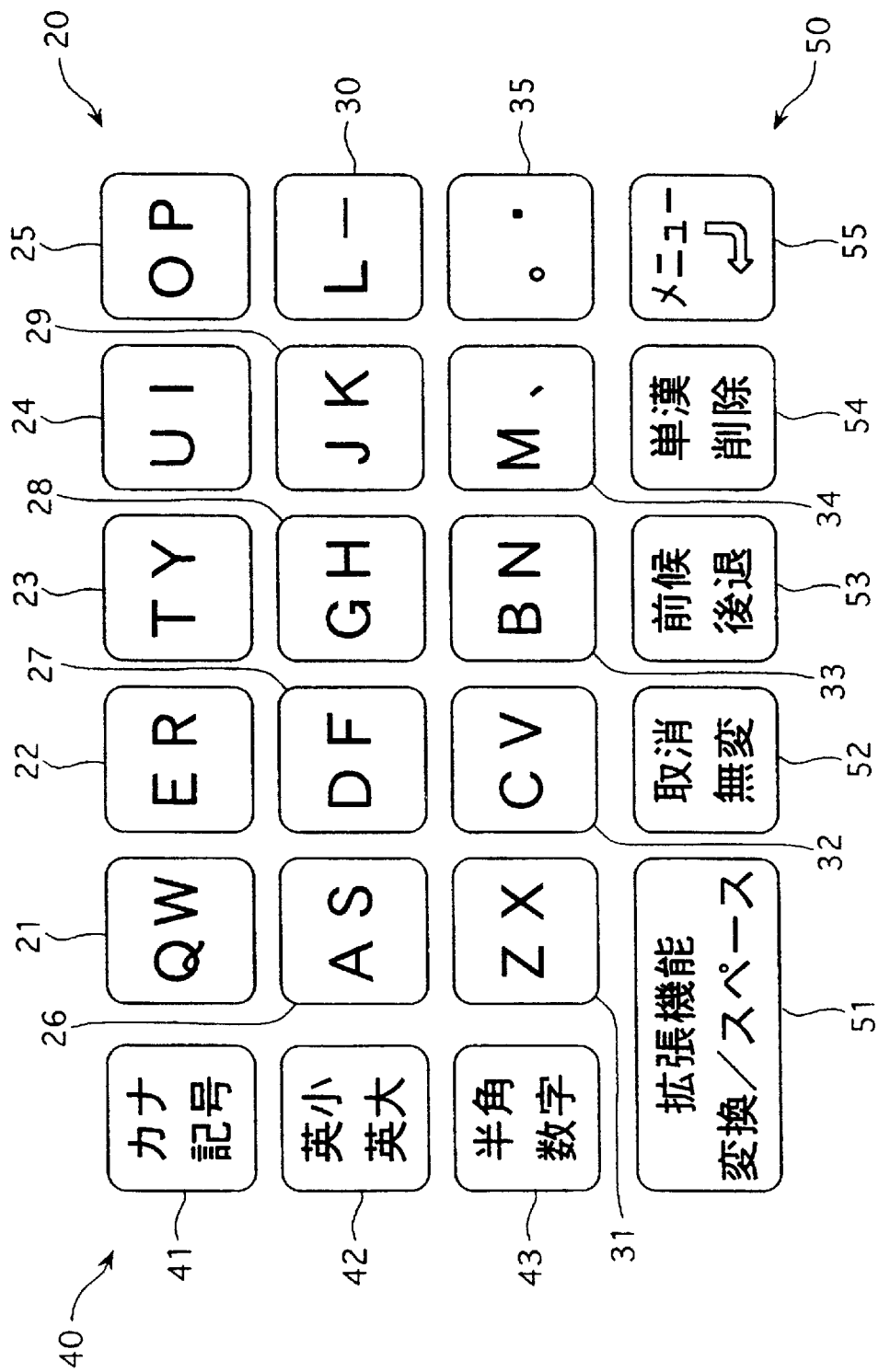
FIG. 9 is a plane view showing a Japanese key arrangement of the screen display key input unit of the second embodiment according to the present invention.

As shown in FIG. 9, in the Japanese key arrangement according to the embodiment, the mode key area 40 is arranged adjacent to the left side of the main key area 20, and the function key area 50 is arranged under the main key area 20.

Here, the arrangement of the keys 21 to 35 in the main key area 20 are the same as the Japanese key arrangement of the first embodiment, which is shown in FIG. 2.

The mode key area 40 is vertically aligned therein with three mode keys 41, 42 and 43.

The aforementioned mode keys 41, 42 and 43 are provided to define to input a digit, a symbol or the like by changing the arrangement of the keys 21 to 35 from the English and Japanese key arrangements. For example, with the selection of the symbol mode key displayed at the bottom half-area of the mode key 41, the display on the keys 21 to 35 of the main key area 20 are respectively changed from alphabets into various symbols, thereby various symbols may be inputted by touching each of the keys 21 to 35 with the pen 15.

By selecting the kana mode key displayed at the top half-area of the mode key 41, alphabets are displayed on the main key area 20 to be divided into two groups of alphabets showing vowels of Japanese and alphabets showing consonants, thereby an operator who does not accustom to using the QWERTY arrangement may easily input Roman characters or a kana fixing mode, converting characters inputted with Roman characters into the form of Japanese katakana characters, may be defined.

By selecting a 英大 (English uppercase alphabetic character) mode key displayed at the bottom half-area of the mode key 42, all the inputted alphabets may be outputted with capital letters, and by selecting a 英小 (English lowercase alphabetic character) mode key displayed at the top half-area of the mode key 42, all the inputted alphabets may be outputted with small letters.

By selecting a digit mode key displayed at the bottom half-area of the mode key 43, digits (0 to 9) and arithmetic symbols can be inputted with each of the keys 21 to 35 on the main key area 20. And further, by selecting a half-sized character mode key displayed at the top half-area of the mode key 43, the input on the main key area 20 may be defined to be a half-sized character input.

In other words, the aforementioned mode keys 41 to 43 are used when English writing or writing of Japanese katakana characters, which are used for an abbreviation, a word of foreign origin or the like in Japanese sentences, are inputted or when digits, symbols or the like are inputted.

Incidentally, a concrete structure of the arrangement as described above will be explained in the other embodiment touching upon later.

Turning to, the function key area 50 is arranged with five function keys 51 to 55, which are defined with various functions necessary for the Roman character input.

More specifically, a lower-left area of the key 51 is allocated a "変換(conversion)" key carrying out a function for a kana-kanji conversion; a lower-right area of the key 51 is a allocated a "スペース(space)" key for inputting a space; and the top half-area of the key 51 is allocated an "拡張機能(enhanced function)" key defining various enhanced functions for each of the keys 21 to 35 on the main key area 20. As functions defined by the enhanced function key, a move function moving a cursor to the beginning or the end of a sentence or a line or the like, and various functions used in a word processor or the like for, for example, insert, a ruled line, movement, copy, print and so on, are listed.

The bottom half-area of the key 52 is allocated a "無変(non-conversion)" key carrying out a function for a kana-kanji non-conversion, and the top half-area of the key 52 is allocated a "取消(cancel)" key. The bottom half-area of the key 53 is allocated a "後退(back space)" key moving a cursor backward (return a cursor to an initial position), and the top half-area of the key 53 is allocated a "前候(last conversion-candidate)" key showing the last candidates of homophones shown with a list in the kana-kanji conversion.

The bottom half-area of the key 54 is allocated a "削除(delete)" key. And the top half-area of the key 54 is allocated a "単漢(single-kanji conversion)" key carrying out a single-kanji conversion. The bottom half-area of the key 55 is allocated a "改行(return)" key. And the top half-area of the key 55 is allocated a "メニュー(menu)" key showing a menu for changing the key arrangement into an English key arrangement which will be touched upon below.

Incidentally, the function key 51 has a greater width than the keys 52 to 55.

In the aforementioned mode keys 41 to 43 and function keys 51 to 55 as well as the main keys 21 to 35, a mode or a function, defined at the top hale-area or the bottom half-area of each of the keys 41 to 43 and 51 to 55, is chosen by using the point touch input and the bar touch input.

The bottom half-area of the function key 51 is allocated two functions for "変換(conversion)" and "スペース(space)". The function key 51 is operated as the "変換(conversion)" key with the point touch before the inputted character is defined by converting into a kanji or the like, but the function key 51 is operated as the "スペース(space)" key with the point touch after the inputted character is defined, in which "変換(conversion)" and "スペース(space)" can be inputted without the change of the input operations.

Figure 10:
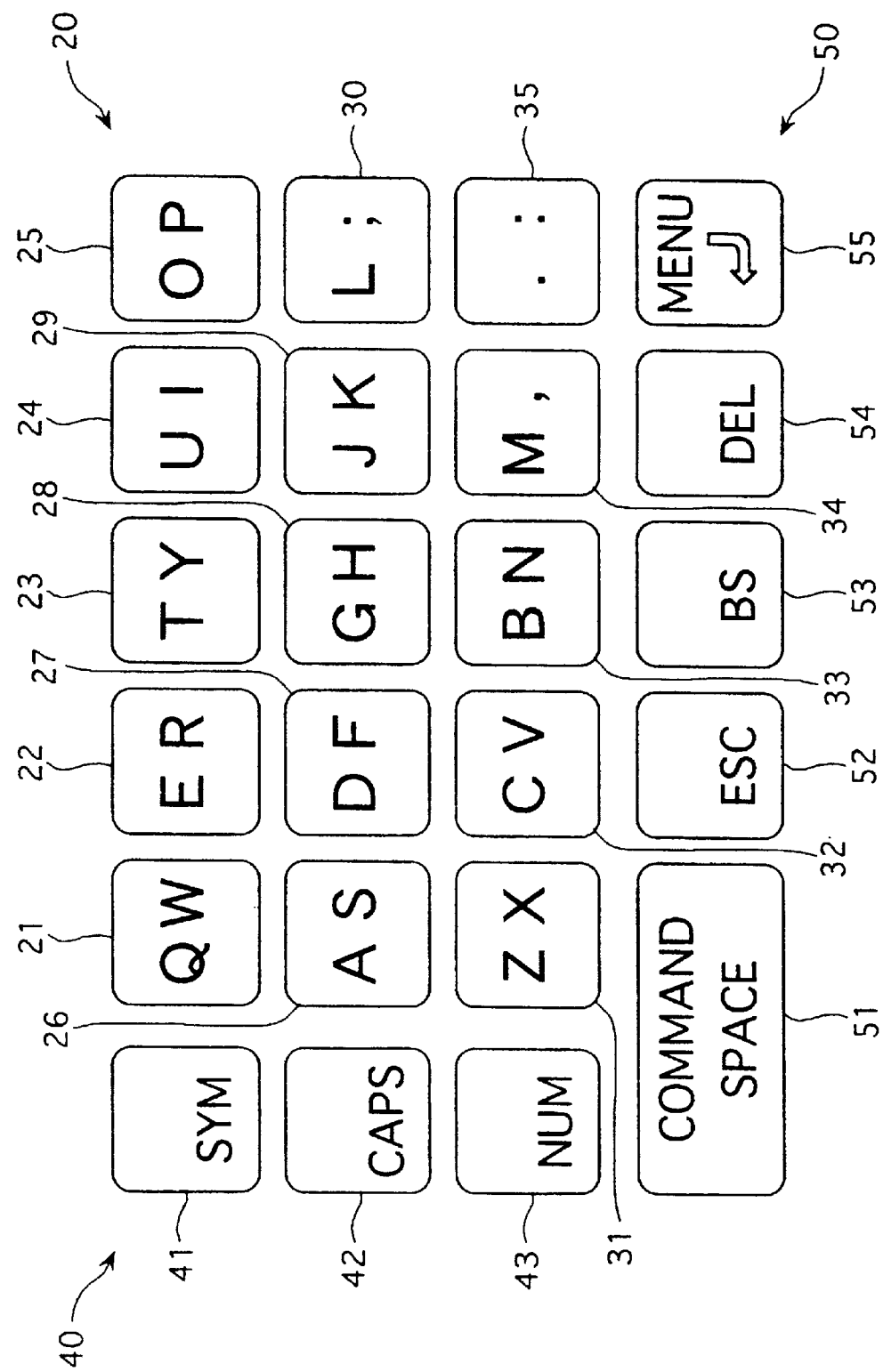
FIG. 10 is a plane view showing an English key arrangement of the screen display key input unit of the second embodiment.

In the English key arrangement of the embodiment as shown in FIG. 10, the mode key area 40 is also arranged adjacent to the left side of the main key area 20 and the function key area 50 is arranged under the main key area 20.

The arrangement of the main keys 21 to 35 of the main key area 20 is the same as the English key arrangement of the aforementioned first embodiment shown in FIG. 3.

The mode key area 40 has a SYM (SYMBOL) key 41 for changing the main key area 20 into a symbol key arrangement, a CAPS key 42 changing the inputted mode into one of a capital letter input or a small letter input, and a NUM key 43 for changing the main key area 20 into a digit key arrangement.

The function key area 50 has five keys 51 to 55. The key 51 is allocated a "SPACE" key for inputting a space and a "COMMAND" key for an enhanced function, the key 52 is allocated an "ESC" key, the key 53 is allocated a "BS" (back space) key, the key 54 is allocated a "DEL" (delete) key and the key 55 is allocated a "RETURN" key and a "MENU" key.

Each of the function keys 51 and 55, respectively defined with the two functions, are discriminated by the different input operation between the point touch and the bar touch in a similar way of the main keys 21 to 35.

According to the second embodiment having the key arrangement shown in FIG. 9 and FIG. 10 as described thus far, the function key area 50 is provided with the function keys 51 to 55 allocated various functions, the space key and so on, so that various functions, used in the English input or the Japanese input, can be respectively carried out by only touching the keys 51 to 55, resulting in the improved input operational ease.

Further, owing to the mode key area 40 provided with the mode keys 41 to 43 for changing the key arrangements of the main key area 20 or the like, the input of a digit, a symbol or the like can be efficiently carried out.

The third embodiment according to the present invention will be explained below.

The embodiment employs a combined arrangement, in which the key areas of the main keys 21 to 35 in the main keys area 20 are respectively allocated two types of a symbol for the digit key arrangement and a symbol for the symbol key arrangement, in addition to alphabets and symbols of a comma, a period and so on. Incidentally, the description of the same or similar components as those in the first and second embodiments will be omitted or simplified.

Figure 11:
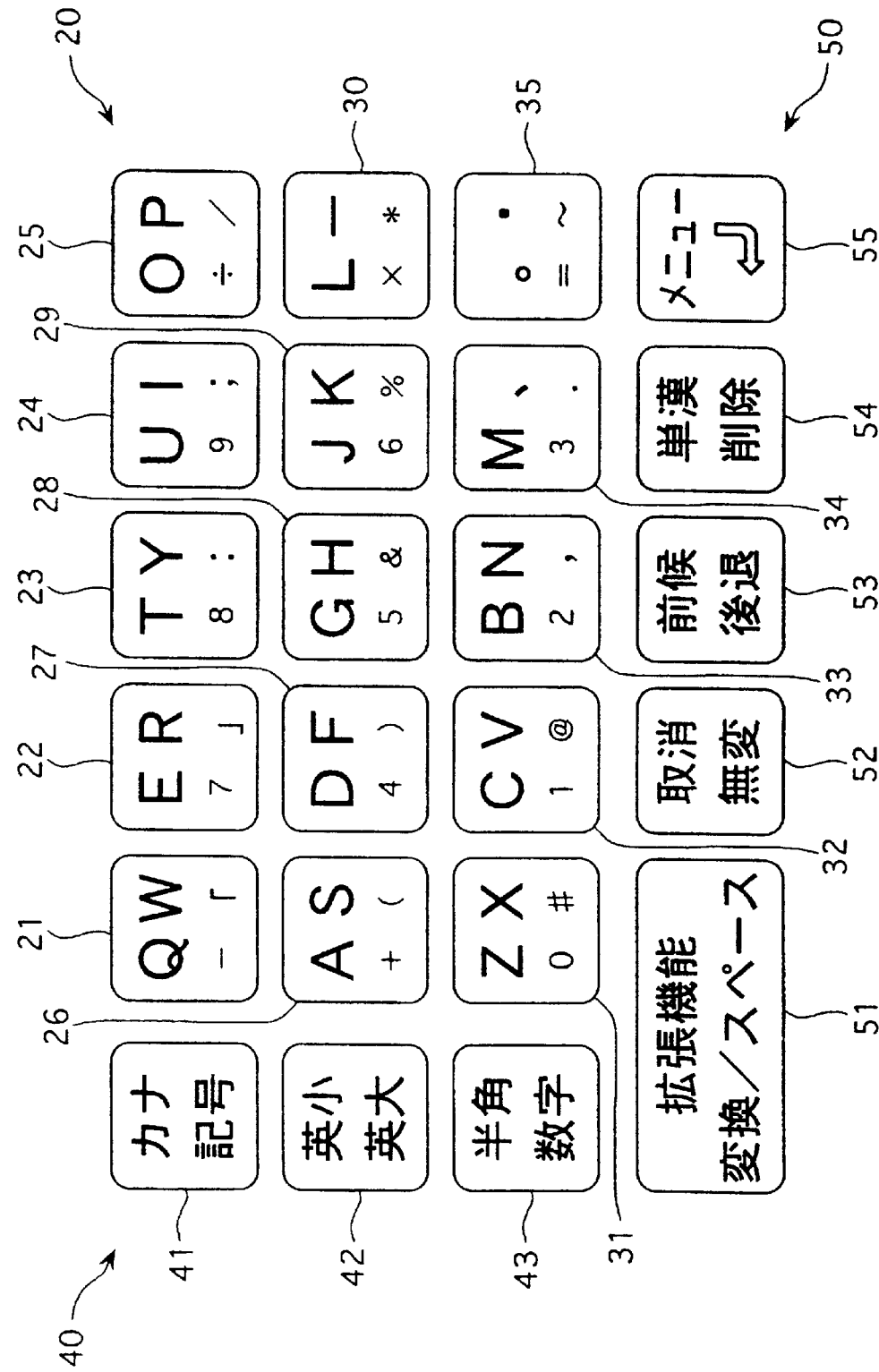
FIG. 11 is a plane view showing a Japanese key arrangement of the screen display key input unit of the third embodiment according to the present invention.

In the Japanese combined arrangement in the embodiment as shown in FIG. 11, each of symbols of the digit key arrangement and the symbol key arrangement are shown on each of the main keys 21 to 35 of the main key area 20.

The bottom left quarter-area of each of the main keys 21 to 35 is allocated to show an arithmetic symbol and a digit as the symbol of the digit key arrangement, in which each of the keys 21 to 35 is defined with the graphic character code showing the symbol for the digit key arrangement as the third graphic character code.

The digit keys are shown in the central three files of the main key area 20, and the arithmetic symbols are shown in the rightmost file and the leftmost file. More specifically, the bottom left quarter-areas of the main keys 21 to 35 from the left to right in the top rank of the main key area 20 are respectively allocated to show a symbol "–" on the key 21, a digit "7" on the key 22, a digit "8" on the key 23, a digit "9" on the key 24 and a symbol "÷" on the key 25. The bottom left quarter-areas of the main keys 21 to 35 from the left in the middle rank are respectively allocated a symbol "+" on the key 26, a digit "4" on the key 27, a digit "5" on the key 28, a digit "6" on the key 29 and a symbol "×" on the key 30. And further, the bottom left quarter-area of the main keys 21 to 35 from the left in the bottom rank are respectively allocated to show a digit "0" on the key 31, a digit "1" on the key 32, a digit "2" on the key 33, a digit "3" on the key 34 and a symbol "=" on the key 35.

The bottom right quarter-areas of each of the main keys 21 to 35 are allocated to show various symbols, such as a bracket or the like, for the symbol key arrangement, in which each of the keys 21 to 35 is defined with the graphic character code for showing each symbol of the symbol key arrangement as the fourth graphic character code.

More specifically, the bottom right quarter-areas of the main keys 21 to 35 from the left to the right in the top rank of the main key area 20 are respectively allocated to show a bracket symbol "[" on the key 21, a bracket symbol "]" on the key 22, a colon symbol ":" on the key 23, a semicolon symbol ";" on the key 24 and the symbol "/" on the key 25. The bottom right quarter-areas of the main keys 21 to 35 from the left in the middle rank are respectively allocated to show a bracket symbol "(" on the key 26, a bracket symbol ")" on the key 27, an and symbol "&" on the key 28, a percent symbol "%" on the key 29 and an asterisk symbol "*" on the key 30. And further, the bottom right quarter-areas of the main keys 21 to 35 from the left in the bottom rank are respectively allocated to show a sharp symbol "#" on the key 31, a qualifying symbol "@" on the key 32, a comma symbol "," on the key 33, a period symbol "." on the key 34 and the symbol "~" on the key 35.

The mode keys 41 to 43 and the function keys 51 to 55 are the same as the Japanese key arrangement of the second embodiment shown in FIG. 9, so that the description will be omitted.

Figure 12:
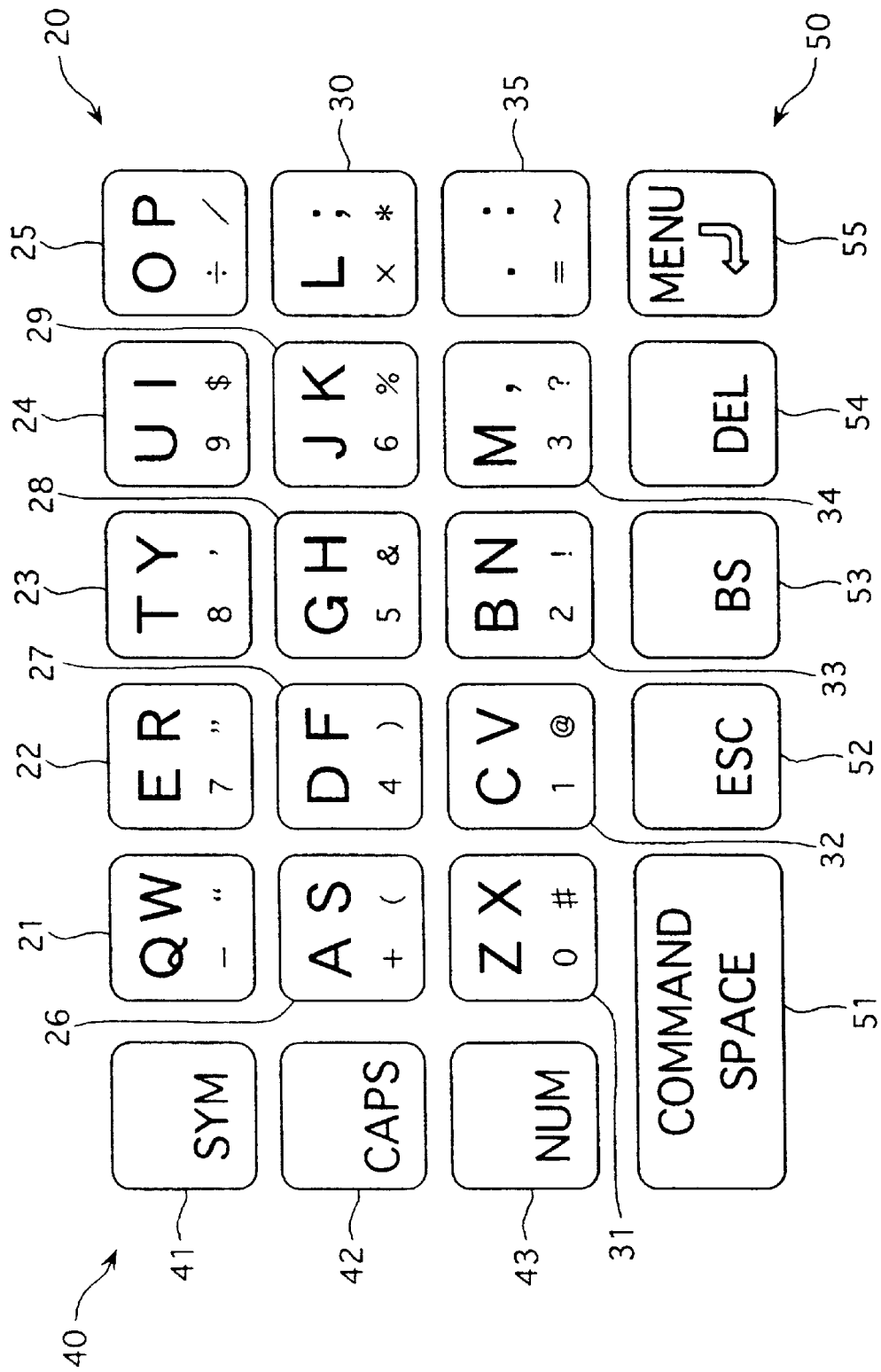
FIG. 12 is a plane view showing an English key arrangement on the screen display key input unit of the third embodiment.

In the English combined arrangement of the embodiment as shown in FIG. 12, the bottom left quarter-areas of the main keys 21 to 35 in the main key area 20 are respectively allocated the arithmetic symbols and digits as a symbol of the digit key arrangement and the bottom right quarter-areas are allocated symbols of the symbol key arrangement, in which the third and fourth graphic character codes are defined on each of the keys 21 to 35.

The digit key arrangement is the same as the Japanese combined arrangement of FIG. 11. That is to say, the bottom left quarter-areas of the main keys 21 to 35 are allocated to show the symbol "–" on the key 21, the digit "7" on the key 22, the digit "8" on the key 23, the digit "9" on the key 24, the symbol "." on the key 25, the symbol "+" on the key 26, the digit "4" on the key 27, the digit "5" on the key 28, the digit "6" on the key 29, the symbol "×" on the key 30, the digit "0" on the key 31, the digit "1" on the key 32, the digit "2" on the key 33, the digit "3" on the key 34 and the symbol "=" on the key 35.

As to the symbol key arrangement, the symbols used in English are allocated instead of the symbols used in Japanese.

More specifically, the bottom right quarter-areas of the main keys 21 to 35 from the left to the right in the top rank of the main key area 20 are respectively allocated to show a bracket symbol """ on the key 21, a bracket symbol """ on the key 22, a bracket symbol """ on the key 23, a dollar symbol "$" on the key 24 and a symbol "/" on the key 25. The bottom right quarter-areas of the main keys 21 to 35 from the left in the middle rank are respectively allocated to show a bracket symbol "(" on the key 26, a bracket symbol ")" on the key 27, an and symbol "&" on the key 28, a percent symbol "%" on the key 29 and an asterisk symbol "*" on the key 30. And further, the bottom right quarter-areas of the main keys 21 to 35 from the left in the bottom rank are respectively allocated to show a sharp symbol "#" on the key 31, a qualifying symbol "@" on the key 32, a qualifying symbol "!" on the key 33, a question symbol "?" on the key 34 and a symbol "~" on the key 35.

The mode keys 41 to 43 and the function keys 51 to 55 are the same as the English key arrangement of the second embodiment shown in FIG. 10, so that the description will be omitted.

In the embodiment as described thus far, each of the main keys 21 to 35 are allocated four forms of a character, a symbol and a digit, therefore, the touch input operations of four types are properly used by the pen 15, and the criterion means 73 confirms the difference of the types of the touch input operation to input each of the letter (character), the symbol and digit, namely, the first to fourth graphic character codes.

Figure 13:
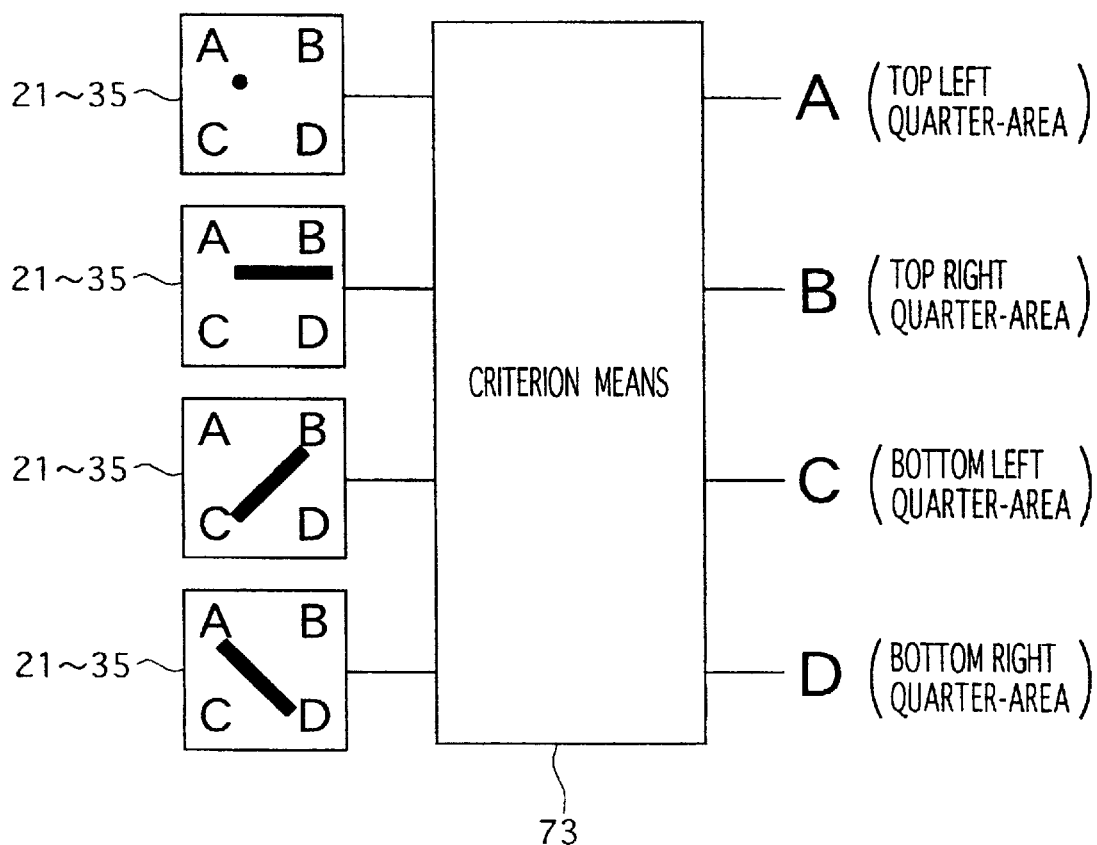
FIG. 13 is an explanatory view for an operation of the criterion means of the screen display key input unit in the third embodiment.

As shown in FIG. 13, the criterion means 73 detects the difference of the operations when the pen 15 touches each of the keys 21 to 35, and judges that any one of the top left quarter-area (Letter "A" in FIG. 13), the top right quarter-area (Letter "B" in FIG. 13), the bottom left quarter-area (Letter "C" in FIG. 13) and the bottom right quarter-area (Letter "D" in FIG. 13) of each of the keys 21 to 35 is selected.

Figure 14:
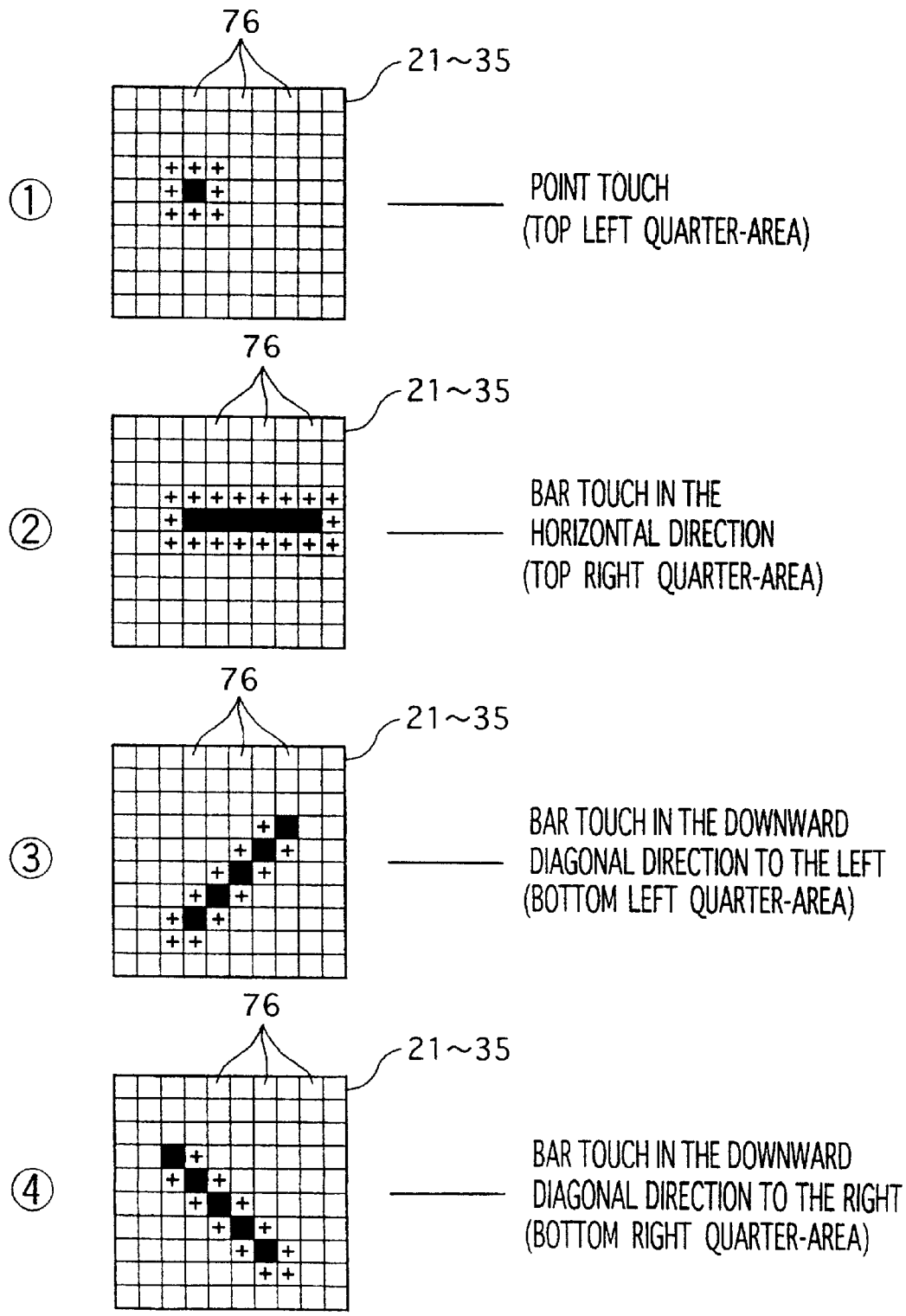
FIGS. 14①, ②, ③ and ④ are explanatory views for the determining method of the touch input in the third embodiment.

Four decision criterion in the touch operation are visually shown, for example, in FIG. 14.

The decision criterion shown in FIG. 14 is that the input operation is determined whether every pixels 76 forming the respective keys 21 to 35 are touched or not. Where 100 pixels 76 are arranged in a grid 10 lengthwise and 10 widthwise in each display area of the keys, as shown in FIG. 14①, the criterion means 73 determines to be inputted with the point touch when the pen 15 touches the pixels 76 of less than the predetermined number of pixels in each display area of the keys 21 to 35, for example, one of the pixels 76 in each display area of the keys 21 to 35 or the pixels 76 of the initial pixel 76 and at least one of the pixels 76 positioned around the initial pixel 76 (the pixels 76 illustrated with "+" in FIG. 14)(when the pixel is touched with the pointer), and further, the criterion means 73 determines, as shown in FIG. 14②, to be inputted with the bar touch in the horizontal direction when the more than four pixels 76 aligned in the horizontal direction are touched (when the pixels are touched to draw a bar of a hyphen "-").

As shown in FIG. 14③, when the more than four pixels 76 are continuously touched from the upper right to the lower left, the criterion means 73 determines to be inputted with the bar touch in a downward diagonal direction to the left, and further, as shown in FIG. 14④, when the more than four pixels 76 are continuously touched from the upper left to the lower right, the criterion means 73 determines to be inputted with the bar touch in a downward diagonal direction to the right. The character generation means 74 outputs the character allocated each top left quarter-area of the keys 21 to 35 (the first graphic character code) provided that the criterion means 73 confirms the point touch, the character allocated each top right quarter-area of the keys 21 to 35 (the second graphic character code) provided that the bar touch in the horizontal direction is confirmed, the character allocated each bottom left quarter-area of the keys 21 to 35 (the third graphic character code) provided that the bar touch in the downward diagonal direction to the left is confirmed, and the character allocated each bottom right quarter-area of the keys 21 to 35 (the fourth graphic character code) provided that the bar touch in the downward diagonal direction to the right is confirmed.

Each of the bar touches, carried out in the various direction, may be discriminated from one another by being determined from the touching direction (the moving direction) of the pen 15 based on the period of time and the positions of the pixels 76 touched with the pen 15. In the embodiment, however, it is needed to be discriminated the bar touches in only the three directions of the horizontal direction and the downward diagonal directions to the left and the right, so that the bar touch can be discriminated with only the positional relation among each of the pixels 76 touched with the pen 15, resulting in a disadvantage of a simple process.

According to the embodiment, a digit and a symbol as well as an alphabet can be defined on each of the main keys 21 to 35, and further the first to fourth graphic character codes defined in each of the keys 21 to 35 can be smoothly selected by slightly changing the operations for inputting the digit or the symbol with the pen 15. Therefore, in order to input the digit or the symbol, a changing input with a shift key or a mode key is not needed, resulting in the improved operational ease.

Especially, in the input of the digit or the symbol little-used in sentences mainly inputted with letters, the digit or the symbol can be inputted without changing the modes, thus enhancing the operability.

In the continuous input of the digit the symbol or the like, the main key area 20 can be changed into the digit key arrangement or the symbol key arrangement by touching the mode keys arranged on the left side of the main key area 20.

Each of the keys 21 to 35 is defined with multiple information of the character, the digit, the symbol and so on, so that the number of keys in the embodiment can be fewer than an area of arranging a digit key or a symbol key are provided in addition to the main keys 21 to 35, therefore, the distance moving the pen 15 is decreased and each size of the keys 21 to 35 is increased, thus further improving the operational ease. The input operations of the point touch and the bar touches in the right direction, in the downward diagonal direction to the left and in the downward diagonal direction to the right, which are carried out with the pen 15, are much different from one another, so that an error operation can be avoided because the criterion means 73 can simply detect the difference, resulting in the infallible input of the characters and the like.

The digit keys are arranged in the central three files of the main key area 20 in order of 0 to 9 from the bottom rank like a usual pocket calculator, so that the input in a calculating operation can be carried out with the same operation as the usual pocket calculator, resulting in the improved operational ease.

The symbol key arrangement, in which the symbols allocated each bottom right quarter-area of the keys 21 to 35, is different between the Japanese combined arrangement of FIG. 11 and the English combined arrangement of FIG. 12, in which the symbols used frequently in the inputs of English and Japanese are each arranged, resulting in the improved operational ease in the symbol input.

The fourth embodiment according to the present invention will be explained below.

Figure 15:
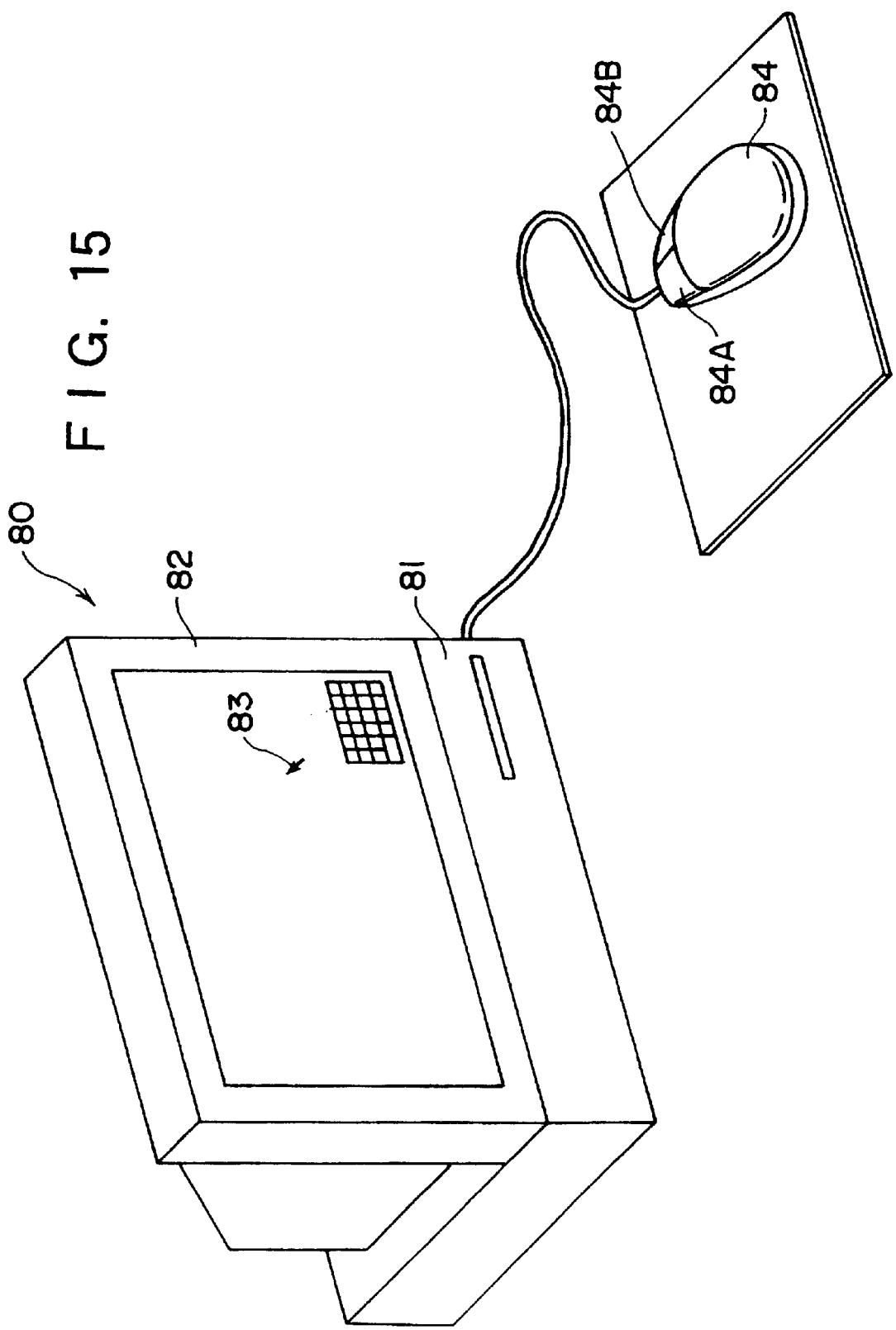
FIG. 15 is a perspective view showing the screen display key input unit in the fourth embodiment according to the present invention.

As shown in FIG. 15, the embodiment employs a screen display key input unit 80 of a desk-top personal computer, including a main body 81 and a display 82, and, as the key input means, a mouse 84, which is one example of the pointer input means for selectively inputting each of the keys 21 to 35, arranged in the key input area 12 shown on the display 82, by moving a pointer 83 shown on the display 82, is used.

In the embodiment, the key arrangement described in the first to third embodiments can be opportunely applied, but a selecting method of each of the characters, the symbols, the digits and so on is employed with a method capable of making the best use with the feature of the mouse 84.

Figure 16:
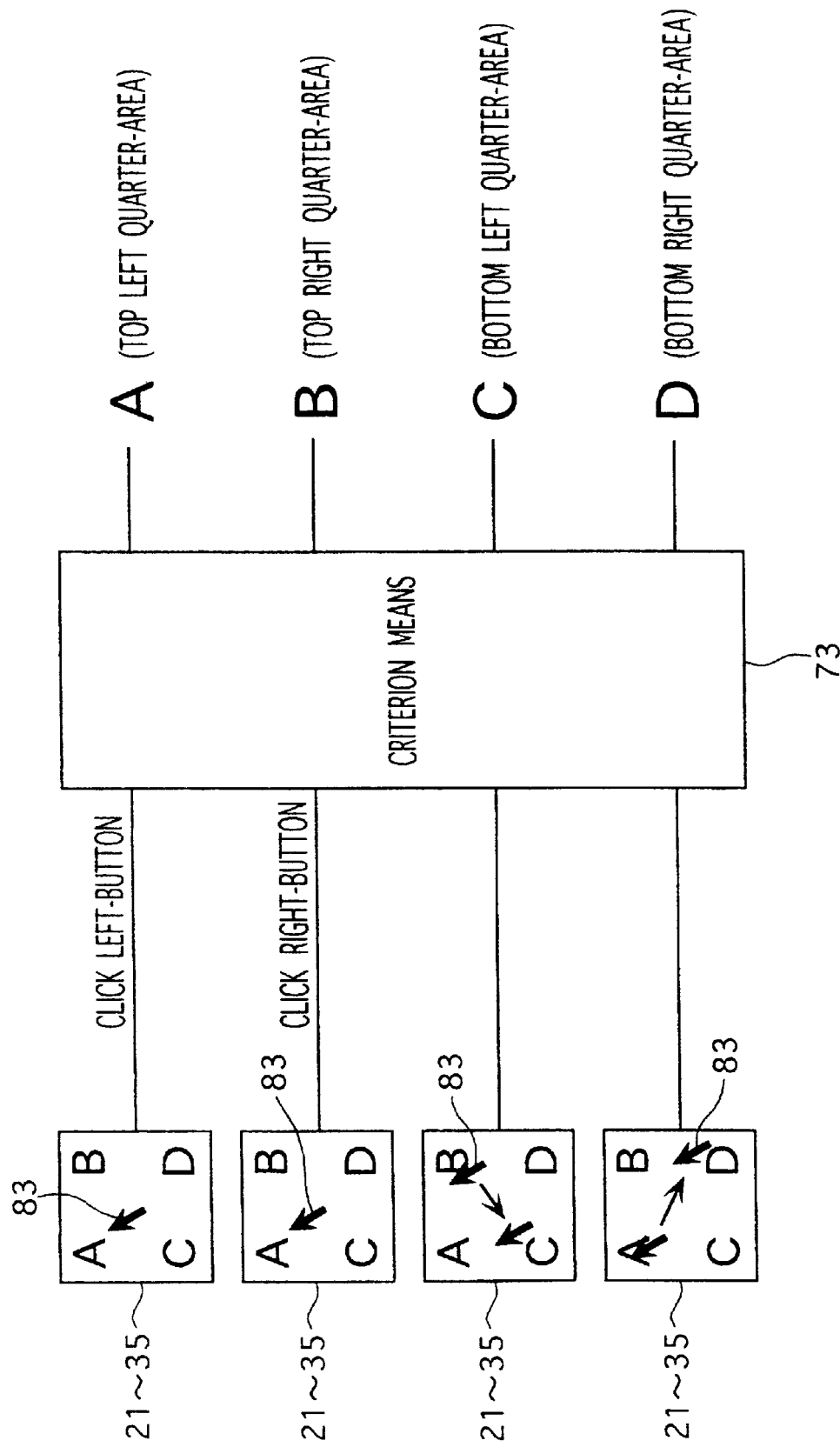
FIG. 16 is an explanatory view for the operation of the criterion means of the screen display key input unit in the fourth embodiment.

In other words, when four character information of a character (letter), a digit and a symbol are displayed by defining the first to fourth graphic character codes on one key like the third embodiment, as shown FIG. 16, provided that a left button 84A of the mouse 84 is clicked (an operation for pushing the button) while the pointer 83 is placed on the keys 21 to 35, the criterion means 73 detects the clicking and the character generation means 74 outputs a character (the first graphic character code) positioned on each top left quarter-area of the keys 21 to 35 (Letter "A" in FIG. 16), and provided that a right button 84B of the mouse 84 is clicked, the criterion means 73 detects the clicking and the character generation means 74 outputs a character (the second graphic character code) positioned on each top right quarter-arca of the keys 21 to 35 (Letter "B" in FIG. 16).

While the left button 84A or the right button 84B of the mouse 84 is being pushed, provided that the pointer 83 is moved in a downward diagonal direction to the left (dragging is carried out in the downward diagonal direction to the left) in each area of the keys 21 to 35, the character generation means 74 outputs a character (the third graphic character code) positioned on each bottom left quarter-area of the keys 21 to 35 (Letter "C" in FIG. 16), and provided that dragging is carried out in a downward diagonal direction to the right, the character generation means 74 outputs a character (the fourth graphic character code) positioned on each bottom right quarter-area of the keys 21 to 35 (Letter "D" in FIG. 16).

In the embodiment described thus far, four character information of a letter (character), a digit, a symbol and so on can be inputted by slightly changing the input operations with the mouse 84, resulting in the improved operational ease.

Furthermore, in the use of the mouse 84, the input of alphabets used frequently, namely, the input of each top left quarter-area and each top right quarter-area of the keys 21 to 35, can be carried out by clicking each of the right and left buttons 84A and 84B, resulting in the great improved operational ease.

Where the key arrangement of the first or second embodiment is employed in the embodiment, the input can be changed by only clicking the right or left button 84A or 84B.

In the use of the mouse having only one button, the character input of the top right quarter-area, inputted by clicking the right button 84B, is carried out by double-clicking the button (pushing the button twice in short intervals) or may be carried out by dragging the pointer 83 in the horizontal direction like the input with the pen 15.

Figure 17:
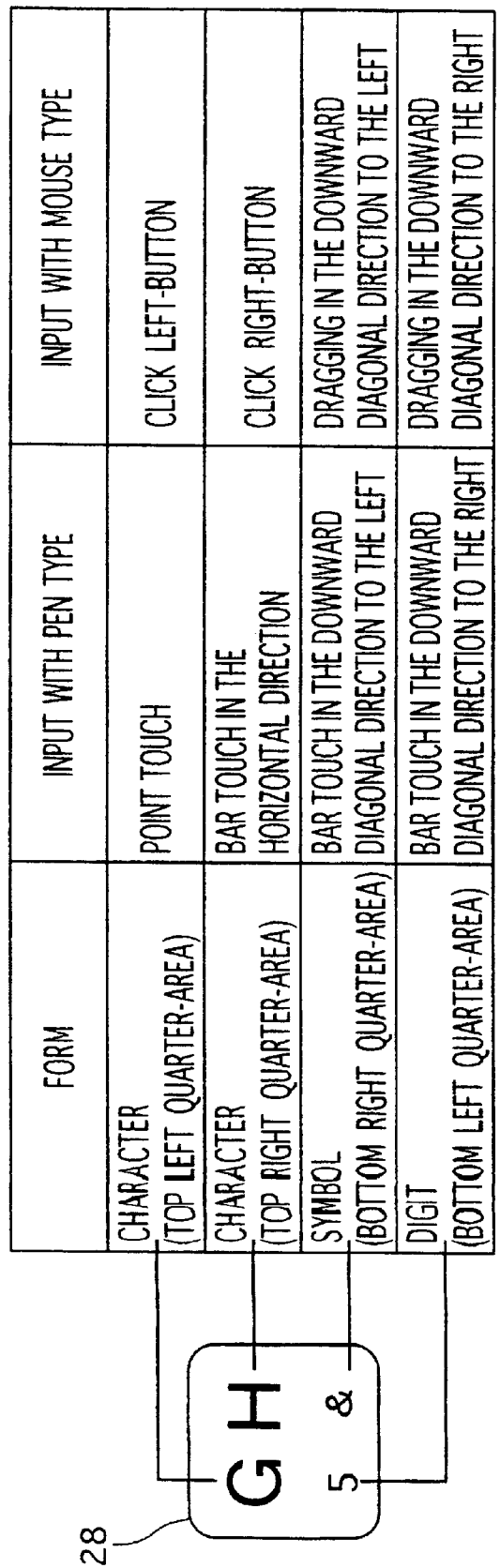
FIG. 17 is a diagram showing the input operations of each screen display key input unit of the third and fourth embodiments.

FIG. 17 is summary of the input changing method of four forms of the character, the digit and the symbol, which is carried out with the pen 15 and the mouse 84 in the third and fourth embodiments.

Figure 18:
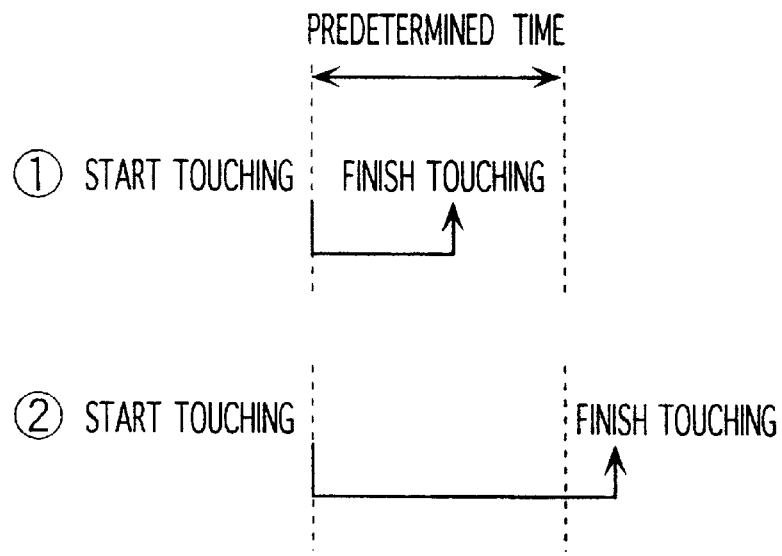
FIGS. 18①and ② are explanatory views for a modification of the touch input operation for the screen display key input unit of the present invention.

In the first to fourth embodiments described thus far, any one of the characters positioned on each left half-area and each right half-area of the main keys 21 to 35 is selected by discriminating between the selection operations based on a period of time while each of the keys 21 to 35 is touched as shown in FIG. 18 instead of the decision criterion with the moving distance of the pen 15.

More specifically, the criterion means 73 can be structured to determine that, as shown FIG. 18①, the left half-area of any touched key of the keys 21 to 35 is selected when the predetermined time is longer than the actual time while the pen continuously touches (pushes) one of the keys 21 to 35, and that, as shown in FIG. 18②, the right half-area of the touched key of the keys 21 to 35 is selected when the predetermined time is shorter than the actual time while the pen 15 touches.

Even when the decision is carried out by using the touching period of time as described above, by slightly changing the touch operation with the pen 15 like the aforementioned embodiment, two types of the operation can be carried out, so that one of the character and the symbol, which are defined at the left and right half-areas of each of the keys 21 to 35, is selectively inputted with the simple operation, resulting in the improved operational ease.

By structuring to be opportunely adjusted with the time for the criterion of the touch by an operator of the input unit 1, although the period of the time for pushing is different by the usage of each operator, it is precisely determined which character input operation is carried out.

The input of the four forms of the character, the digit and the symbol like the third embodiment can be carried out by defining the touching period of time in four stages.

Figure 19:
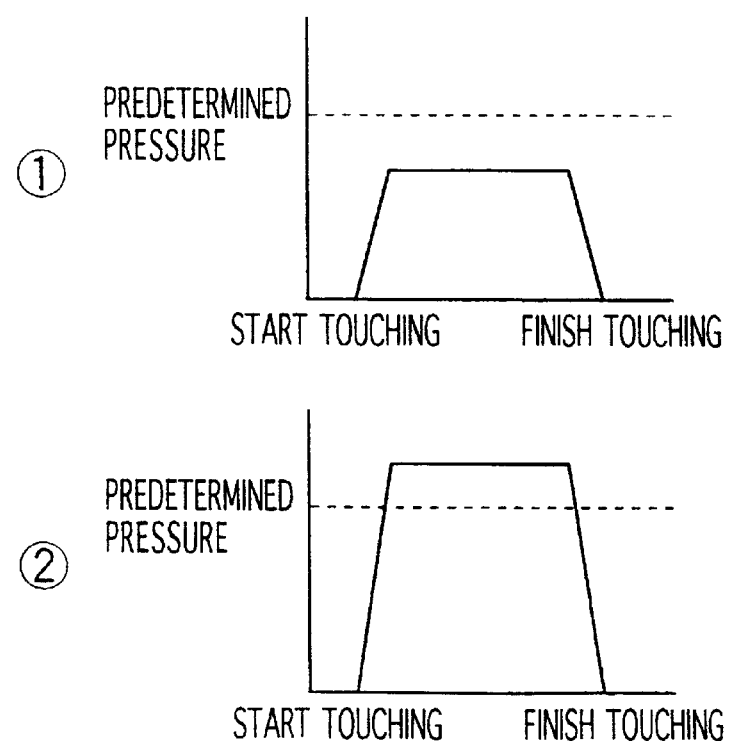
FIGS. 19①and ② are explanatory views for another modification of the touch input operation for the screen display key input unit of the present invention.

As shown in FIG. 19, the criterion means 73 determines whether a touched pressure is less than a predetermined pressure (FIG. 19①) or more than the predetermined pressure (FIG. 19②) to confirm the difference among the key touch operations with the pen 15, thereby the character input operation may be selected.

With dividing each area of the keys 21 to 35 into two areas in the horizontal direction or into four areas in the vertical and horizontal directions, the criterion means 73 judges which area of the divided areas is touched, thereby the character input operation may be selected.

Figure 20:
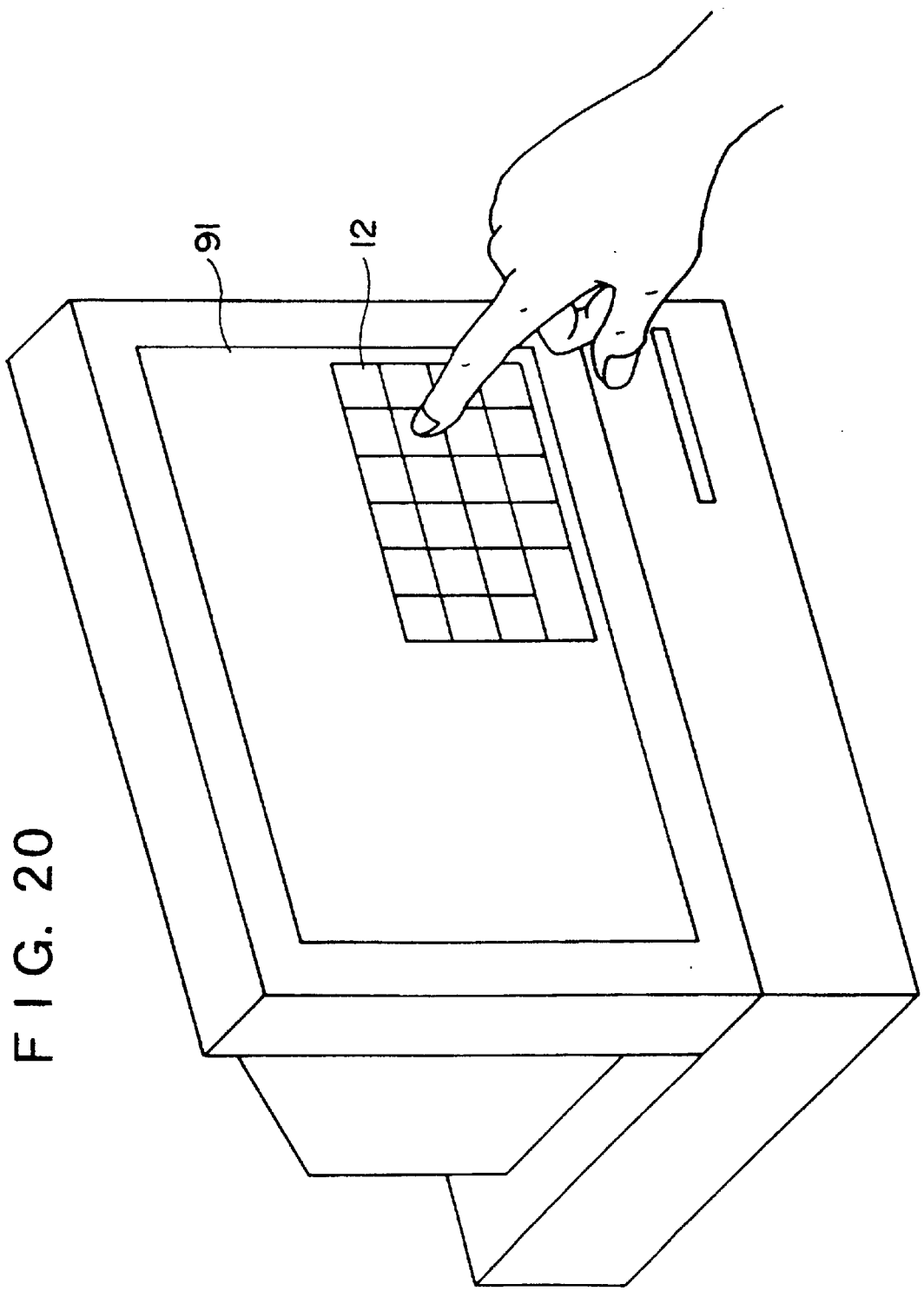
FIG. 20 is a perspective view showing a modification of the screen display key input unit according to the present invention.

As the touch input means, instead of the pen input means carried out by using the pen 15, as shown in FIG. 20, a touch screen input means, in which a finger or the like touches the key input area on a screen 91, may be employed.

Incidentally, as means for confirming the touch of the pen 15 or a finger in the touch input means, various means of an electrostatic capacity type, an optical type, a resistance type or the like can be used in response to a type of the screen, therefore, the aforementioned touch input means may be opportunely selected in response to the confirming means.

As the key input means is not limited to use the touch input means carried out by using the pen 15 or a touch screen, but may be used with the pointer input means carried out by using the mouse 84.

Figure 21:
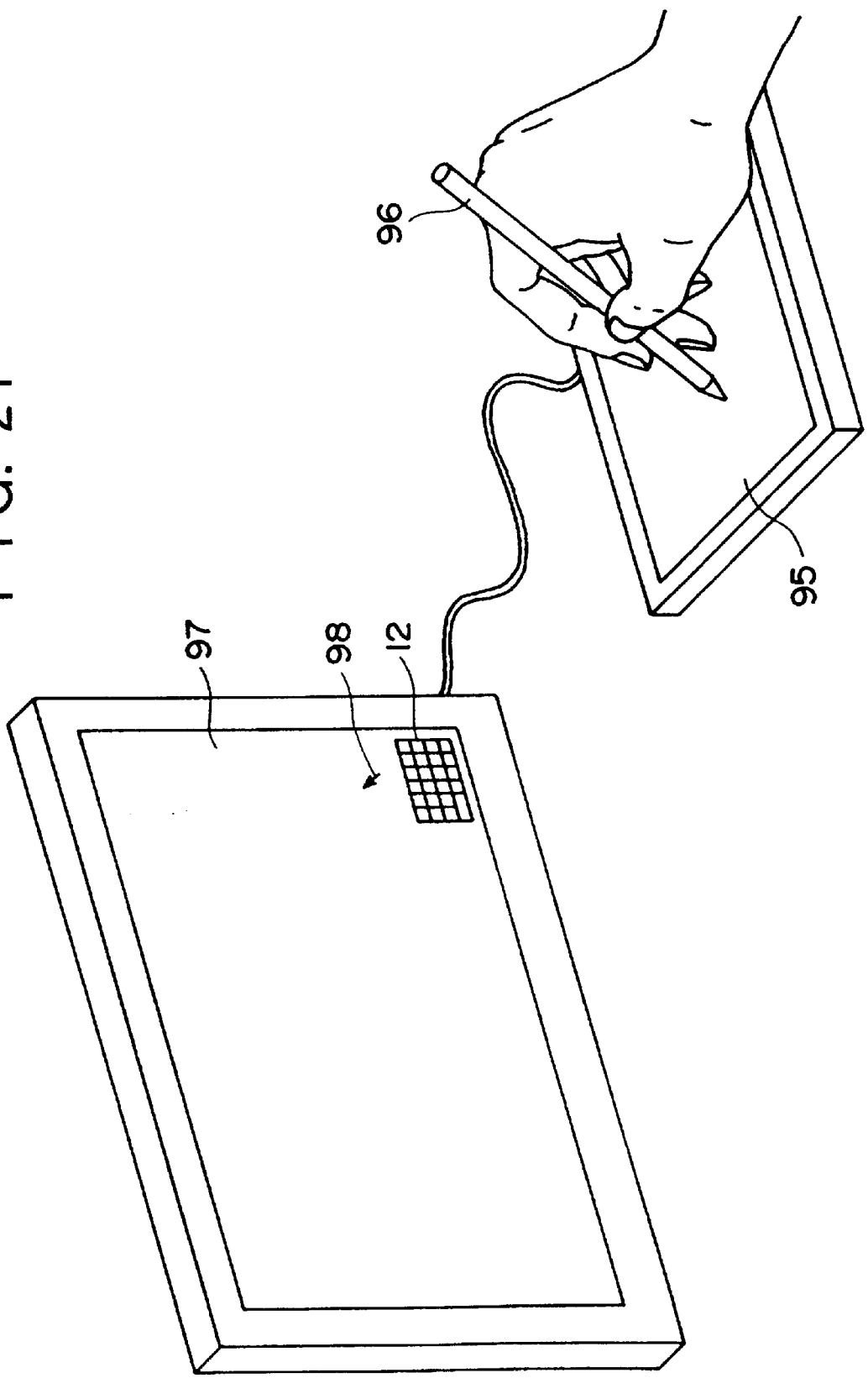
FIG. 21 is a perspective view showing another modification of the screen display key input unit according to the present invention.

As the pointer input means, as shown in FIG. 21, a tablet input means, in which a pointer 98 shown on a screen 97 is moved by touching a pad 95 with a pen 96, may be used. And further, various input units, which has a button or a function corresponding to the button, and which is capable of moving the pointer shown on the screen, can be used. For example, a trackball having similar functions to the mouse 84, a pad type operated by being touched on the pad with a finger, a joystick, a control pad for a game machine, and so on.

Here, where more than three buttons are provided, the pointer input means can be defined to input the characters and the like with the button operation instead of the dragging operation. For example, where the three buttons are provided, insofar as the four forms of the character, the digit, the symbol and so on are defined on each of the keys 21 to 35 as described in the third embodiment, the character, the digit and so on, positioned on the top left quarter-area, the top right quarter-area and the bottom left quarter-area of each of the keys 21 to 35, are inputted by using each button click, and the symbol positioned on the bottom right quarter-area can be inputted by using the dragging operation.

Where more than four buttons are provided as the control pad of the game machine, the pointer input means may be defined to input the character, the digit, the symbol and so on, positioned on the top left and right quarter-areas and the bottom left right quarter-areas of each of the keys 21 to 35, by pushing each button without the dragging operation.

By increasing the character and the like inputted with only the clicking operation by increasing the number of buttons as described above, the input operation can be carried out easier and with more certain discrimination than the input operation including the dragging operation, and the criterion means 73 can smoothly determine the input, with the result that the key input unit can be provided at small cost.

The aforementioned embodiment is structured to show the character and the like of two or four forms on each of the keys 21 to 35, but may be structured to input by showing the character and the like of more than three or more than five forms.

When the characters and the like of more than five forms are displayed, the moving direction of the pen 15 or the like may be determined in the touch input means with the pen 15 or the like. For example, the input operation is defined to be five types to be determined with the point touch and with the four movements in upward, downward, rightward and leftward directions or in upward and downward diagonal directions to the left and the right. As another example, the input operation can be defined to be nine types to be determined with the point touch and with the eight movements in the upward, downward, rightward, leftward directions and in the upward and downward diagonal directions to the left and the right.

In the use of the point input means with the mouse and the like, the input operation may be defined to be more than five types by changing the button operations, caused by double-clicking and the like, in addition to the clicking of each button or by defining the dragging direction to be maximum eight movements in the upward, downward, rightward, leftward directions and the upward and downward diagonal directions to the left and the right as in the case of the use of the pen 15.

Owing to a practical realization of the input operation of more than five types as described above, the larger number of characters, digits, symbols and so on can be defined on each of the keys 21 to 35, resulting in the further improved operational ease.

In the keys 21 to 35 of the main key area 20, the form and the arrangement of the symbols or the digits excepting alphabets are not limited to the aforementioned embodiments, but, for example, the character, the symbol or the like, used frequently, can be opportunely defined in dependence upon the sort of the used languages.

The digit keys are arranged in the central three files in the third embodiment, but can be arranged in the three files from the leftmost file or the rightmost file. Further, the digit key arrangement may be arranged in order 1–9, 0 from the top rank in correspondence to an arrangement on a telephone. Especially, when a telephonic function is incorporated with a portable remote terminal or the like, the telephonic operational ease can be improved by using the aforementioned telephonic arrangement.

When the present invention is applied to a data input unit for an information machine or a game machine using a television as a screen, a channel arrangement for the channel of television is displayed on the main keys 21 to 35 shown on the television screen, thereby the channel changing operation may be carried out with the screen display key input unit of the present invention.

In the aforementioned embodiments, another operation as the key input operation, in which each of the main keys 21 to 35 are touched, can be defined in addition to the aforementioned key input operation, thereby various functions may be performed.

For example, provided that the pen or the finger touches on each key area of the main keys 21 to 35 to shape "V" or the dragging with the mouse shapes "V", an alphabet positioned on the left half-area is directly inputted with a capital letter, and provided that the touch or the dragging is carried out to shape "opposite V", an alphabet positioned on the right half-area is directly inputted in a capital letter.

According to the aforementioned structure, it is easy to input an abbreviation and a proper noun, such as TV, VAN, NTT and so on, used in Japanese sentences or an alphabetic capital letter partially used in English sentences, such as the initial letters of a sentence, a proper noun and so on.

The fifth embodiment according to the present invention will be explained below with reference to the attached drawings.

Figure 22:
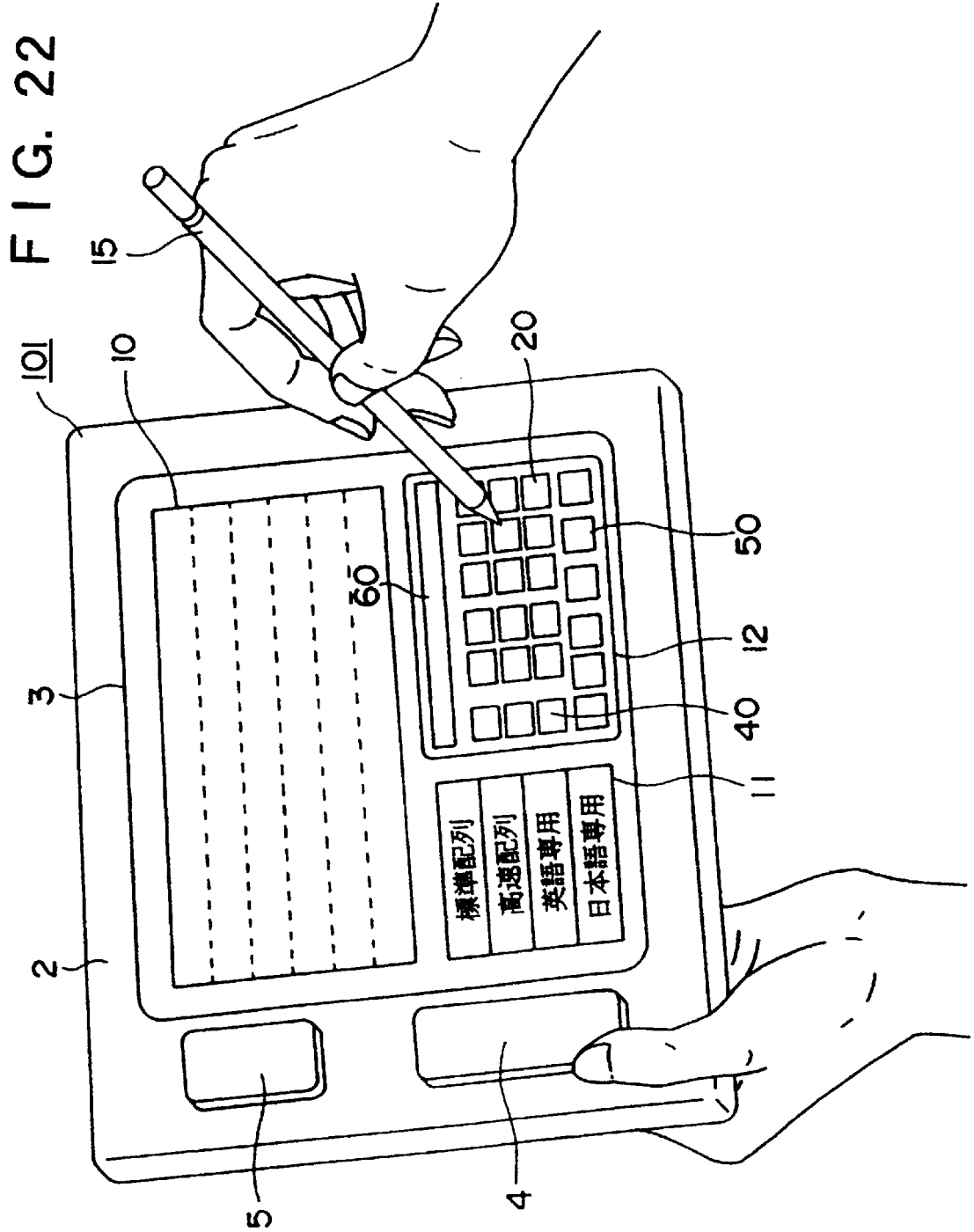
FIG. 22 is a perspective view showing a screen touch input unit of the fifth embodiment according to the present invention.

A screen display key input unit 101 in the fifth embodiment according to the present invention is illustrated in FIG. 22. The screen display key input unit 101 has a main body 2 provided with a liquid crystal display 3, a push-button 4 and a shift key 5 to be used as a portable remote terminal. The display 3 may be protected by a cover pivotally move with reference to the main body 2.

The liquid crystal display 3 has a data display area 10 to input characters and display data when the screen display key input unit 1 is used to operate word processor, spreadsheet, address book, electric mail or schedule function. The actual graphic format in the data display area 10 may be arranged based on the function in operation.

There is a selection menu 11 and a key input area 12 at a lower portion of the data display area 10. The selection menu 11 and the key input area 12 may be constantly displayed. But, in view of operability of the unit, it is preferable to pop up the selection menu 11 and the key input area 12 until using almost all of the data area 10 by designing the screen to have a key displaying menu and a key starting input operation.

The screen display key input unit 101 is further provided with a pen 15 as a touch means as shown in FIG. 22. The pen 15 may be held by a holder optionally provided to the main body, so that the pen 15 shall not be lost.

The actual operation of the screen display key input unit 101 is so carried out that the main body is taken by the left hand or put on a table and the pen 15 is hold by the right hand.

Figure 23:
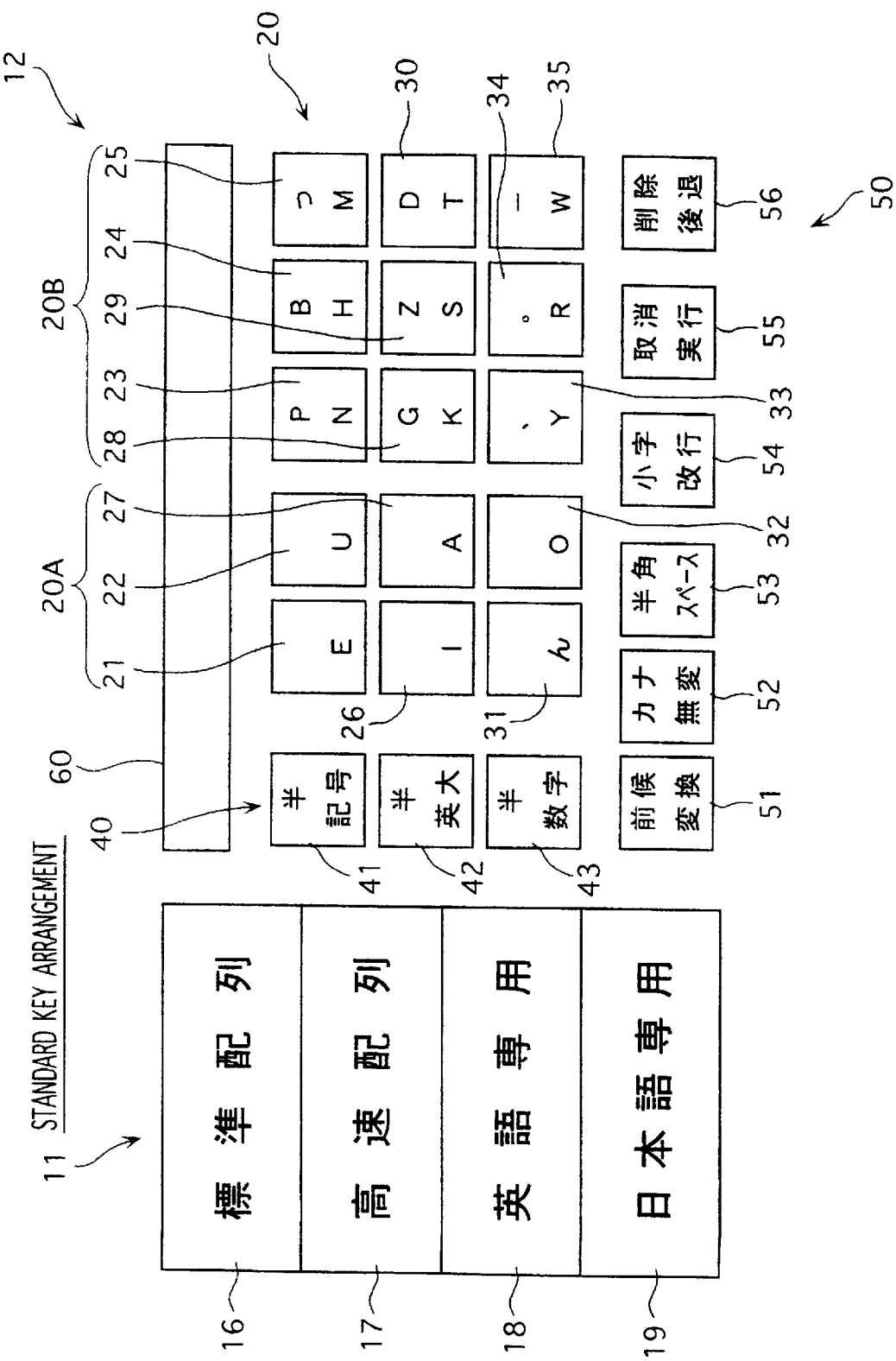
FIG. 23 is a plane view showing a standard key arrangement in the screen touch input unit.

The details of the key input area 12 is depicted in FIG. 23 in which there are a main key area 20, a change key area 40, a function key area 50 and an input line 60 showing inputted characters.

Figure 24:
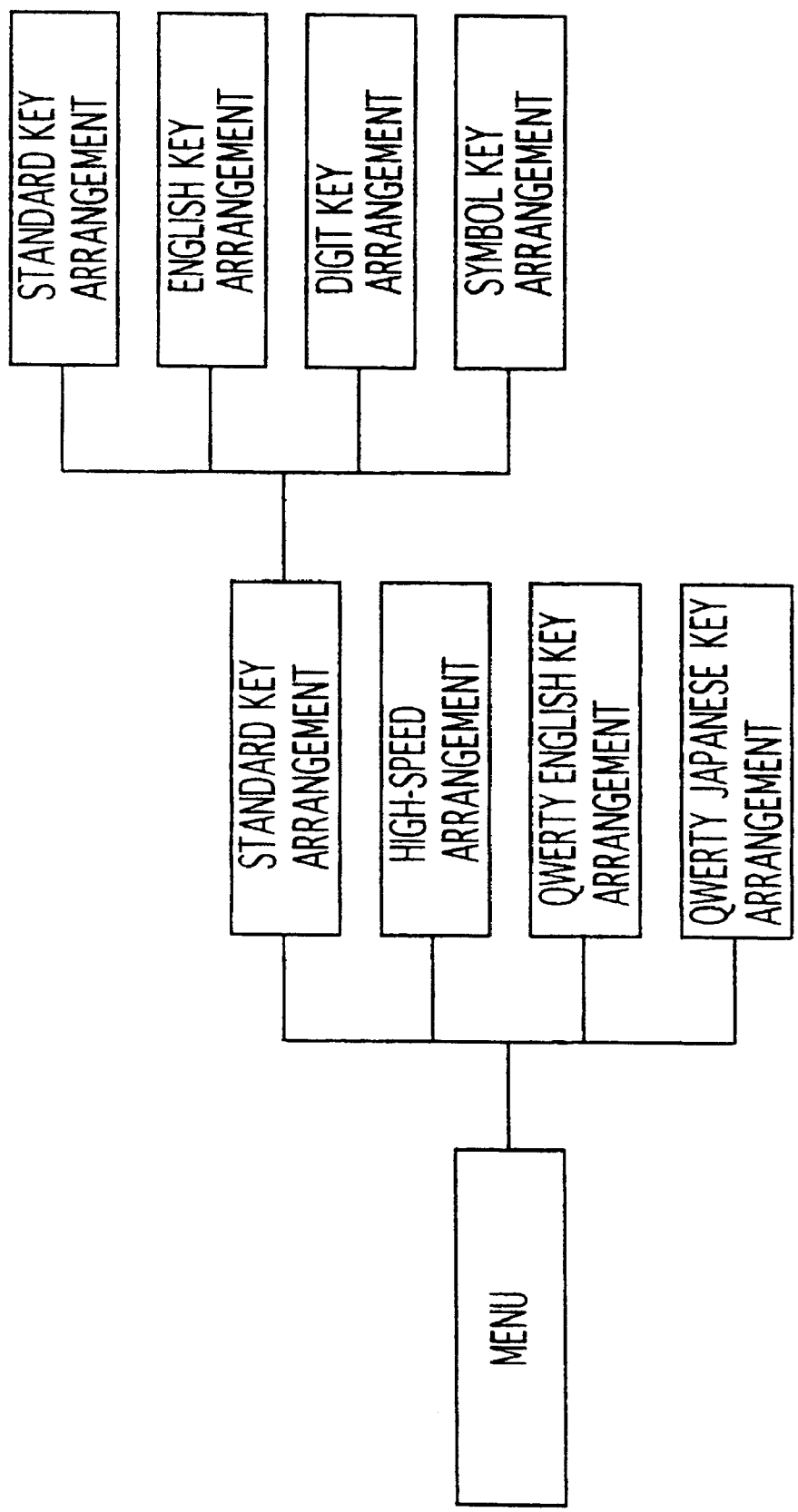
FIG. 24 is a block diagram showing a structure of the key arrangements of the screen touch input unit.

The aforementioned selection menu 11 has four menu keys of a standard key arrangement menu key 16 changing the definition of the main key area 20, the change key area 40 and the function key area 50 in the key input area 12 into a standard key arrangement, a high-speed arrangement menu key 17 changing the key areas 20, 40 and 50 in the key input area 12 into a high-speed arrangement, an English menu key 18 changing the key areas 20, 40 and 50 into a QWERTY English key arrangement, and a Japanese menu key 19 changing the key areas 20, 40 and 50 into a QWERTY Japanese key arrangement. The menu changing the key arrangements is structured with a hierarchized structure as shown in FIG. 24.

As to the standard key arrangement shown in FIG. 23, the fifteen main keys 21 to 35 are arranged in three ranks and five files in the main key area 20. Three change keys 41 to 43 are arranged in the change key area 40. And six function keys 51 to 56 are arranged in the function key area 50. As a result, the main key area 20 is arranged with 24 keys (soft-keys) in four ranks and six files, including the change keys 41 to 43 and the function keys 51 to 56.

The character key arrangement of the main key area 20 in the standard key arrangement is arranged in consideration of the used frequency of vowel and consonant of alphabets in the Roman character input, the easily memorized key positions, and the input efficiency with the pen 15. More specifically, the vowel key area and the consonant key area are arranged to be separated from each other in order to easily memorize the key arrangement. Further, in order to decrease the degree that the pen 15 is moved, the central portion of the main key area 20 is the best basic position of the pen, so that the vowel keys and the consonant keys are arranged in order of the used frequency, namely in order of easily typing, from the middle rank, the top rank and the bottom rank, and the keys arranged in each rank are arranged from the center toward the outside in the same reason.

Concretely, an area, composed of the keys arranged in the two files from one side of the main key area 20 (from the left side in the drawing), is defined as a vowel key area 20A for inputting the vowel, and an area, composed of the keys arranged in the other three files of the main key area 20, is defined as a consonant key area 20B for inputting the consonant.

As described below, each of the key 21, 22, 26, 27, 31 and 32 of the vowel key area 20A are allocated "A", "I", "U", "E", and "O" as the vowel sound and "ん)" as the syllabic nasal.

In the vowel keys, the keys 27 and 26 arranged in the middle rank are respectively allocated to input letters "A" and "I". The keys 22 and 21 arranged in the top rank are respectively allocated to input letters U" and "E". And the keys 32 and 31 are arranged in the bottom rank are allocated to input a letter "O" and the syllabic nasal character "がn)".

Therefore, a letter "A" used frequently is allocated the key 27, arranged in the middle rank and adjacent to the center of the main key area 20, and a letter "1" is allocated the key 26 adjacent to the key 27, thus enhancing the operational ease. Further, each of the keys "A", "I", "U", "E" and "O" are arranged in order of operability from the middle rank to the top rank and then the bottom rank. Thereby allowing the positions of the characters to be easily memorized.

Turning to the consonant key area 20B of the right three files are arranged with the consonant keys "K", "S", "T", "N", "H", "M", "N", "R" and "W" which show the consonant sound of Japanese. More concretely, the keys 28, 29 and 30 from the left to the right in the middle rank are respectively allocated to input "K", "S" and "T". The keys 23, 24 and 25 from the left to the right in the top rank are allocated to input "N", "H" and "M". And the keys 33, 34 and 35 from the left to the right in the bottom rank are allocated to input "Y", "R" and "W". The aforementioned arrangement is considered that the consonant sounds in "Ka", "Sa", "Ta", "Na", "Ha", "Ma", "Ya", "Ra" and "Wa" groups of the Japanese syllabary are arranged in order of syllables to start from the middle rank to the top rank and then the bottom rank, and further from the left to the right in each rank.

The consonant key arrangement as well as the vowel key arrangement is arranged in consideration of easy typing, the used frequency of alphabets in the Roman character, the easily memorized key positions.

The aforementioned characters are defined as the first graphic character code in each of the keys 21 to 35.

Incidentally, in the shift state of the consonant key (as will be touched upon below, each key of the main key area 20 is operated with the shift operation by the shift input means 71, in which the second graphic character code is defined in each of the keys.), one of Japanese Punctuation Mark " ゛ ", another Japanese Punctuation Mark " ° ", a long vowel mark " ─ ", a double consonant character " っ ", and further "P", "B", "G", "Z" and "D" which form the p-sound in the kana syllabary and the voiced sound by combining the vowel are allocated.

More specifically, the respective keys 23, 24 and 25 in the top rank, allocated "N", "H" and "M", are allocated to input "P", "B" and " っ ". The respective keys 28, 29 and 30 in the middle rank, allocated "K", "S" and "T", are allocated to input "G", "Z" and "D". And the respective keys 33, 34 and 35 in the bottom rank, allocated "Y", "R" and "W", are allocated to input one of Japanese Punctuation Mark " ゛ ", another Japanese Punctuation Mark " ° ", a long vowel mark " ─ ".

Figure 25:
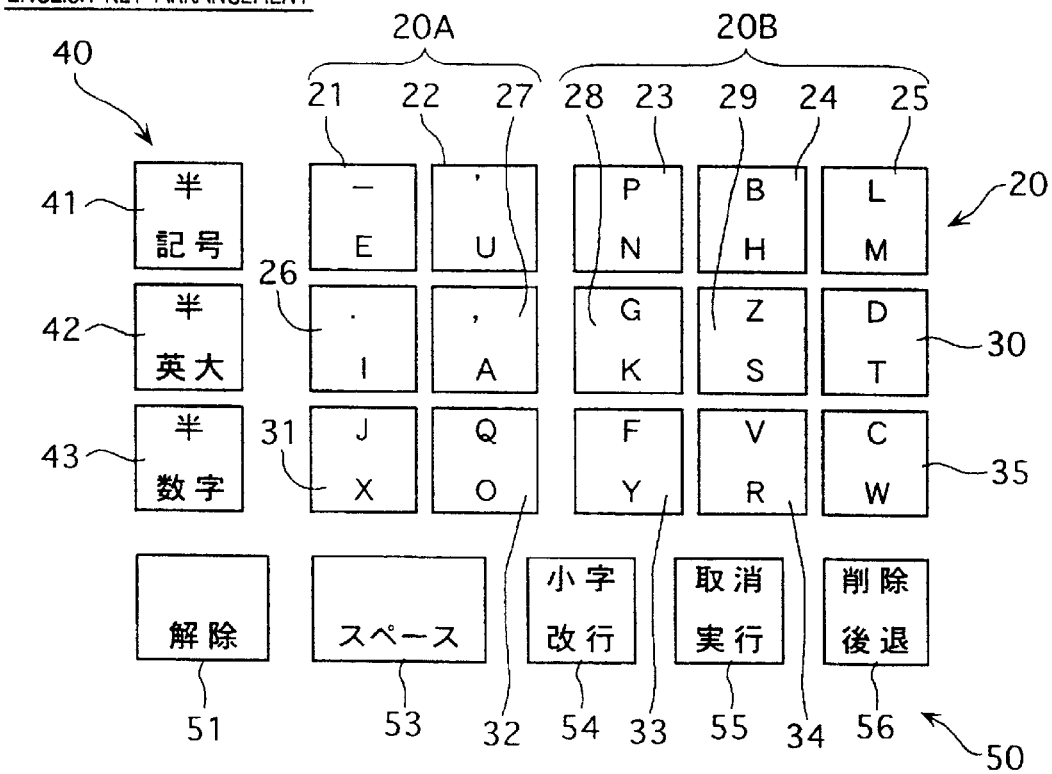
FIG. 25 is a plane view showing an English key arrangement in the screen touch input unit.
Figure 26:
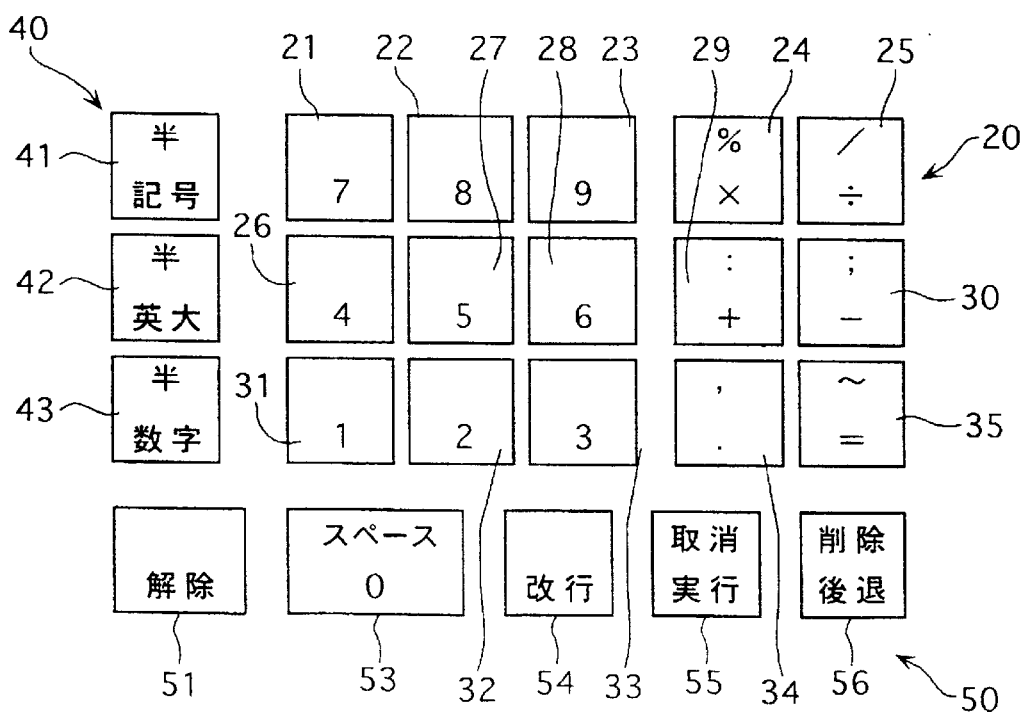
FIG. 26 is a plane view showing a digit key arrangement in the screen touch input unit.
Figure 27:
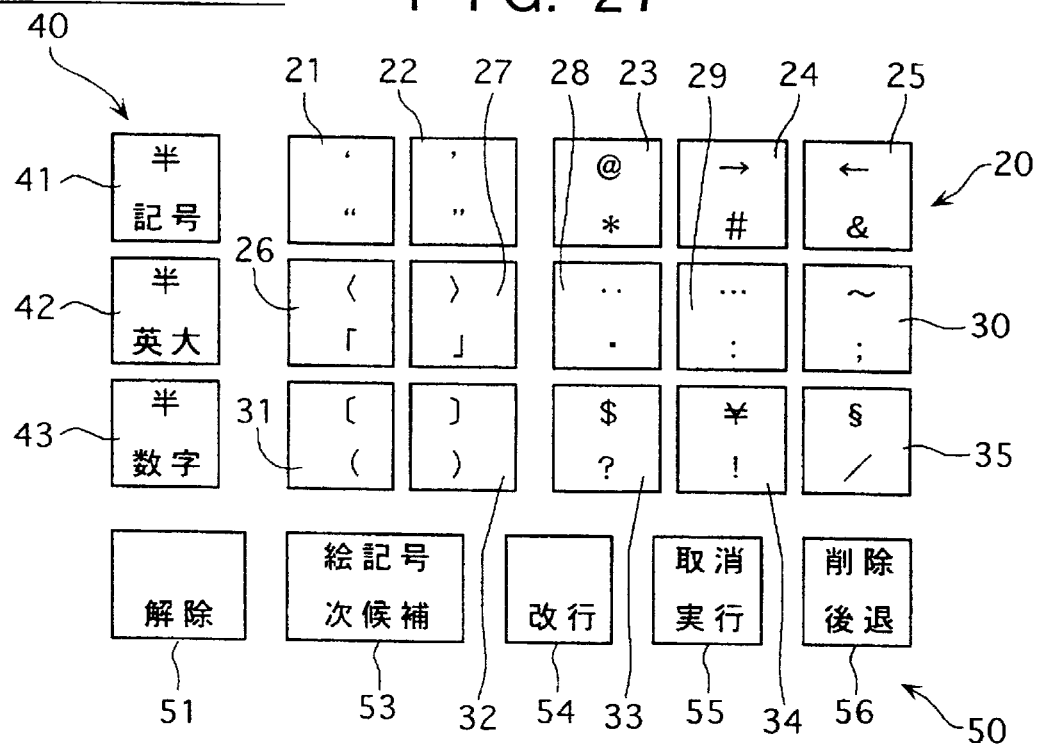
FIG. 27 is a plane view showing a symbol key arrangement in the screen touch input unit.

Turning to three keys 41, 42 and 43 of the change key area 40 are allocated change keys for changing each key in the main key area 20 from the standard key arrangement shown in FIG. 23 into an English key arrangement, a digit key arrangement and a symbol key arrangement respectively shown in FIG. 25 to FIG. 27. More specifically, provided that the English change key ("英大capital letter)") 42 is touched with the pen 15, the arrangement is changed into the English key arrangement for inputting English capital letters as shown in FIG. 25. Provided that the digit change key ("数字digit)") 43 is touched, the arrangement is changed into the digit key arrangement for inputting digits as shown in FIG. 26. And provided that the symbol change key ("記号symbol)") 41 is touched, the arrangement is changed into the symbol key arrangement for inputting symbols as shown in FIG. 27. Therefore, menu for changing the key arrangements is structured in a hierarchized structure as shown in FIG. 24, in which the standard key arrangement menu and the three arrangements menu, each changed from the standard key arrangement by touching the change keys 41 to 43, are defined under the standard key arrangement menu in the selection menu 11.

Incidentally, in each of the English key arrangement, the digit key arrangement and the symbol key arrangement, the inputted character, digit and symbol is basically shown in full-sized character, but when it is needed to basically input in half-sized character, each of the keys 41 to 43 are touched by being changed into a shift state (" ¥ (half-sized character)") by using the shift input means. Here, the key for " ¥ (the half-sized character)" is positioned on each shifted position of the keys 41 to 43 for changing into the symbol, English and digit arrangements, so that there is a disadvantage of the operational ease of the input with the half-sized characters.

The keys 51 to 56 of the function key area 50 are defined with various functions necessary for the input with Roman character.

More specifically, the key 51 is allocated "変換(conversion)" key carrying out a function of a kana-kanji conversion, and the key 52 is allocated a "無変(non-conversion)" key carrying out a function of a kana-kanji non-conversion. The key 53 is allocated a "スペース(space)"

key for inputting a space. The key 54 is allocated a "改行(return)" key. The key 55 is allocated an "実行(enter)" key for sending a character string defined in the input line 60 to the data display area 10. And the key 56 is allocated a "後退(back space)" key for moving a cursor shown in the input line 60 backward (return the cursor to the original position).

In the shift state, the keys 51 to 56 are respectively allocated a "前候(last conversion-candidate)" key for showing the last conversion-candidate of a list of homophones displayed in the kana-kanji conversion, a "カナ(kana)" key for carrying out a katakana conversion, a "小字(half-sized character)" key for converting to the character or the like of the half-size, a "小字(small letter)" key for converting alphabets to small letters, a "取消(cancel)" key for canceling the input or conversion operation, and a "削除(delete)" key.

The following is explanations as to the key arrangements of the main key area 20, the change key area 40 and the function key area 50 in the English key arrangement shown in FIG. 25.

As to the main key area 20 in the English key arrangement, the vowel area 20A arranged in the left two files are respectively allocated letters "A" and "I" on the keys 27 and 26 in the middle rank, letters "U" and "E" on the keys 22 and 21 in the top rank, and letters "O" and "X" on the keys 32 and 31 in the bottom rank as the first graphic character code in the same way as the standard arrangement.

In the consonant area 20B of the non-shift state (as the first graphic character code), the keys 28 and 29 from the left to the right in the middle rank are respectively allocated to input letters "K", "S" and "T". The keys 23, 24 and 25 from the left to the right in the top rank are respectively allocated to input letters "N", "H" and "M". And the keys 33, 34 and 35 from the left to the right in the bottom rank are respectively allocated to input letters "Y", "R" and "W".

As for the keys of the main key area 20 in the shift sate (the second graphic character code), the keys from the left to the right in the top rank are respectively allocated to show a hyphen symbol "–" on the key 21, an apostrophe "'" on the key 22, a letter "P" on the key 23, a letter "B" on the key 24 and a letter "L" on the key 25. The keys from the left to the right in the middle rank are respectively allocated to input a period "." on the key 26, a comma "," on the key 27, a letter "G" on the key 28, a letter "Z" on the key 29, and a letter "D" on the key 30. Further, the keys from the left to the right in the bottom rank are respectively allocated to input a letter "J" on the key 31, a letter "Q" on the key 32, a letter "F" on the key 33, a letter "V" on the key 34 and a letter "C" on the key 35.

Turning to the change key area 40 are the same as the standard key arrangement, in which being provided with the symbol change key 41, the English change key 42 and the digit change key 43.

The function key area 50 is provided with the five keys 51, and 53 to 56. The keys 54, 55 and 56 are the same as the standard key arrangement. But the key 51 is defined as a "解除(remove)" key for returning to the standard key arrangement, and the key 53 is defined as only the "スペース(space)" key.

The following is explanations as to the main key area 20, the change key area 40 and the function key area 50 in the digit key arrangement shown in FIG. 26.

The digit keys are arranged on the left three files of the main key area 20, and the other two files on the right are allocated to input the arithmetic symbols. More specifically, in the main key area 20 as the first graphic character code, the keys from the left to the right in the top rank are respectively allocated to input a digit "7" on the key 21, a digit "8" on the key 22, a digit "9" on the key 23, a symbol "×" on the key 24 and a symbol "÷" on the key 25. The keys from the left to the right in the middle rank are respectively allocated to input a digit "4" on the key 26, a digit "5" on the key 27, a digit "6" on the key 28, the symbol "+" on the key 29, and a symbol "–" on the key 30. And, the keys from the left to the right in the bottom rank are respectively allocated to input a digit "1" on the key 31, a digit "2" on the key 32, a digit "3" on the key 33, a symbol "." on the key 34 and a symbol "=" on the key 35.

The keys 24, 25, 29, 30, 34 and 35 in the shift state (in the second graphic character code) are respectively allocated a symbol "%", a symbol "/", a colon ":", a semi-colon ";", a comma ",", and a symbol "~".

The three keys 41, 42 and 43 of the change key area 40 are the same as the standard key arrangement, in which the symbol change key 41, the English change key 42 and the digit change key 43 are provided.

Turning to the function key area 50 is defined with five keys 51 and 53 to 56. The keys 55 and 56 are the same as the standard key arrangement and the English key arrangement. But, the key 51 is allocated a "解除(remove)" key for returning from the digit key arrangement to the standard key arrangement in the same way as the English key arrangement. The key 53 is allocated a digit "0" in the non-shift state and a "スペース(space)" key in the shift state. But the key 54 is allocated only a "改行(return)" key.

The following is explanation as to the symbol key arrangement of the main key are 20, the change key area 40 and the function key area 50 as shown in FIG. 27.

Various brackets symbols are arranged in the left two files of the main key area 20, and the other symbols are arranged in the right three files. More specifically, as the first graphic character code, the keys from the left to the right in the top rank of the main key area 20 is respectively allocated to input a bracket symbol """ on the key 21, a bracket symbol """ on the key 22, an asterisk symbol "*" on the key 23, a sharp symbol "#" on the key 24, and an and symbol "&" on the key 25. The keys from the left to the right in the middle rank are respectively allocated to input a bracket symbol "[" on the key 26, a bracket symbol "]" on the key 27, a dot symbol "." on the key 28, a colon symbol ":" on the key 29, a semi-colon symbol ";" on the key 30. Further, the keys from the left to the right in the bottom rank are respectively allocated to input a bracket symbol "(" on the key 31, a bracket symbol ")" on the key 32, a question symbol "?" on the key 33, a qualifying symbol "!" on the key 34 and a symbol "/" on the key 35.

And in the shift state (in the second graphic character code), the keys from the left to the right in the top rank of the main key area 20 are allocated to input a bracket symbol """ on the key 21, a bracket symbol "'" on the key 22, a qualifying symbol "@" on the key 23, an arrow symbol "→" on the key 24, and an arrow symbol "←" on the key 25. The keys from the left to the right in the middle rank are respectively allocated to input a bracket symbol "<" on the key 26, a bracket symbol ">" on the key 27, a dots symbol ".." on the key 28, a dots symbol ". . ." in the key 29, and a symbol "~" on the key 30. Further, the keys from the left to the right in the bottom rank are respectively allocated to input a bracket symbol "[" on the key 31, a bracket symbol "]" on the key 32, a dollar symbol "$" on the key 33, an yen symbol "¥" on the key 34 and a qualifying symbol "§" on the key 35.

Turning to the three keys 41, 42 and 43 of the change key area 40 are the same as 15 the standard key arrangement, in which the symbol change key 41, the English change key 42 and the digit change key 43 are provided.

The function key area 50 is defined with the five keys 51 and 53 to 56. The keys 51 and 54 to 56 are the same as the digit key arrangement. But the key 53 is allocated to input a "絵記号(picture symbol)" key for displaying various picture symbols on each of the main keys 21 to 35 or the opportune pop-up area in the shift sate, and to input a "次候補(next candidate)" key displaying a list of the next candidate of the displayed picture symbols in the non-shift state.

Figure 28:
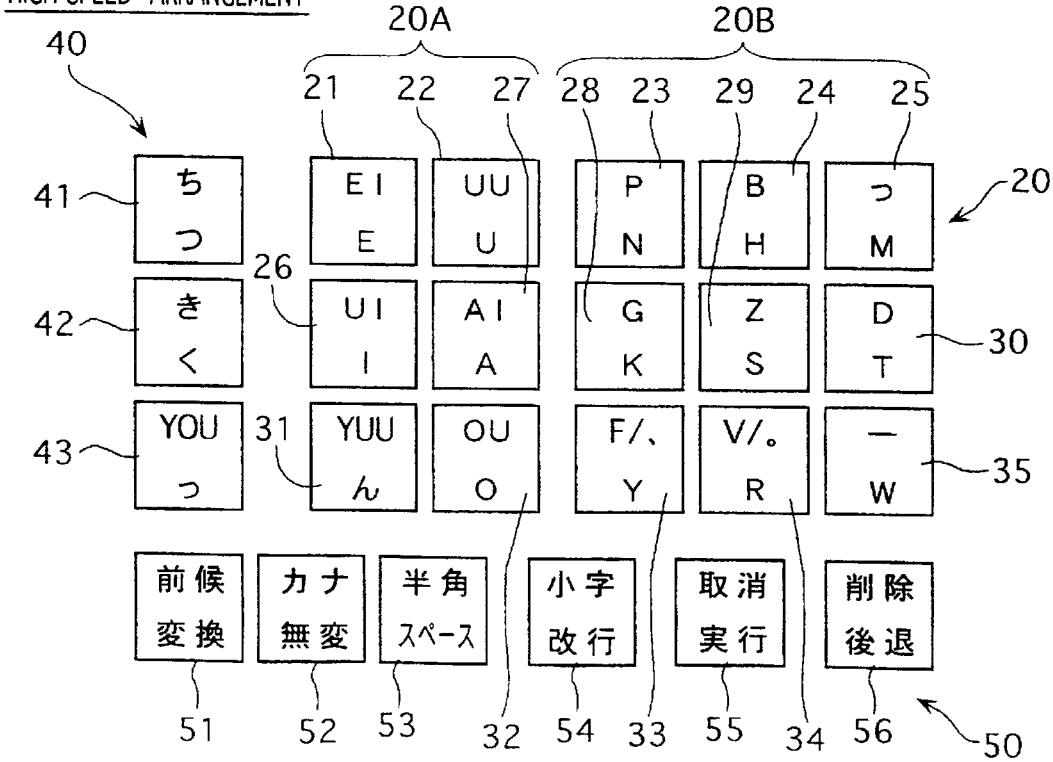
FIG. 28 is a plane view showing a high-speed arrangement in the screen touch input unit.

The following is explanation as to the key arrangements of the main key area 20, the change key area 40 and the function key area 50 in the high-speed key arrangement changed with the selection menu key 17 as shown in FIG. 28. The high-speed key arrangement is similar to the standard key arrangement shown in FIG. 23, but some keys are defined for inputting at high-speed.

Concretely, each of the keys 21, 22, 26, 27, 31 and 32 of the vowel area 20A are allocated characters "A", "U", "E", "O" and "ん(n)" as the first graphic character code like the standard key arrangement, but allocated double vowels "AI", "UI", "UU", "EI", "OU" and "YUU" in the shift state (in the second graphic character code) of the keys in order to input at high-speed. More specifically, the vowel keys 27 and 26 arranged in the middle rank are respectively allocated to input double vowels "AI" and "UI" in the shift state. The keys 22 and 21 arranged in the top rank are respectively allocated to input double vowels "UU" and "EI" in the shift state. And the keys 32 and 31 arranged in the bottom rank are respectively allocated to input double vowels "OU" and "YUU" in the shift state.

Further, the consonant area 20B arranged in the right three files are provided with the consonant keys of letters "K", "S", "T", "N", "H", "M", "Y", "R" and "W" forming consonant sound of Japanese like the standard key arrangement. More specifically, the keys 28, 29 and 30 from the left to the right in the middle rank are respectively allocated letters "K", "S" and "T". The keys 23, 24 and 25 from the left to the right in the top rank are respectively allocated letters "N", "H" and "M". And the keys 33, 34 and 35 from the left to the right in the bottom rank are respectively allocated letters "Y", "R" and "W".

The consonant key arrangement in the shift state (in the second graphic character) is the same as the standard key arrangement. That is to say, the keys 23, 24 and 25 in the top rank, which are allocated letters "N", "H" and "M" in the first graphic character code, are allocated characters "P", "B" and "っ". The keys 28, 29 and 30 in the middle rank, which are allocated letters "K", "S" and "T", are allocated letters "G", "Z" and "D". And the keys 33, 34 and 35 in the bottom rank, which are allocated letters "Y", "R" and "W", are allocated one of Japanese Punctuation Mark "、", another Japanese Punctuation Mark "。", and a long vowel mark "—".

The keys 33 and 34 in the shift state are respectively allocated letters "F" and "V" as the second shift sate (as the third graphic character code).

Turning to the three keys 41, 42 and 43 on the change key area 40 are usually the same as the standard key arrangement, in which the symbol change key 41, the English change key 42 and the digit change key 43 are provided, but, provided that any one of the keys in the main key area 20 is touched, the keys 41, 42 and 43 are changed to be defined as the first graphic character code to respectively input characters "つ(tu)" and "く(ku)" and a double consonant character "っ(ttu)", and further, in the shift state (in the second graphic character code), the keys 41, 42 and 43 are respectively allocated to input characters "ち(ti)", "き(ki)" and "YOU". Therefore, in the high-speed arrangement, the change keys 41 to 43 are operated as sub-keys also.

The function key area 50 is provided with the six keys 51 to 56 defined the same functions as the standard key arrangement.

The aforementioned high-speed arrangement is structured to be able to input, especially, Japanese double vowels "AI", "UI", "UU", "EI", "UO", "YUU", "YOU", and "ん(n)・き(ki)・く(ku)・ち(ti)・つ(tu)・っ(ttu)"

by touching only one key at a time, thus achieving the input at high-speed.

In other words, the aforementioned double vowel, palatalized syllable and

"ん・き・く・ち・つ・っ"

are frequently used in Japanese, especially, in kanji read by using Chinese style, so that the number of touches are reduced by inputting to touch once each of the characters which are inputted by touching twice to three times in general, thus improving the inputting efficiency. Table 1 shows a comparative example of the number of touches among a conventional kana input in the use of Japanese syllabary, a conventional Roman character input in the use of the QWERTY arrangement and the high-speed arrangement.

TABLE 1

COMPARISON OF THE NUMBER OF TOUCHES
IN THE PEN INPUT

| Example | Japanse syllabary | | QWERTY arrangement | | High-speed arrangement | |
|---|---|---|---|---|---|---|
| 経済 (keizai) | けいざ(vc)い | 5 | KEIZAI | 6 | K<u>EIZAI</u> | 4 |
| 流通 (ryutu) | り(sc)ゆうつう | 6 | RYUUTUU | 7 | R<u>YUUTUU</u> | 4 |
| 情報 (joho) | し(vc)(sc)ようほう | 7 | JOUHOU | 6 | Z<u>YOUHOU</u> | 4 |
| 出版 (shuppan) | し(sc) ふ(sc)つは (vc)(vc)ん | 9 | SHUPPANN | 8 | SYU₂PA<u>ん</u> | 7 |
| 実力 (jituryoku) | し(vc)つり(sc)よく | 7 | JITURYOKU | 9 | ZI₂RYO<u>く</u> | 7 |

NOTE 1: (vc) in Japanese syllabary means to input a voiced consonant key.
NOTE 2: (sc) in Japanese syllabary means to input shift of a small character.

As know from Table 1, with the use of the high-speed arrangement of FIG. 28, a double vowel or a palatalized syllable can be inputted by touching only one key at a time, so that the number of touches (each numeral shown in Table 1) can be reduced as compared with the kana input or the Roman character input, thereby allowing the effect to be enhanced in sentences written with, especially, characters read with Chinese style.

Further, the high-speed arrangement is designed to move the flow of the character input from the right to the left in due order. That is to say, the touched order is started from a consonant arranged in the right side, to a vowel or a double vowel arranged in the left side of the consonant keys, and then one of the second syllable "ん(n)・き(ki)・く(ku)・ち(ti)・つ(tu)・つ(ttu)"

arranged in the left side of the vowel or the double vowel keys, thus cutting waste of the movement of hands, and improving the operational ease. The high-speed arrangement is structured in consideration of the characteristics of Japanese in that the second syllable of kanji read Chinese style and formed with two syllables is always any one of "ん(n)・き(ki)・く(ku)・ち(ti)・つ(tu)・つ(ttu)"

except a case the second syllable is vowel sound, that is to say, it is strong possibility to be inputted with "ん(n)・き(ki)・く(ku)・ち(ti)・つ(tu)・つ(ttu)"

after the first syllable (a consonant sound+a vowel sound), resulting in the effective arrangement for the input of Japanese.

The following is examples of kanji including the aforementioned characters.

1) an example of kanji forming "I" in the second syllable (an example of kanji including any one of double vowels "AI, UI, and EI").

| | | | |
|---|---|---|---|
| ・開催 | (KAI SAI) | ・内外 | (NAI GAI) |
| ・会計 | (KAI KEI) | ・類推 | (RUI SUI) |
| ・推定 | (SUI TEI) | ・累計 | (RUI KEI) |

2) an example of kanji forming "U" in the second syllable (an example of kanji including any one of double vowels "UU and OU") and an example of kanji including "YUU" and "YOU".

| | | | |
|---|---|---|---|
| ・方法 | (HOU HOU) | ・構造 | (KOU ZOU) |
| ・工場 | (KOU ZYOU) | ・東京 | (TOU KYOU) |
| ・通風 | (TUU FUU) | ・中央 | (TYUU OU) |

3) an example of kanji forming "ん(nn)" in the second syllable.

| | | | |
|---|---|---|---|
| ・安全 | (Aん ZEん) | ・簡単 | (KAん TAん) |
| ・混沌 | (KOん TOん) | | |

4) an example of kanji forming "き(ki) and く(ku)" in the second syllable.

| | | | |
|---|---|---|---|
| ・難易 | (HEき Eき) | ・的確 | (TEき KAく) |
| ・画策 | (KAく SAく) | ・目的 | (MOく TEき) |
| ・宿敵 | (SYUく TEき) | ・即席 | (SOく SEき) |

5) an example of kanji forming "ち(ti), つ(tu) and つ(tt)" in the second syllable.

| | | | |
|---|---|---|---|
| ・1日 | (Iち NIち) | ・吉日 | (KIち ZIつ) |
| ・質実 | (SIつ ZIつ) | ・切実 | (SEつ ZIつ) |
| ・1日 | (Iち NIち) | ・活発 | (KAつ PAつ) |
| ・実質 | (ZIつ SIつ) | ・出発 | (SYUつ PAつ) |

The following is explanation of the key arrangements of the main key area 20, the change key area 40 and the function key area 50 in the QWERTY English key arrangement changed with the selection menu key 18 as shown in FIG. 29. The QWERTY English key arrangement is designed to be easily inputted with English sentences by a person, who is accustomed to using a conventional keyboard arranged with the QWERTY arrangement, in which a different point from the first embodiment is that each key area of the keys 21 to 35 are shown to divide in the horizontal direction in the first embodiment, however each key area are shown to divide in the vertical direction on each key in the embodiment.

In the QWERTY English key arrangement, as the first graphic character code, the bottom half-areas of the keys from the left to the right in the top rank of the main key area 20 are respectively allocated a letter "Y" on the key 21, a letter "U" on the key 22, a letter "I" on the key 23, a letter "O" on the key 24 and a letter "P" on the key 25. The bottom half-areas of the keys from the left in the middle rank are respectively allocated a letter "H" on the key 26, a letter "J" on the key 27, a letter "K" on the key 28, a letter "L" on the key 29 and a semi-colon ";" on the key 30. And, the bottom areas of the keys from the left in the bottom rank are respectively allocated a letter "N" on the key 31, a letter "M" on the key 32, a comma "," on the key 33, a period "." on the key 34 and a symbol "/" on the key 35.

In the shift state of the main keys (in the second graphic character code), the top half-areas of the keys from the left to the right in the top rank of the main key area 20 are respectively allocated a letter "Q" on the key 21, a letter "W" on the key 22, a letter "E" on the key 23, a letter "R" on the key 24 and a letter "T" on the key 25. The bottom half-areas of the keys from the left in the middle rank are respectively allocated a letter "A" on the key 26, a letter "S" on the key 27, a letter "D" on the key 28, a letter "F" on the key 29 and a letter "G" on the key 30. And, the bottom areas of the keys from the left in the bottom rank are respectively allocated a letter "Z" on the key 31, a letter "X" on the key 32, a letter "C" on the key 33, a letter "V" on the key 34 and a letter "B" on the key 35.

Turning to the chance key area 40 is provided with a SYM (SYMBOL) key 41 for changing the key arrangement into the symbol key arrangement of FIG. 27, a CAP key 42 for changing the input mode into any one of a large character input and a small character input, and a NUM key 43 for changing the key arrangement into the digit key arrangement of FIG. 26.

The function key area 50 is provided with the four keys 53 to 56. The key 53 is allocated a "SPACE" key for inputting a space, the key 54 is allocated a "return" key, the key 55 is allocated a "DEL" (delete) key, and the key 56 is allocated a "BS" (back space) key.

The following is explanation of the key arrangements of the main key area 20, the change key area 40 and the function key area 50 in the QWERTY Japanese key arrangement changed with the selection menu key 19 as shown in FIG. 30. The QWERTY Japanese key arrangement is designed to be easily inputted with Japanese sentences by a person, who is accustomed to using a conventional keyboard arranged with the QWERTY arrangement.

The QWERTY Japanese key arrangement is similar to the QWERTY English key arrangement of FIG. 29 from the view of arranging to be based on the QWERTY arrangement.

Concretely, as the first graphic character code of each of the main keys, the bottom half-areas of the keys from the left to the right in the top rank of the main key area 20 are respectively allocated a letter "Y" on the key 21, a letter "U" on the key 22, a letter "I" on the key 23, a letter "O" on the key 24 and a letter "P" on the key 25. The bottom half-areas of the keys from the left in the middle rank are respectively allocated a letter "H" on the key 26, a letter "J" on the key 27, a letter "K" on the key 28, a letter "L" on the key 29 and a long vowel mark "—". And, the bottom half-areas of the keys from the left in the bottom rank are respectively allocated a letter "N" on the key 31, a letter "M" on the key 32, one of Japanese Punctuation Mark "ヽ" on the key 33, another Japanese Punctuation Mark "○" on the key 34 and a character "ん" on the key 35.

In the shift state of the main keys (in the second graphic character code), the top half-areas of the keys from the left to the right in the top rank of the main key area 20 are respectively allocated a letter "Q" on the key 21, a letter "W" on the key 22, a letter "E" on the key 23, a letter "R" on the key 24 and a letter "T" on the key 25. The bottom half-areas of the keys from the left in the middle rank are respectively allocated a letter "A" on the key 26, a letter "S" on the key 27, a letter "D" on the key 28, a letter "F" on the key 29 and a letter "G" on the key 30. And, the bottom areas of the keys from the left in the bottom rank are respectively allocated a letter "Z" on the key 31, a letter "X" on the key 32, a letter "C" on the key 33, a letter "V" on the key 34 and a letter "B" on the key 35.

Incidentally, the three keys 41, 42 and 43 of the change key area 40 and the six keys 51 to 56 of the function key area 50 are the same as the standard key arrangement.

Figure 32:
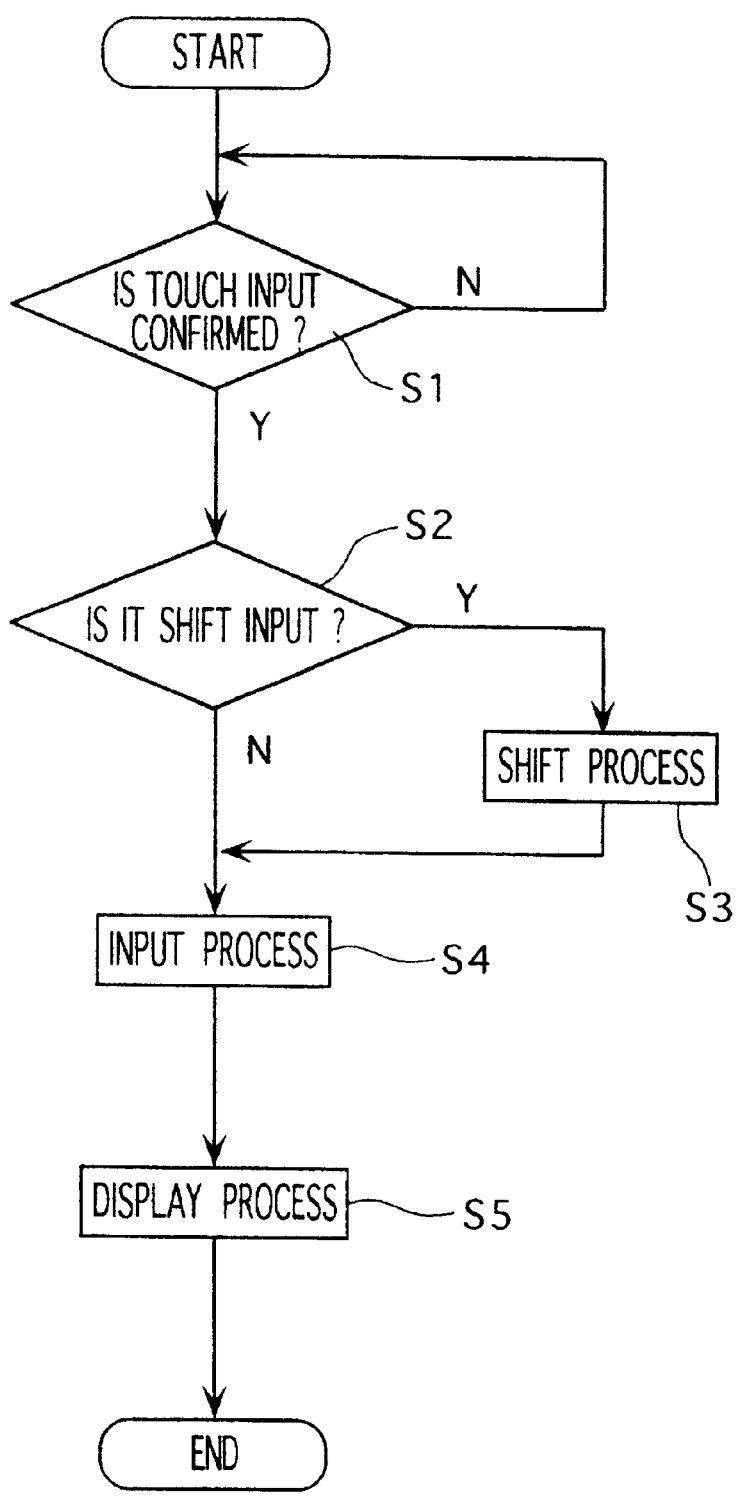
FIG. 32 is a flow chart showing procedure of the input operation for the screen touch input unit.

An internal processing method in the screen display key input unit 101 according to the present invention, with the key arrangements as described thus far, will be explained hereunder in the light of FIG. 31 and FIG. 32.

FIG. 31 is a block diagram to visually understand an internal structure in the screen display key input unit 101. FIG. 32 is a flow chart actually carried out in the unit 101.

The screen display key input unit 101 consists of an input controller 107, a shift input means 171, a process controller 172 and an output controller 176.

The input controller 170 senses a touch input by the pen 15 within the selection menu 11, the main key area 20, the change key area 40 and the function key area 50, which is represented as a Step 1 in the drawing. A step will be simply replaced with "S" to shorten a sentence.

When being touched by the pen 15, the shift input means 171 judges whether the touch input is caused by the shift input or not (S2).

When the shift input is confirmed, the shift input means 171 carries out the shift process generating a key code allocated the shift position of the touched key (S3), and the generated code is sent to the process controller 172. But, when the shift input is not confirmed, the shift input means 171 generates a key code allocated the non-shift position of the touched key and sends it to the process controller 172.

The process controller 172 is provided therein with three process means of an arrangement change means 173, a key process means 174 and a function process means 175, in which the input process is carried out by selecting from the three process means in response to the inputted key (S4). For example, if the inputted key is any one of the menu keys 16 to 19 of the selection menu 11 or any one of the change keys 41 to 43 of the change key area 40, the arrangement change means 173 will change the main key area 20, the change key area 40 or the function key area 50 into the arrangement defined by the inputted key.

Provided that the inputted key is any one of the keys of the main key area 20, the key process means 174 shows and outputs the inputted key on the input line 60 (S4). In addition, where the Roman character input is carried out with the standard key arrangement or the like, the key process means 174 automatically converts the inputted alphabet into kana (S4).

Provided the inputted key is any one of the keys of the function key area 50, the function process means 175 carries out a function defined by the inputted key (S4). For example, when the conversion key 51 is touched, a character string shown on the input line 60 is converted into kanji and defined. When the enter key 54 is touched, the defined character string is shown on the data display area 10.

The output controller 176 carries out a process showing the result of process in the process controller 172 on the liquid crystal display 3 (S5).

A whole process by one touch input is carried out as aforementioned and subsequent inputs are done in the same way.

Figure 33:
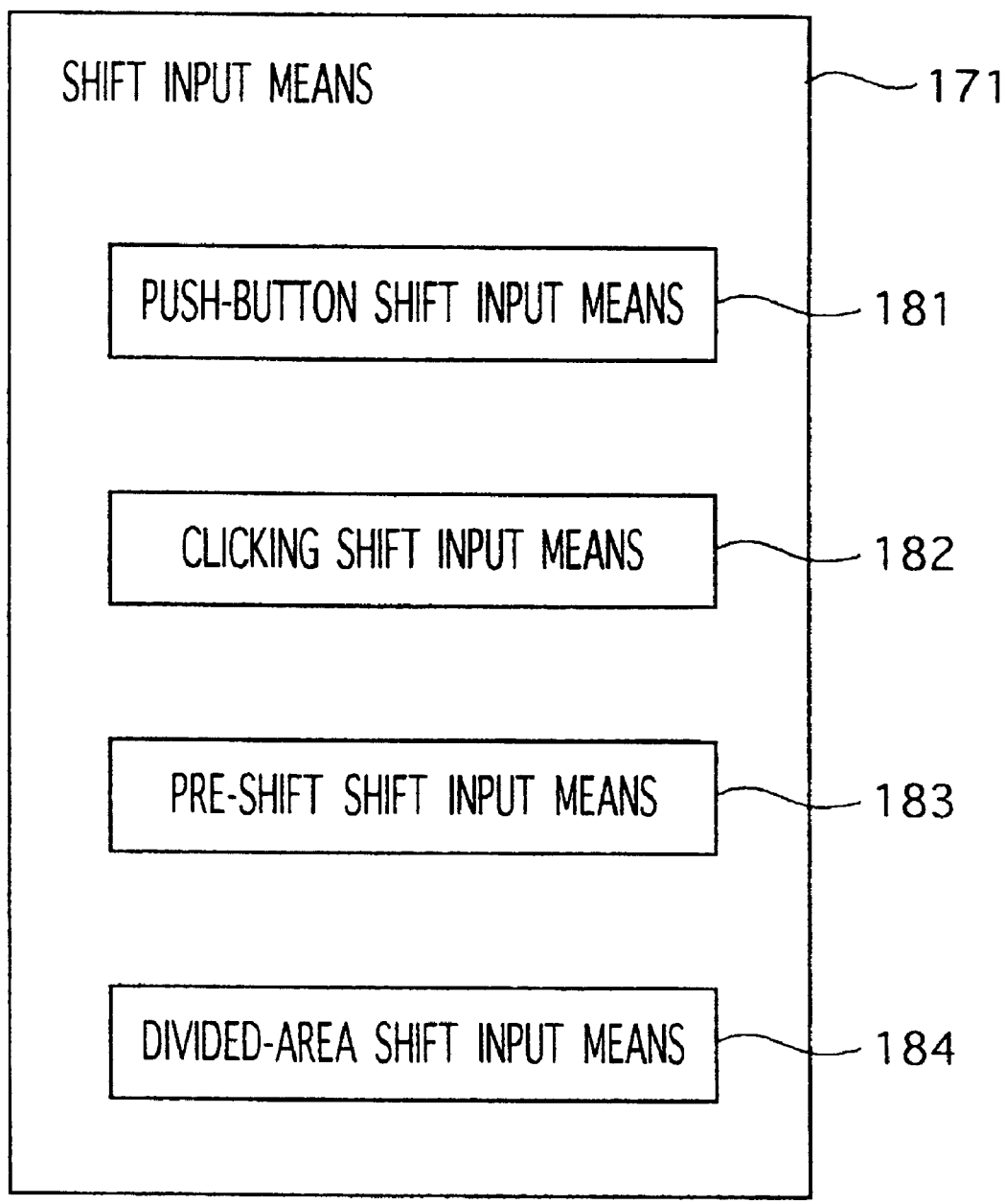
FIG. 33 is a block diagram showing a structure of shift input means in the screen touch input unit.

The shift input means 171 is used by opportunely selecting from four shift input means of push-button shift input means 181, clicking shift input means 182, pre-shift shift input means 183, and divided-area shift input means 184 as shown in FIG. 33.

Each of the shift input means 171 will be separately explained below.

As to the push-button shift input means 181, when the key is touched with the pen 15 while a push-button 4, shown in FIG. 22, is being pushed, the code (the second graphic character code) of the symbol defined on the touched key in the shift state is generated. And, when the key is touched while the push-button 4 is not pushed, the code (the first graphic character code) of the symbol defined on the touched key in the non-shift state is generated.

As to the clicking shift input means 182, when the key is touched twice with the pen 15 in the predetermined period of time, the code (the second graphic character code) of the symbol defined on the touched key in the shift state is generated. And, when the key is touched once in the predetermined period of time, the code (the first graphic character code) of the symbol defined on the touched key in the non-shift state is generated.

Figure 34:
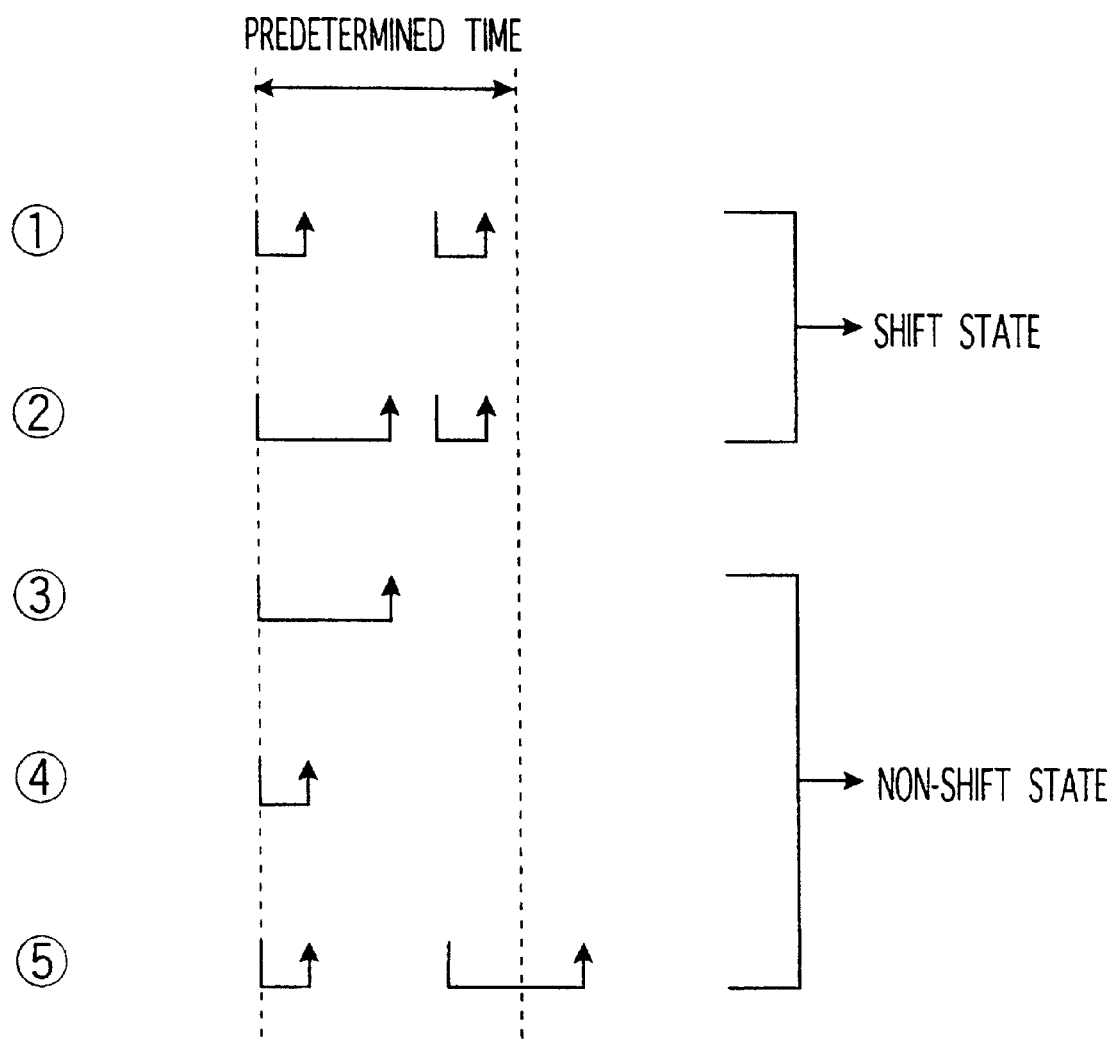
FIGS. 34①, ②, ③, ④ and ⑤ are explanatory views for a function of a clicking shift input means.

That is to say, as shown in FIG. 34, the clicking shift input means 182 confirms the shift state when the pen 15 completely touches on the screen twice within the predetermined period of time (①, ②), and confirms the non-shift state when the pen 15 touches the screen once within the predetermined period of time (③, ④) or when the second touch operation is carried out to exceed the predetermined period of time (⑤).

As to the pre-shift shift input means 183, when the input mode is defined as the shift state by being pushed on the shift key 5 shown in FIG. 22, the code (the second graphic character code) of the symbol defined on the key, touched with the pen 15, in the shift is generated. And, when the input mode is defined as the non-shift state by being pushed on the shift key 5 again, the code (the first graphic character code) of the symbol defined on the key, touched with the pen 15, in the non-shift state is generated.

Figure 35:
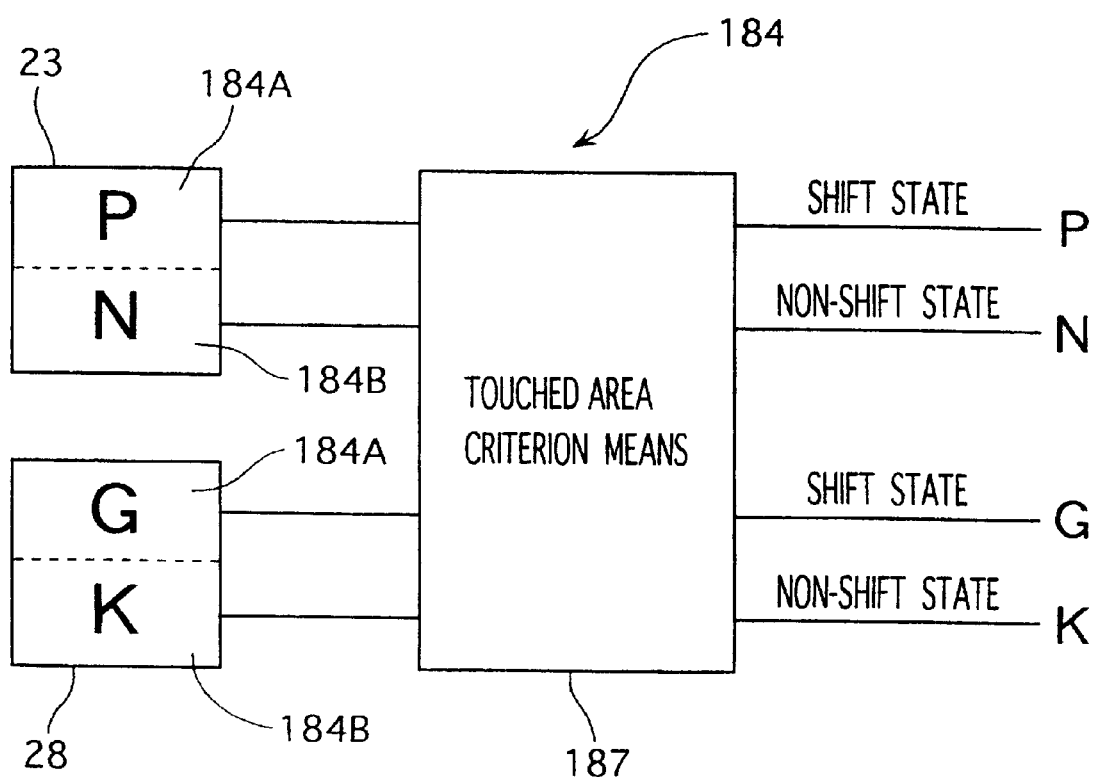
FIG. 35 is an explanatory view for a function of a divided-area shift input means.

The divided-area shift input means 184 includes touched-area criterion means 187 for determining whether the pen 15 touches an area 184A or an area 184B, when each of the keys is divided, as shown in FIG. 35, into the top half-area as the shift area 184A and the bottom half-area as the non-shift area 184B. When the touched-area criterion means 187 determines that the shift area 184A is touched, the code (the second graphic character code) of the symbol defined on the touched key in the shift state is generated, and when the touched-area criterion means 187 determines that the non-shift area 184B is touched, the code (the first graphic character code) of the symbol defined on the touched key in the non-shift state is generated.

Incidentally, the divided-area is not limited to be defined by dividing the key into the top and bottom half-areas, and the divided area may be defined by dividing the key into the right and left half-areas or diagonal half-areas, in which it is advisable that the symbol, inputted when each of the divided-areas is touched, is shown on the divided-area.

As the shift input means 171, the purpose is served with defining any one of the push-button shift input means 181, the clicking shift input means 182, the pre-shift shift input means 183, and the divided-area shift input means 184, but it may be structured that an operator can appropriately select from the defined plural shift input means 171.

The push-button 4 and the shift key 5 may be not provided on the main body 2 when the push-button shift input means 181 and the pre-shift shift input means 183 are not employed as the shift input means 171.

In the selection of the high-speed shown in FIG. 28, each of the keys 33 and 34 are defined with the first and second shift state (the second and third graphic character codes), so that it is needed that the shift input means 171 is defined with two shift input means of the first and second processes differing from each other.

For example, the push-button shift input means 181 is defined as the first shift input means and the clicking shift input means 182 is defined as the second shift input means. In this case, for example, when the key 33 or 34 is touched while the push-button 4 is being pushed, one of Japanese Punctuation Mark "○" or another Japanese Punctuation Mark "━" is inputted, and, when the key 33 or 34 is touched with the clicking shift input means (the key is touched twice within the predetermined period of time), a letter "F" or "V" as the second shift state (the third graphic character code) is inputted.

Effects according to the embodiment described thus far will be explained below.

According to the embodiment, even with only the fifteen main keys 21 to 35, at least two keys (the key defined in the shift state and the key defined in the non-shift state), namely, the first and second graphic character codes can be defined on each of the keys 21 to 35 by using the shift input means 171, so that at least 30 keys in total are defined. Therefore, the main keys 21 to 35 can be defined with Japanese Punctuation Marks "○" and "━" in addition to 19 letters of alphabets, namely vowel letters "A", "I", "U", "E" and "O", used in the Roman character input of Japanese, letters "K", "S", "T", "N", "H", "M", "Y", "R" and "W" for inputting a voiceless sound from Ka group of Japanese syllabary to Wa group formed by combing with the vowel key, and letters "G", "Z", "D", "P" and "B" for inputting the voice sound and the p-sound in the Japanese kana syllabary formed by combing with the vowel key, thus responding the needs in the Japanese input even with the limited number of keys.

Similarly, the main keys 21 to 35 can be defined with a comma "," and a period "." in addition to 26 alphabets, thus sufficiently responding the needs in the English input.

As a result, the English input or the Roman character input can be carried out with the fifteen main keys 21 to 35 which are the smaller number than the keys of the conventional QWERTY arrangement or the conventional Japanese syllabary arrangement. Provided that the keys 21 to 35 are shown on the screen with the same size as the keys of the conventional QWERTY arrangement or Japanese syllabary arrangement, the size of the main key area 20 as the key display area can be smaller, thereby allowing the moving distance of the pen 15 touching the keys 21 to 35 to be decreased and the operability for operators to be improved The size of the main key area 20 can be smaller, thereby allowing the screen touch input unit 101 to be reduced the physical size thereof, the size of the display area for data or the like to be increased, and naturally, the handling properties and the operability to be enhanced.

Provided that the main key area 20 is designed to be size similar to a key arranged area of the conventional QWERTY arrangement or the conventional Japanese syllabary arrangement, each size of the main keys 21 to 35 can be designed to be larger than a conventional key, therefore, each of the keys 21 to 35 are easily touched with the pen 15 or a finger, resulting in the improved operability.

In the embodiment, the change keys 41 to 43, the menu keys 16 to 19 in the selection menu 11 and the arrangement change means 173 are provided, so that the arrangement of the main keys 21 to 35 can be changed in seven types. Therefore, various arrangements, such as the arrangements for alphabet, digit and symbol, the arrangement similar to the conventional QWERTY arrangement and so on, can be defined.

As a result, the arrangement of the graphic character code defined on the main keys 21 to 35 can be changed in the seven types of the Japanese Roman character key arrangement (the standard arrangement), the English key arrangement, the digit key arrangement, the symbol key arrangement, the high-speed arrangement, the QWERTY English key arrangement, and the QWERTY Japanese key arrangement, so that the keys of 30 keys times the number of arrangements can be defined by combining the aforementioned shift input means 171 and the arrangement change means 173 even with the fifteen main keys 21 to 35, thus easily inputting every characters, digits, symbols and so on.

Further, the arrangements can be changed by only touching each of the menu keys 16 to 19 or the change keys 41 to 43, so that Roman character, English, digits and so on can be easily inputted by simply changing the arrangement of each of the main keys 21 to 35.

Each of the arrangement change means 173 is structured to change functions of each of the function keys 51 to 56 shown on the function key area 50 in addition to the arrangements of the main keys 21 to 35, so that the function keys 51 to 56 can be defined to be respond to each of the changed arrangements, resulting in the improved operability. For example, in the English input, the function keys needed in the English input are shown, but the function needed in only the Japanese input, such as "漢字変換(kanji conversion)" or the like, is not shown, thereby allowing the operability to be further improved.

In the arrangement for the Roman character input shown in FIG. 23 and FIG. 28, the keys for vowel sounds and the keys for forming consonant sounds are arranged to be respectively divided in the vowel area 20A and the consonant area 20B, so that the positions of the frequently used vowel keys can be easily acquired in the Japanese Roman character input alternately used with a vowel sound and a consonant sound, resulting in the enhanced operability.

Each consonant key for a voiceless sound frequently used in the consonant sounds are allocated each non-shift state (the first graphic character code) of the keys, so that the frequently used voiceless sounds can be inputted without the shift operation, thus improving the operability.

Furthermore, the keys 27 and 28, which are located adjacent to the center of the main key area 20, are respectively allocated letters "A" and "K" frequently used in the vowel sounds and the consonant sounds, and vowel letters "A", "I", "U", "E" and "O" and consonant letters "K", "S", "T", "N", "H", "M", "Y", "R" and "W", namely from Ka group to Wa group in Japanese syllabary, are methodically arranged from the keys 27 and 28 toward the outside and from the middle rank to the top rank and then the bottom rank, thereby allowing the key arrangement to be easily acquired, and naturally, the operability to be further improved.

The shift state (the second graphic character code) of the keys, allocated letters "K", "S", "T", "N" and "H" in the consonant area, are respectively allocated letters "G", "Z", "D", "P" and "B" for inputting the voiced sound and the p-sound in Japanese syllabary formed by combining with vowel sounds "A", "I", "U", "E" and "O", so that the voiced sounds "が(Ga)", "ざ(Za)" and "だ(Da)" are respectively arranged to correspond with the input positions of the consonant sounds "か(Ka)", "さ(Sa)" and "た(Ta)", and similarly, the p-sound and the voiced sound "ぱ(Pa)" and "ば(Ba)" are respectively tJL retroarranged to correspond with the input positions of the consonant sounds "な(Na)" and "は(Ha)", thereby allowing the key positions of the voiced sound and the p-sound to be easily memorized, and naturally, the operability to be further improved.

In the standard arrangement for the Roman character input (FIG. 23), the high-speed arrangement (FIG. 28) and the QWERTY Japanese key arrangement (FIG. 29), the syllabic nasal "ん(n)", the double consonant "っ(ttu)", one of Japanese Punctuation Mark " ゛ ", 2 isth another Japanese Punctuation Mark " ゜ " and the long vowel mark " ー ", which are frequently used in Japanese sentences, are arranged in a part of the arrangement of the main keys 21 to 35, so that the syllabic nasal "ん", the double consonant "っ", one of Japanese Punctuation Mark " ゛ ", another Japanese Punctuation Mark " ゜ " and the long vowel mark " ー " can be inputted by pushing only one key—with one touch operation, thus enhancing the operational ease. Specially, the syllabic nasal "ん" is defined on the key 35 in the non-shift state, so that the syllabic nasal "ん" frequently used in the Japanese input, particularly, kanji read in the Chinese style, can be easily inputted.

Where the main keys are defined as the English key arrangement (FIG. 25 and FIG. 29), a comma ",", a period "." and so on frequently used in the English input are defined on each of the keys in the shift state and the non-shift state, so that a comma, a period and so on can be directly inputted with the touch input, resulting in the improved operability in the English input.

The English key arrangement shown in FIG. 25 is in agreement on many keys with the standard arrangement shown in FIG. 23, and the QWERTY English key arrangement shown in FIG. 29 is in agreement on some keys with the QWERTY Japanese key arrangement shown in FIG. 30, therefore, even in the use of the combination of the standard arrangement and the English key arrangement with the change, the key arrangements can be easily acquired, naturally, the operational ease is enhanced.

As to the digit key arrangement shown in FIG. 26, the keys are arranged similar to a numeric keypad of a conventional keyboard, and further, various symbols used in calculation can be inputted with the touch input, thereby allowing the input of digits or a calculating operation to be easily carried out.

As to the symbol key arrangement shown in FIG. 27, various symbols, which are frequently used but hardly inputted, can be inputted with the touch input by showing on main keys 21 to 35, thus easily inputting various symbols. Respective bracket symbols are defined to be collected on the six main keys 21, 22, 26, 27, 31 and 32, arranged in the two files relative to the left side, in the shift state and in the non-shift state, so that the key positions of the brackets symbols and the other symbols can be easily distinguished, thus improving the operability of the input.

As to the high-speed shown in FIG. 28, in the shift state of each of the keys 21, 22, 26, 27, 31 and 32 of the vowel area 20A (the second graphic character code), the double vowel and the palatalized syllable "AI", "UI", "UU" "EI", "OU" and "YUU", frequently used in Japanese, particularly, kanji read in Chinese style, are defined, thereby the double vowel, the palatalized syllable and so on can be inputted by pushing only one key, resulting in an increase in efficiency of inputting Japanese.

In the high-speed arrangement, furthermore, in the shift state and the non-shift state of each of the keys 41, 42 and 43 normally used as the change key, the keys for inputting a character "っ", a character "く", a double consonant "っ", a character "ち", a character "き" and letters "YOU" are defined, so that characters "き,く,ち, つ and っ", frequently used in the second syllable of a Japanese word, especially, a single kanji read in the Chinese style, can be inputted with one touch, and further, letters "YOU" included in a word with the double vowel, such as "東京(Tokyo)" (TOUKYOU) and so on, can be also inputted with one touch, thus further increasing efficiency of inputting.

The aforementioned keys 41 to 43 are normally used as the definition of the change keys 41 to 43 used in the other key arrangements, but, after any one of the keys in the main key area 20 is touched, the aforementioned keys are changed from the definition as the change keys 41 to 43 into the definition for characters "き,く,ち,つ and っ" or the like with taking full advantage of characteristic that the keys are used at the second syllable of a word, so that the use of the keys 41 to 43 can be shared by being appropriately changed as necessary, with the result that the number of keys can be reduced with no loss of the operability.

Further, as to the high-speed arrangement, in the shift state of the main keys 33 and 34, Japanese Punctuation Marks " ゛ " and " ゜ " as the first shift state (the second graphic character code) and letters "F" and "V" as the second shift state (the third graphic character code) are defined, so that it is easy to input letters "F" and "V", used when "ファ(F+A)" and "ヴァ(V+A)" as a special palatalized syllable frequently used in the input of Japanese katakana, thus especially improving the operability in the input of Japanese katakana.

As to the QWERTY English key arrangement and the QWERTY Japanese key arrangement shown in FIG. 29 and FIG. 30, the fifteen main keys are defined with the use of the key order of the conventional QWERTY arrangement widely accustomed, so that it is easy for a person who accustoms to using the conventional QWERTY arrangement to memorize the positions of the keys, resulting in the instantaneous use.

As to the shift input means 171, especially, with the use of the clicking shift input means 182 and the divided-area shift input means 184, the shift input and the non-shift input can be appropriately used by slightly changing the methods for inputting with the pen 15, thus enhancing the operability.

With the use of the clicking shift input means 182, the shift operation can be carried out by touching one key twice within the predetermined time, so that the operation similar to the double clicking of the mouse is enabled, resulting in the adaptable operation.

At this time, the time for determining which touch input is carried out is appropriately adjusted by an operator of the input unit 1, thereby the difference between touching one key once and twice, namely, the shift operation or not, can be accurately determined even when the intervals from the first touch to the second touch is differed by each of the operator.

With the use of the divided-area shift input means 184, the shift operation can be carried out by changing the areas touching with the pen 15, resulting in the improved operability.

In this case, each of symbols, defined on each of the main keys 21 to 35 in the shift state and the non-shift state, is shown on the each of the shift areas 84A and the non-shift areas 84B, and each of the symbols (the first and second graphic character codes) can be inputted with the intuitive operation which the area 84A or 84B, namely a part of the inputted symbol is directly touched, resulting in the accessible operation and a high degree of operability.

In the push-button shift input means 181 and the pre-shift shift input means 183, the shift is changed by touching the key with the pen 15 while the push-button 4 is being pushed or after the shift key 5 is pushed, so that the operation is plainly carried out without paying attention to touch with the pen 15, with the result that an operator, particularly, a person who does not have good finger coordination, sometimes operates the above operation more easily than the shift operation having the different touching manners for changing shifts.

Further, in the pre-shift shift input means 183, where the key having plural shift states is continuously inputted, the shift operation in the key touch is not needed after the shift state is previously defined, thereby allowing efficiency of inputting to be increased.

In the aforementioned embodiment, each of the keys in the key input area 12 are arranged to be separated from one another, so that each area of the keys are clearly divided, resulting in avoidance of an error operation which the two keys are simultaneously inputted in the touch input with the pen 15. Especially, when the space between the keys is touched, the touch input from the touched space ahead is defined to be canceled, thereby the error operation can be certainly avoided.

Figure 36:
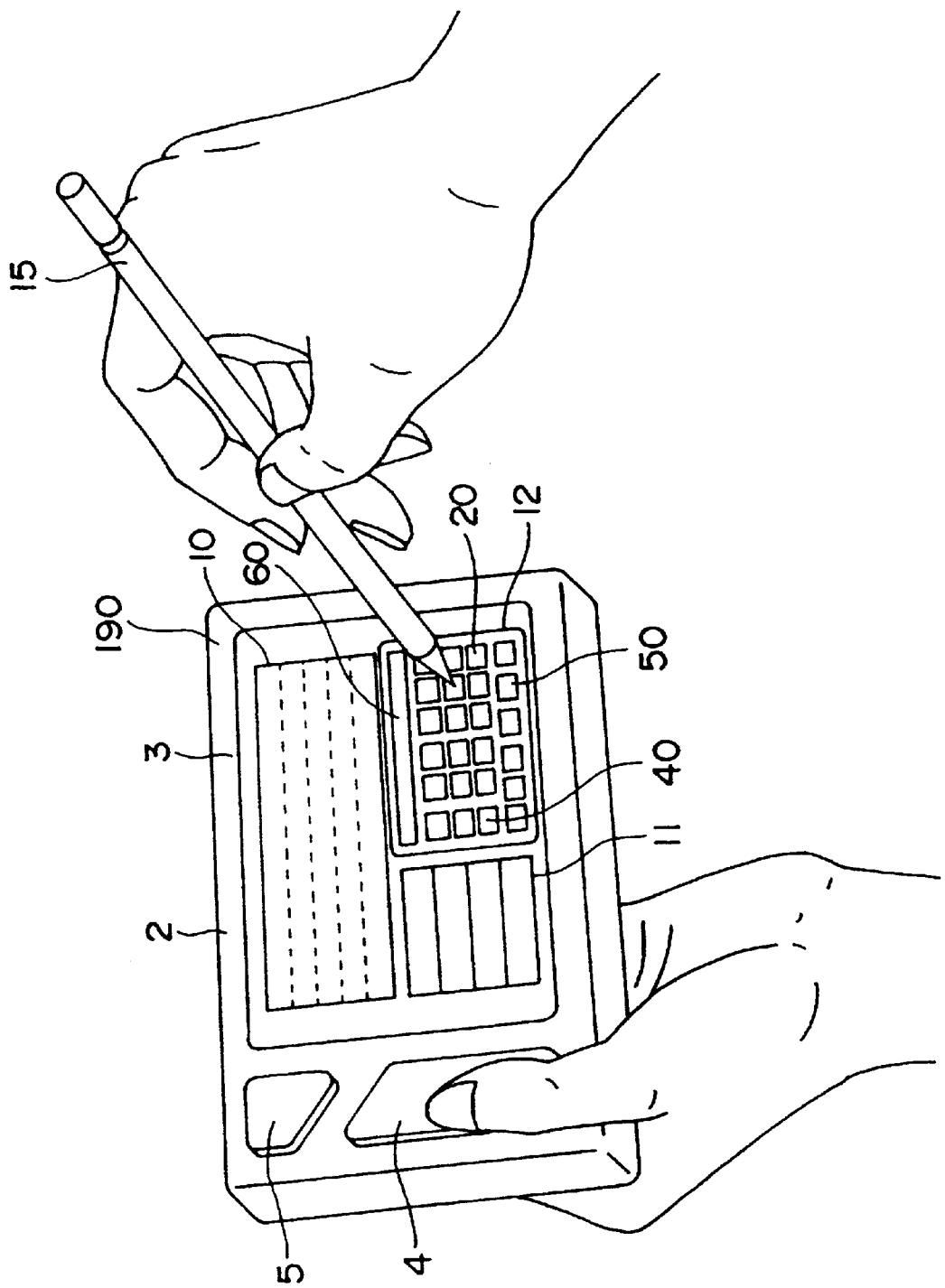
FIG. 36 is a perspective view showing the screen touch input unit of another embodiment according to the present invention.

Incidentally, the present invention is not intended to be limited to the screen touch input unit 101 shown in FIG. 22, and may be applied to a compact screen touch input unit 190 as shown in FIG. 36. In this case, the display area 10 is smaller than the aforementioned input unit 101, but the selection menu 11 and the key input area 12 are provided in the same as the aforementioned input unit 101, and the operation is the same.

The display area 10 may be provided to a cover attached to the main body 2, and the key input area 12 may be provided to the main body 12. In the other words, the present invention can be widely applied to various portable personal computers, an electric notebook, a portable remote terminal (PDA) and so on.

In the aforementioned embodiment, in order to operate the arrangement change means 173, the change keys 41 to 43 and the selection menu 11 are provided, but, only any one of the change keys 41 to 43 and the selection menu 11 may be provided. The arrangement change means 173 is not limited to be shown on the liquid crystal display 3 as described above, and may be provided with the use of a button type on the main body 2.

The arrangements of the main keys 21 to 35, which are shown on the main key area 20, are not limited to the standard arrangement and the arrangements using the QWERTY arrangement. For example, the vowel area 20A is arranged in the bottom rank, and the consonant area 20B can be arranged in the top and middle ranks. Further, in the standard arrangement, the high-speed arrangement or the like, the vowel area 20A and the consonant area 20B may be arranged to reverse in the right and the left, and the keys may be arranged in a reverse order in contrast to the aforementioned embodiment. The change key area 40 or the function key area 50 may be placed at a different position from the aforementioned embodiment, such as a place adjacent to the right side of the main key area 20, a place above the main key area 20 or the like, that is to say, the positions of each of the key areas 20, 40 and 50 and so on can be appropriately defined in consideration of the dominant hand of an operator and the like.

The touch means can be used with a finger or the like in addition to the pen 15. The screen is not limited to the liquid crystal display 3, and can be used with a CRT screen.

Further, as a means for confirming the touch with the pen 15 or the like, various means of an electrostatic capacity type, an optical type, a resistance type or the like can be used in dependence upon a type of the screen, therefore, the aforementioned touch means may be appropriately selected in dependence upon the confirming means.

It may be structured that the key is displayed in reverse when being touched, thereby it is easy to confirm which of the keys is touched. The reverse display states are changed between the touch operation with the shift operation and the normal operation, for example, the upper half of the touched key is displayed in reverse in the shift operation and the lower half of the touched key is displayed in reverse in the normal operation, thereby allowing a advantage in that the touch input operation is easily recognized.

And then, the shift input means 171 can be structured to input the non-shift state and the shift state, namely, the first and second graphic character codes by discriminating between the input operations of the point touch and the bar touch as the first embodiment.

The sixth embodiment according to the present invention will be explained below.

In the embodiment, an information symbol is represented by an icon.

Figure 37:
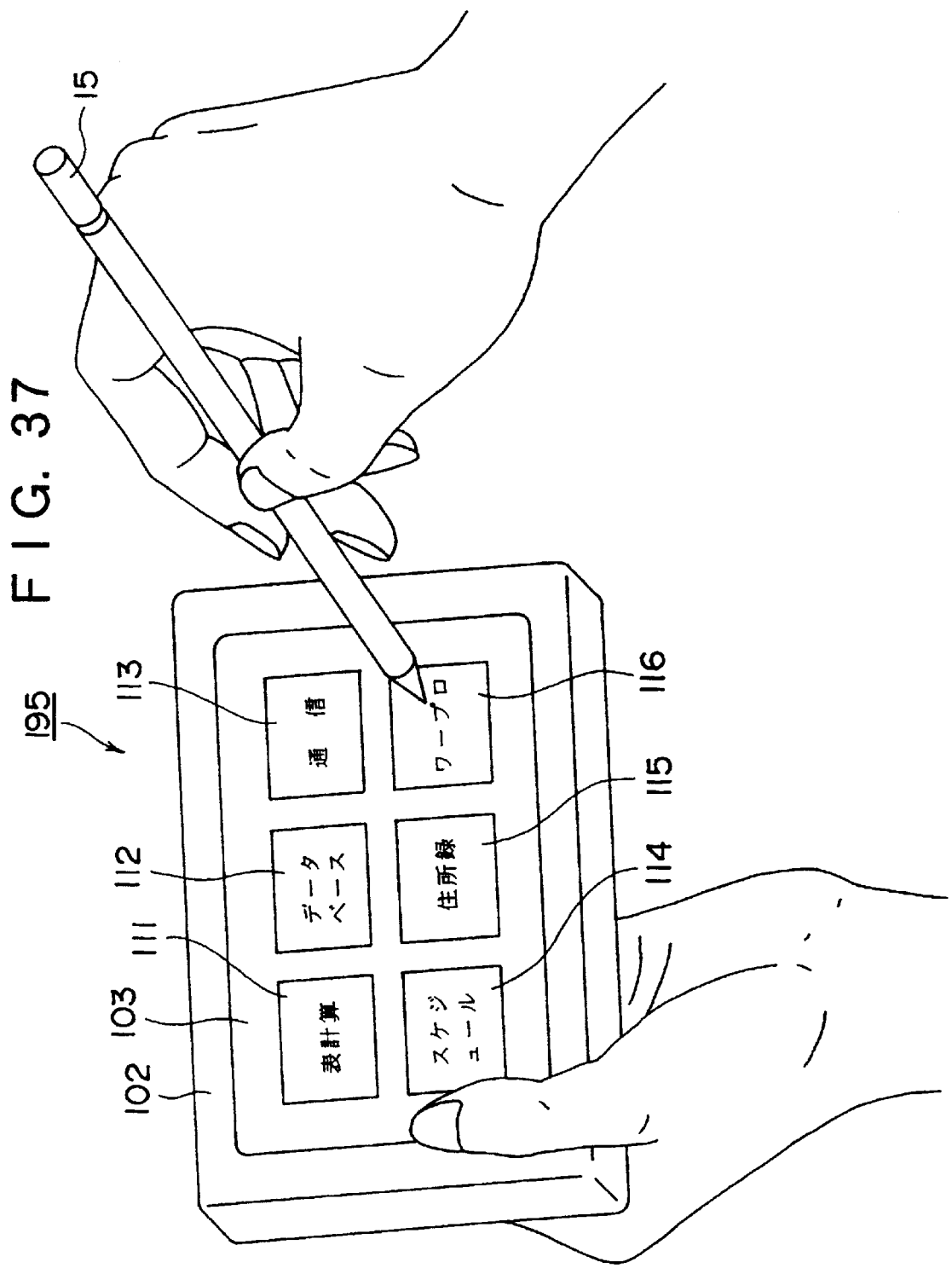
FIG. 37 is a perspective view showing the screen touch input unit of the sixth embodiment according to the present invention.

More specifically, as shown in FIG. 37, on a liquid crystal display 103 provided on a main body 102 of a screen display key input unit 195 according to the embodiment, icons 111 to 116 for initiating respective applications are displayed. The number of icons and types of the applications started by the icons can be opportunely defined, but, in the embodiment, the six icons 111 to 116 for starting the application software of spreadsheet, database, communication, schedule, address book and word processor are defined.

Figure 38:
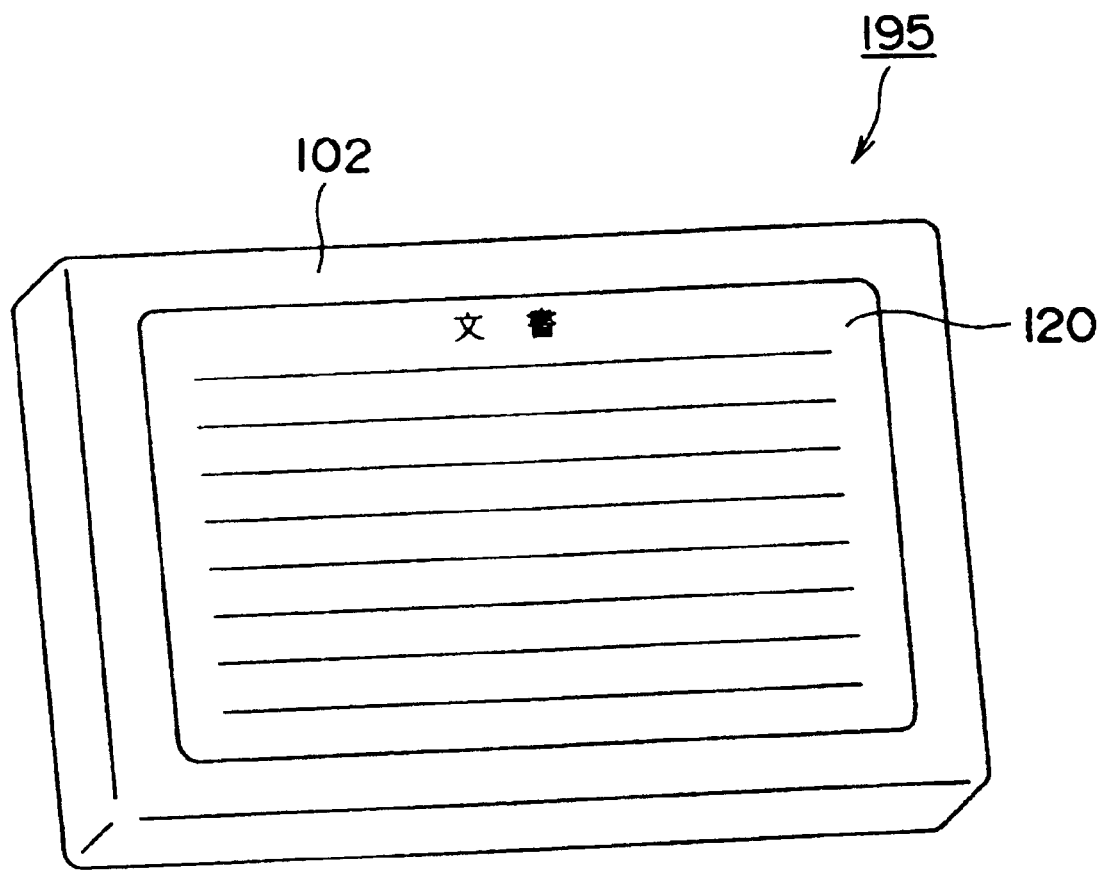
FIG. 38 is a perspective view showing an active application in the sixth embodiment.

Each of the applications are started by operating each of the icons 111 to 116 to start the application. For example, as shown in FIG. 38, a character input display 120 is displayed on the screen 103 by operating the icon 116 to initiate a word processor. It is advisable that the key input area 12 is shown with a pop-up manner to touch-input characters or the like, when a part of the screen 103 is touched.

Figure 39:
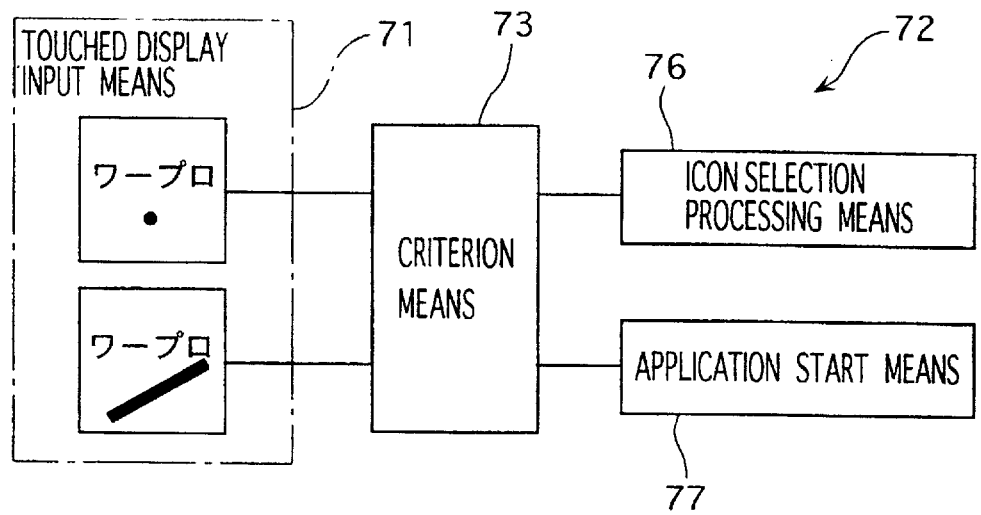
FIG. 39 is a block diagram showing an internal structure in the screen touch input unit of the sixth embodiment.
Figure 40:
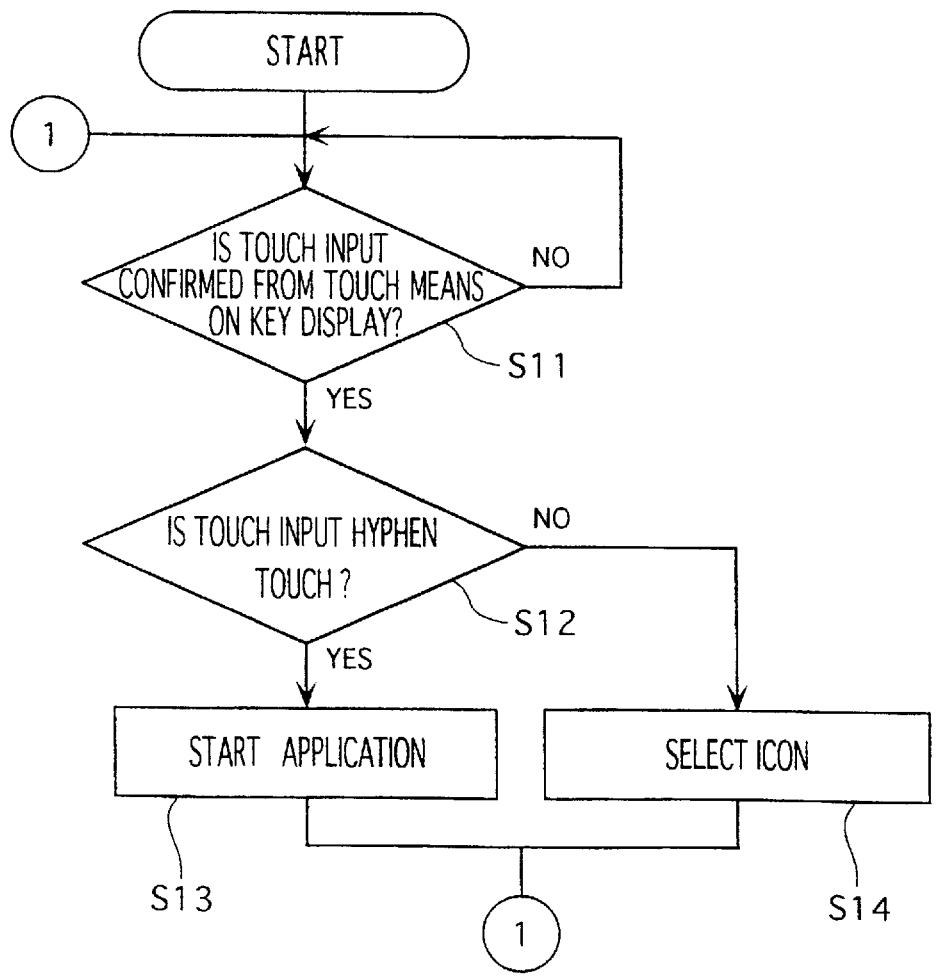
FIG. 40 is a flow chart showing procedure of the input operation for the screen touch input unit of the sixth embodiment.

As shown in FIG. 39 of a block diagram showing an internal structure and FIG. 40 of a flow chart actually carried out in the unit 195, the screen display key input unit 195 consists of a screen touch input means 71 and an information selection processing means 72. The information selection processing means 72 is, in turn, composed of the criterion means 73, an icon selection processing means 77 and an application start means 78.

The screen touch input means 71 senses a touch by the pen 15 within the screen 103, which is represented as a Step 11 in the drawing. A step will be simply replaced with "S" to shorten a sentence.

When being touched by the pen 15, the criterion means 73 determines whether the pen 15 shifts over a predetermined length with continuous touch to any of the icons 111 to 116 (=Hyphen touch) (S12). On the basis of the number of pixels shown in FIG. 7 or the length between the starting and ending points of the touch input shown in FIG. 8 like the first embodiment, the criterion means 73 determines whether or not the pen 15 moves longer than the predetermined length in any area of the icons 111 to 116 with the continuous touch.

Where the hyphen touch is confirmed, each start process of the applications is carried out (S13).

Where the hyphen touch is not confirmed, that is to say, the moving distance of the pen 15 is shorter than the predetermined length, a selection of the icons 111 to 116 is carried out (S14). The selected icon from the icons 111 to 116 is to be the focus of the process to be carried out with the start process by the predetermined enter key or to be deleted by the delete key.

According to the embodiment, the start process and the selection process of the icon are appropriately used by a double click and a single click of the mouse conventionally, but can be practiced in the touch input with the pen 15. Therefore, the screen display key input unit 195 can be structured to have an operation system and a menu system, like a system using the mouse, resulting in the enhanced operability and the improved portability of various applications.

Furthermore, the conventional double clicking operation of the mouse is not always easy for a beginner. In the embodiment, however, the input is carried out by only touching a point with the pen 15 or moving the pen 15 for the predetermined length, so that even the beginner can easily practice the operation, resulting in the further improved operability.

Incidentally, in the sixth embodiment, the start process of the icon is carried out based on the moving distance of the touch input with the pen 15, but can be carried out based on the time of continuously touching with the pen 15 in the same way as the fifth embodiment.

In the sixth embodiment, the selection process of the icons 111 to 116 is carried out in the normal input, but the other processes may be defined, for example, the selection process can be carried out by showing a list of the files processed latest by the used application.

Figures 41, 42:
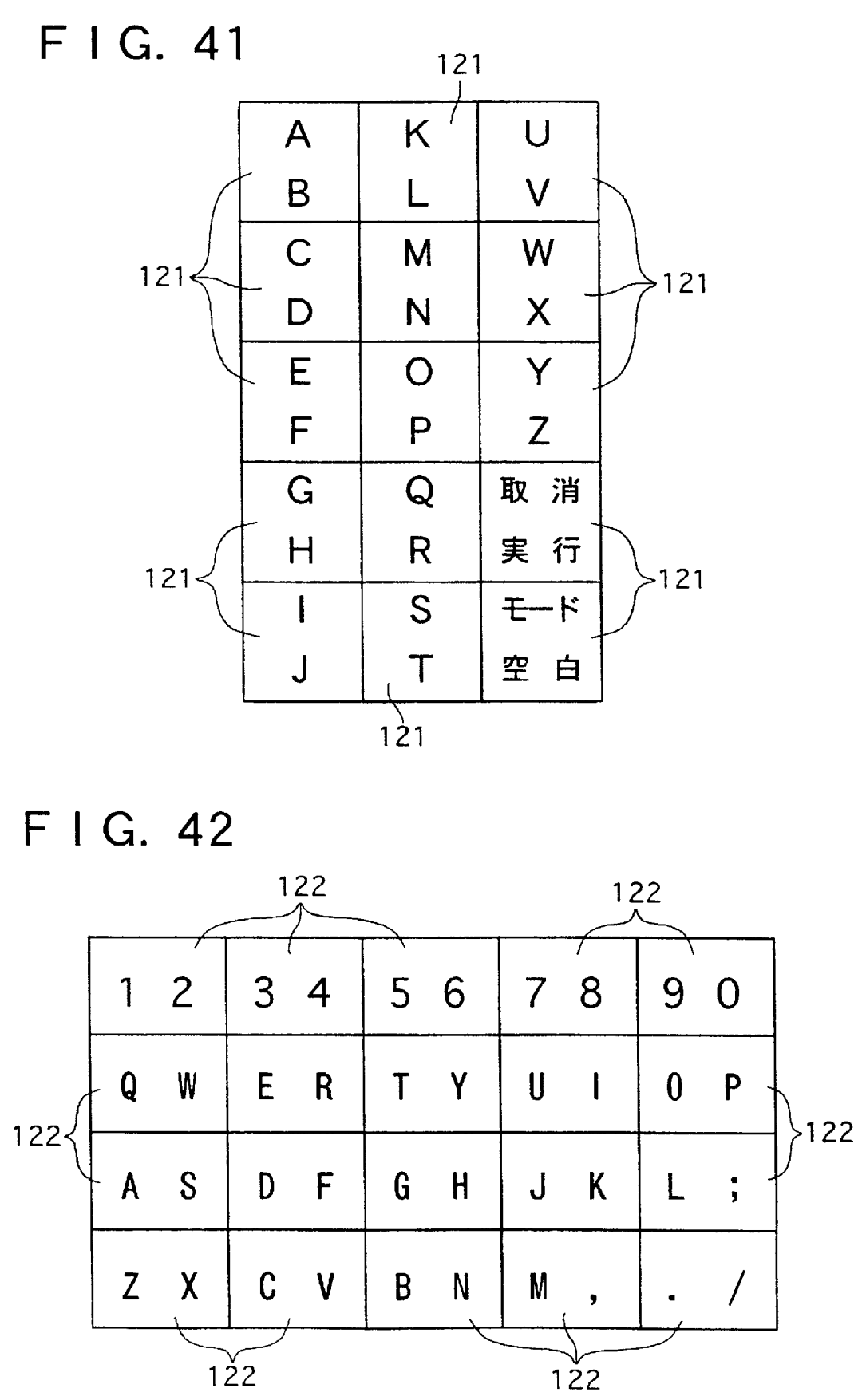

And further, the key arrangement used for touch-inputting the characters or the like is not limited to the aforementioned arrangements, and, for example, as shown in FIG. 41, two alphabets may be arranged on every one of keys 121 in alphabetical order to be respectively shown at the top half-area and the bottom half-area, and as shown in FIG. 42, two characters may be arranged on every one of the keys 121 in order based on the QWERTY arrangement to be respectively shown at the right and left half-areas.

The seventh embodiment according to the present invention will be explained below. In the embodiment, a screen display key input unit 201 is accompanied with a key board 214A, in which a key input as well as the touch input can be carried out.

Figure 43:
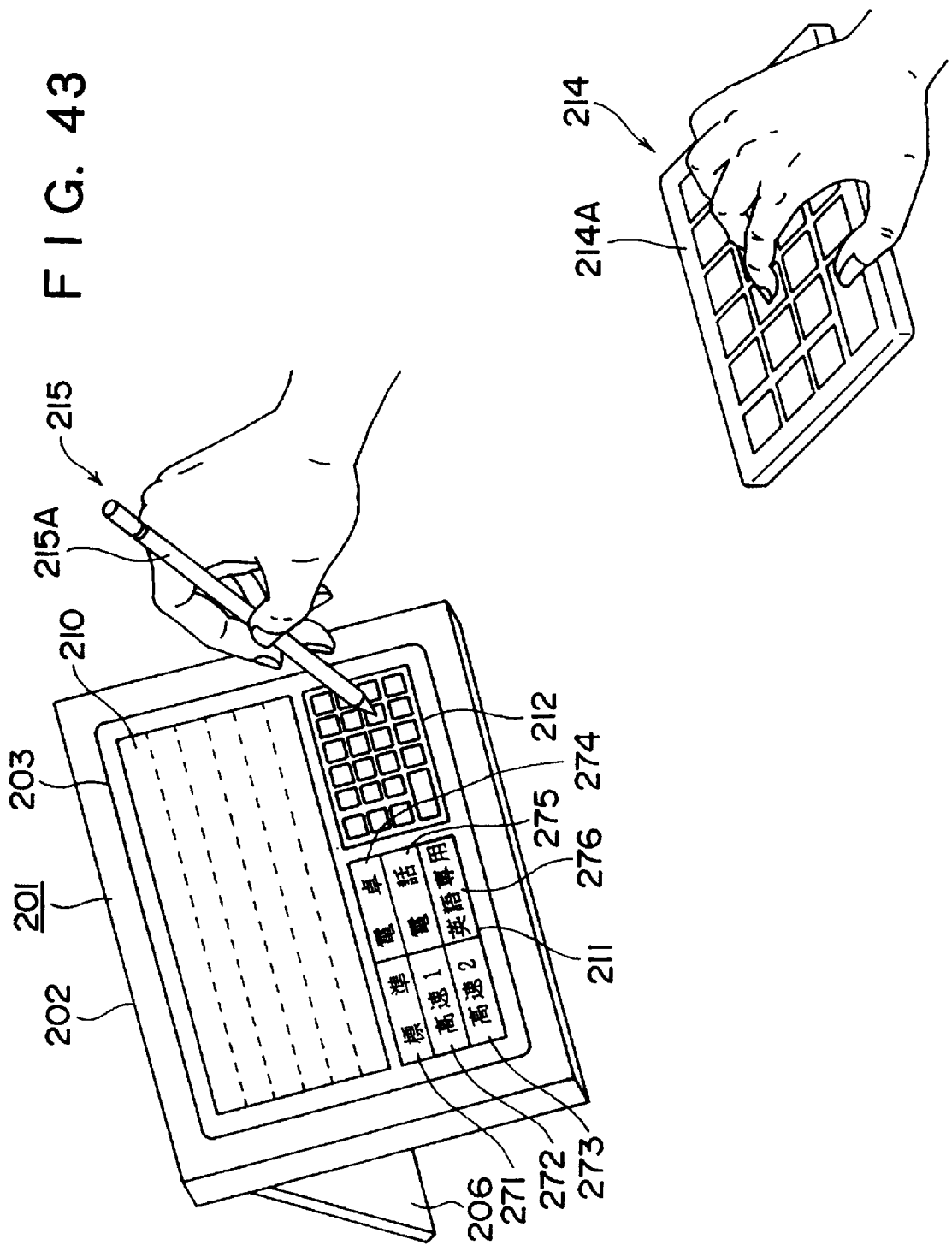
FIG. 43 is a perspective view showing the screen display key input unit of the seventh embodiment according to the present invention.

FIG. 43 shows the screen display key input unit 201 according to the embodiment. The screen display key input unit 201 has a main body 202 provided with a liquid crystal display 203 to be also used as the portable remote terminal (PDA). On the back face of the main body 202, a support plate 206 is attached in order to stand the main body 202 for using. The display 203 may be protected by a cover pivotally move with reference to the main body 202.

The liquid crystal display 203 has a data display area 210 to input characters and display data when the screen display key input unit 201 is used to operate word processor, spreadsheet, address book, electric mail or schedule function. The actual graphic format in the data display area 210 may be arranged based on the function in operation.

A key input area 212 as a key display area is provided under the data display area 210. And, there is a menu area 211 displaying a selection menu, shown with the pop-up manner when a menu key (will be touched upon below) is pushed, adjacent to the left side of the key input area 212.

The menu area 211 and the key input area 212 may be displayed all the time. But, it is advisable in view of the display of much information by enlarging the display area 210 that the display area 210 is normally displayed on the almost all of the liquid crystal display 203, but by touching a selection menu display key, a key starting input operation and so on shown on the screen, the menu area 211 and the key input area 212 are displayed on a part of the display area 210 with the pop-up manner as necessary.

Figure 44:
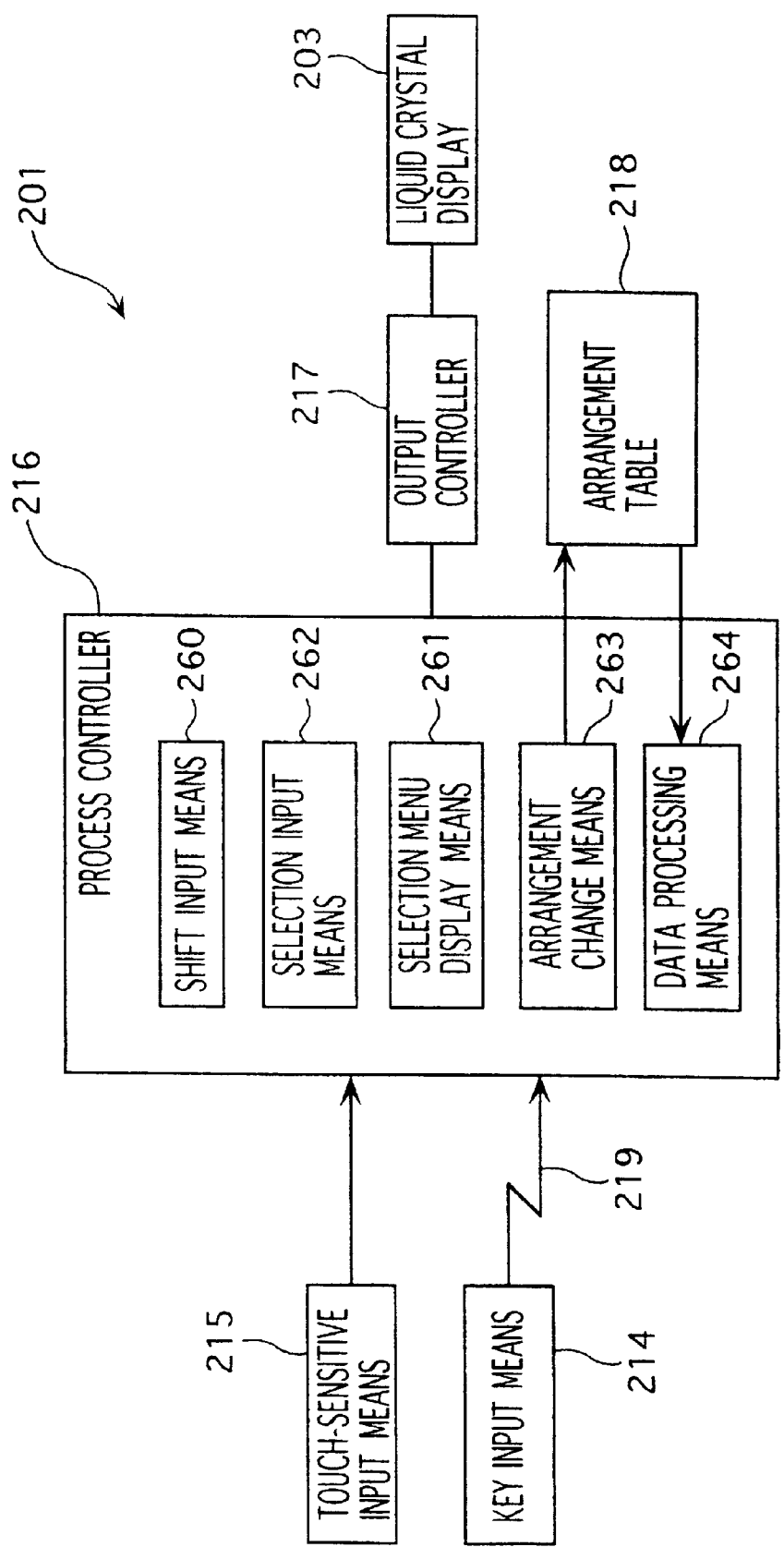
FIG. 44 is a block diagram showing an internal structure in the screen display key input unit of the seventh embodiment.

The screen display key input unit 201 has an internal structure as shown in FIG. 44. More specifically, the screen display key input unit 201 consists of a key input means 214 including the key board 214A, a touch input means 215 including a pen 215A, an output controller 217 controlling displaying outputs of a process controller 216 and the screen 203, and an arrangement table 218 storing data of the key arrangements.

As shown in FIG. 43, the key board 214A is a thin small card-sized key board, in which is accommodated in the main body 202 in non-use, but is used to separate from the main body 202 in use.

The key input means 214 sends information of the key input to the process controller 216 of the main body 202 by using a radio 219, such as radio waves, infrared rays or the like, when any key on the key board 214A is inputted.

The pen 215A may be held by a holder optionally provided to the main body 202, so that the pen 215A shall not be lost.

The actual operation of the screen display key input unit 201 is so carried out that the main body 202 is taken by the left hand or put on a table and the pen 215A is held by the right hand.

The touch input means 215 sends information of the key input to the process controller 216 when any key in the key input area 212 displayed on the liquid crystal display 203 is touched with the pen 215A.

The process controller 216 is provided with a shift input means 260 for inputting data of the shift position on each of the keys shown on the key board 214A or the key input area 212, an arrangement change means 263 for changing the arrangements of the keys shown on the key input area 212, a data processing means 264 for processing data of the inputted key, a selection input means 262 for inputting to select from data when two items of data are defined at the normal position or the shift position of each of the keys, and a selection menu display means 261 for displaying the selection menu for changing the aforementioned key arrangements.

Figure 45:
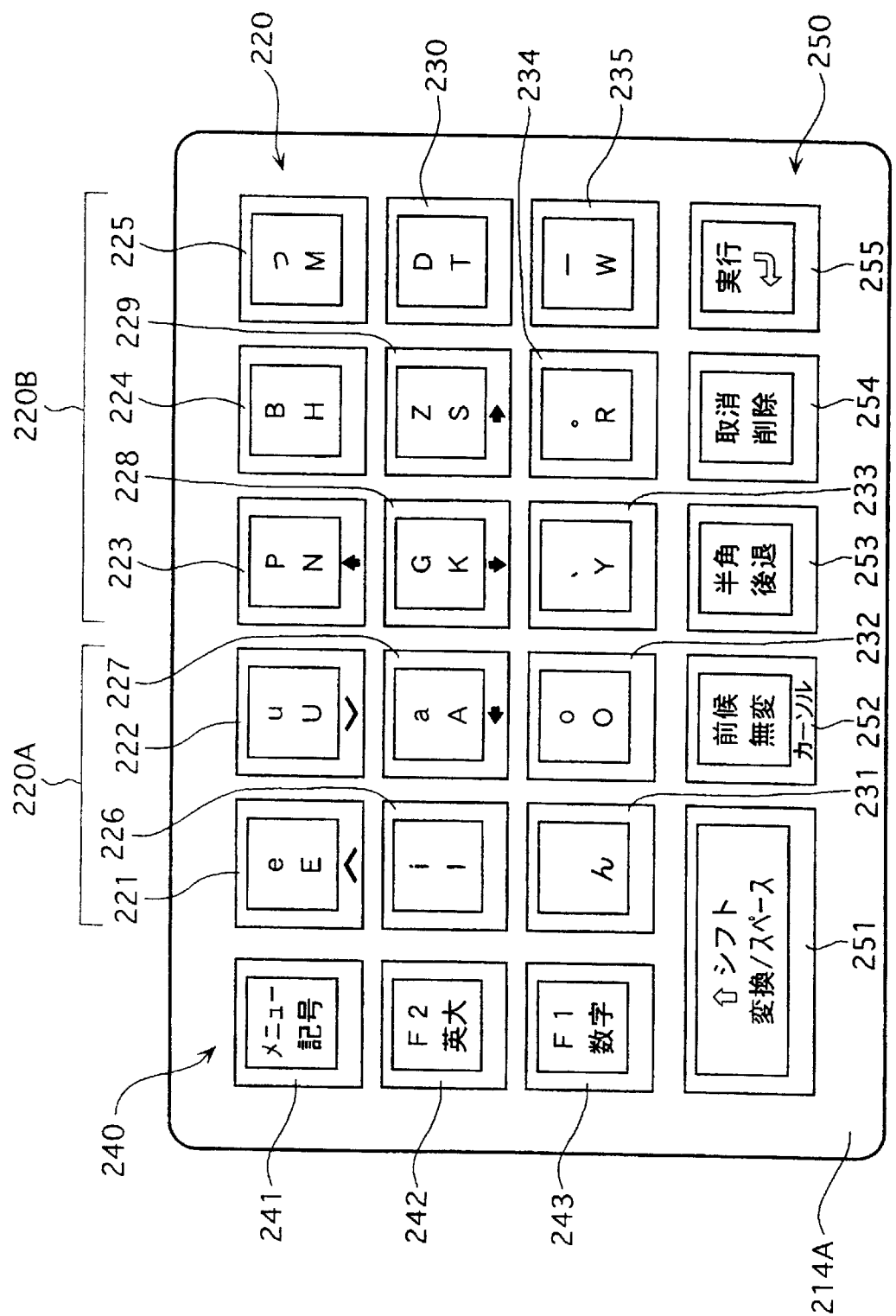
FIG. 45 is a plane view showing the key arrangement of a keyboard of the screen display key input unit of the seventh embodiment.

As shown in FIG. 45, the key board 214 A is provided with a main key area 220, a change key area 240 and a function key area 250, which are arranged the same as the key input area 212 on the screen 203.

More specifically, in the main key area 220, fifteen main keys 221 to 235 are arranged in three ranks lengthwise and five files breadthwise. In the change key area 240, three change keys 241 to 243 are arranged. Further, in the function key area 250, five function keys 251 to 255 are arranged. Therefore, on the key board 214A, 23 keys including the change keys 241 to 243 and the function keys 251 to 255 are arranged in four ranks.

Each of the keys corresponding to the standard arrangement of the aforementioned embodiment shown in FIG. 23 is shown on each surface of the aforementioned keys.

Figure 46:
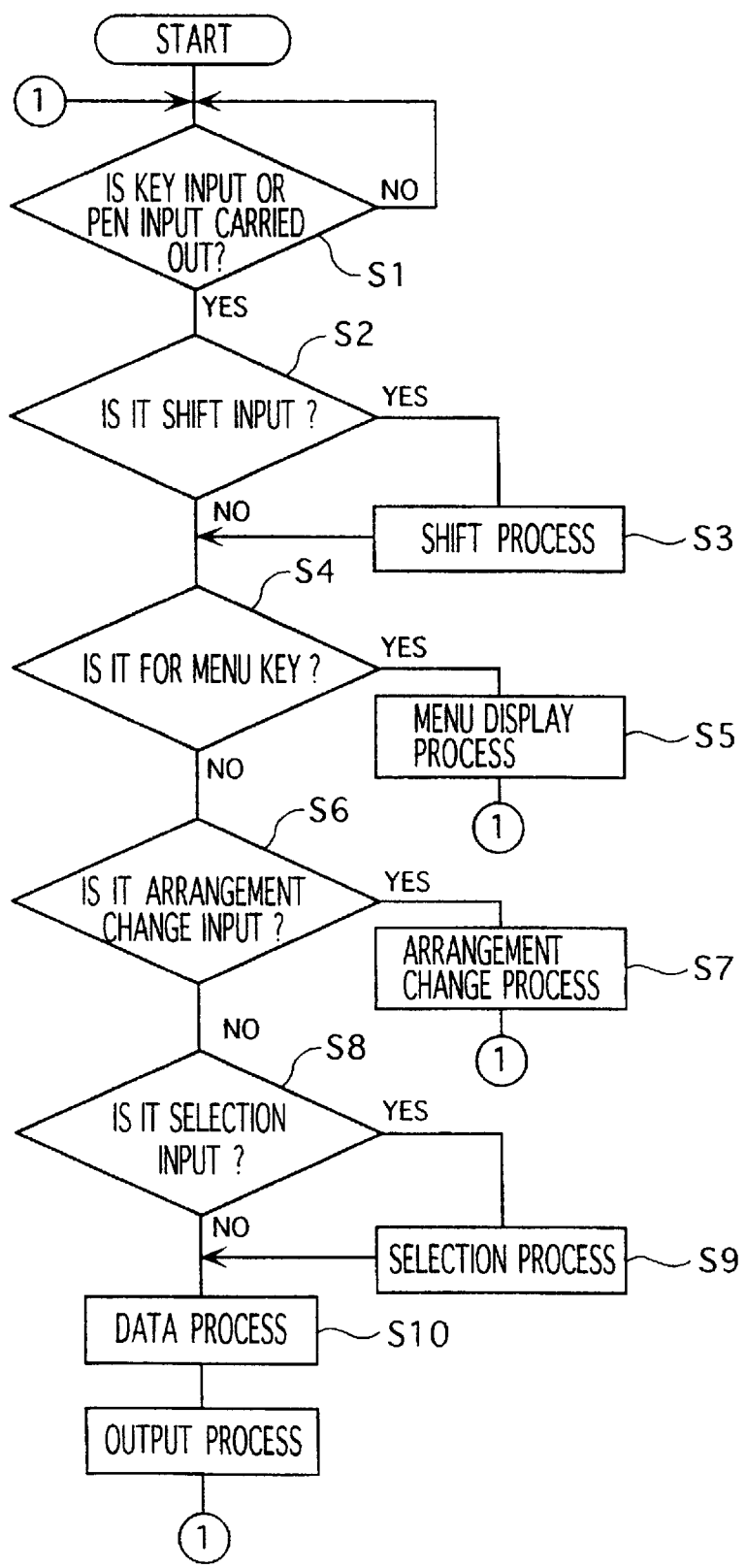
FIG. 46 is a flow chart showing procedure of the input operation for the screen display key input unit of the seventh embodiment.

Procedures of processing in the screen display key input unit 210 structured as described thus far will be explained below with reference to a flow char shown in FIG. 46.

Firstly, the key input means 214 or the touch input means 215 senses the input with the key board 214A or the pen 215A, which is represented as a Step 1 in the drawing. A step will be simply replaced with "S" to shorten a sentence.

When the input is sensed, the input is determined whether the input is the shift input (the second graphic character code input) or not (S2). The determination may be carried out in the key input means 214 or the touch input means 215 or in the side of the process controller 216.

In the key input, the shift input is determined whether the shift key 251 is pushed together with another key at the same time or not. In the touch input, the shift input is determined based on the degree the pen 215A is moved or a touching period of time in the same way as the aforementioned embodiment.

Provided that the shift input is confirmed, the shift input means 260 carries out a shift process under the decision that the shift position of the inputted key is inputted (S3).

The inputted key is determined whether or not it is a menu key (the shift position of the key corresponding to the key 241 on the key board 214A and the key 241 on the liquid crystal display 203) (S4). Provided that the menu key is inputted, the selection menu display means 261 performs a menu display process showing selection menu keys 271 to 276 in the menu area 211 (S5).

Provide that the menu key is not inputted, the input is determined whether the arrangement change input, namely any key of the keys 241 to 243 of the change key area 240 is inputted or any key of the selection menu keys 271 to 276 is inputted with the touch input (S6).

Provided that the arrangement change input is confirmed, the arrangement change means 263 performs the arrangement change process changing the arrangement table 218 to show a designated key arrangement (S7).

Provided that the arrangement change input is not confirmed, the selection input is evaluated (S8). Provided that the selection input is confirmed, the selection process selecting one of the designated keys (S9).

When the inputted key is defined, the data processing means 264 performs the data process generating a character allocated the defined key or performing each of the functions (S10). Here, the data processing means 264 performs the data process based on the character or the function corresponding to the inputted key in the defined key arrangement with reference to the arrangement table 218. Incidentally, initialization of the key arrangement is the standard arrangement.

The results of the data process is outputted onto the liquid crystal display 203 by the output controller 217 (S11).

A whole process by one input is carried out as aforementioned and subsequent inputs are done in the same way.

In the embodiment as described thus far, the same effects as the aforementioned embodiments can be obtained. And furthermore, the key board 214A is provided in addition to the touch input means 215 using the pen 215A, so that an operator can appropriately select from the input manners, resulting in the improved operability.

The key board 214A is provided to detach from the main body 202, and the key information, showing which of the keys is inputted, can be sent to the process controller 216 by using radio, so that the key board 214A can be operated to separate from the main body 202. Especially, when some persons simultaneously watch the display 203, every person can easily watch the display 203 without the operator in their way.

Figure 47:
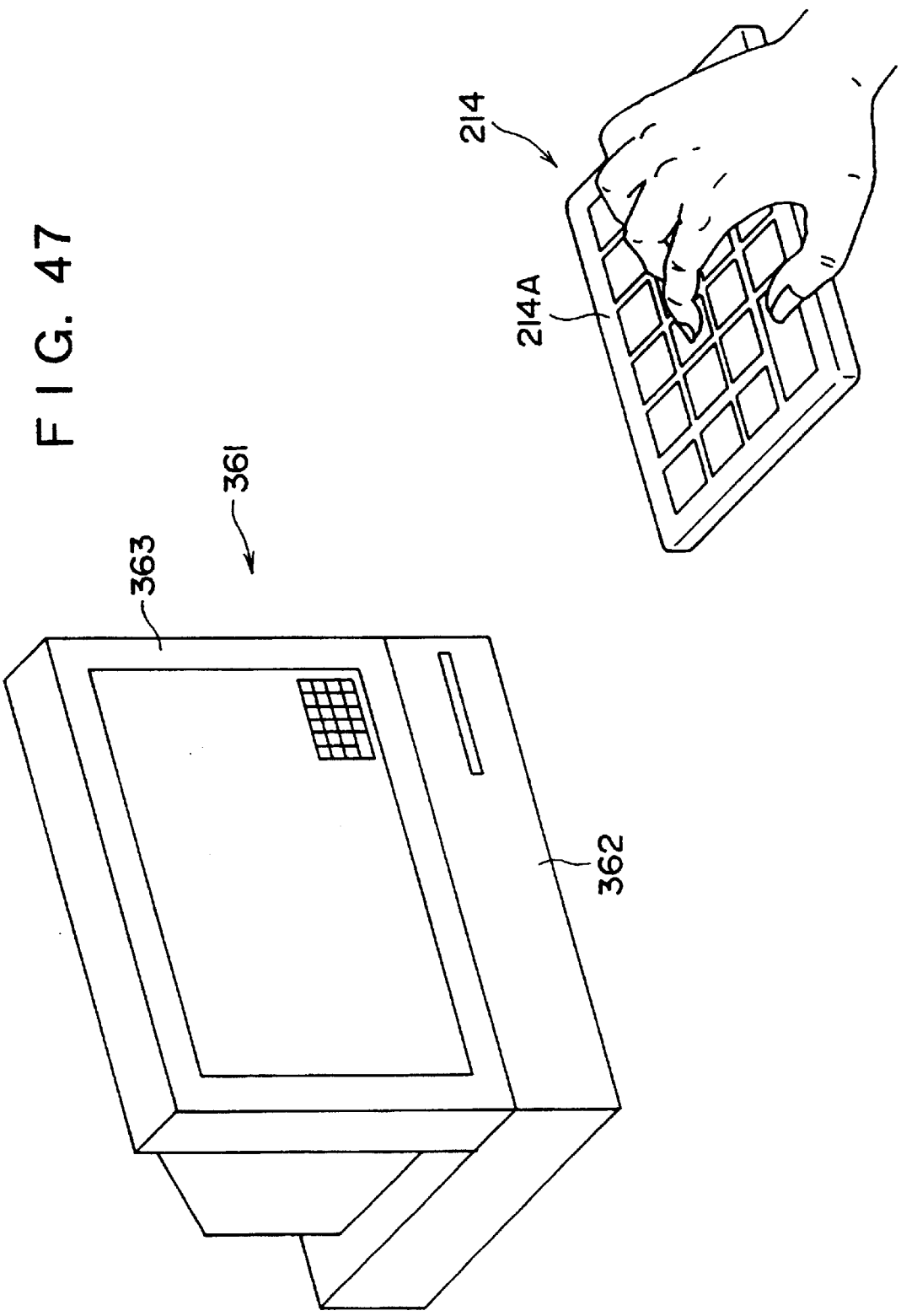
FIG. 47 is a perspective view showing another embodiment of the screen display key input unit.
Figure 48:
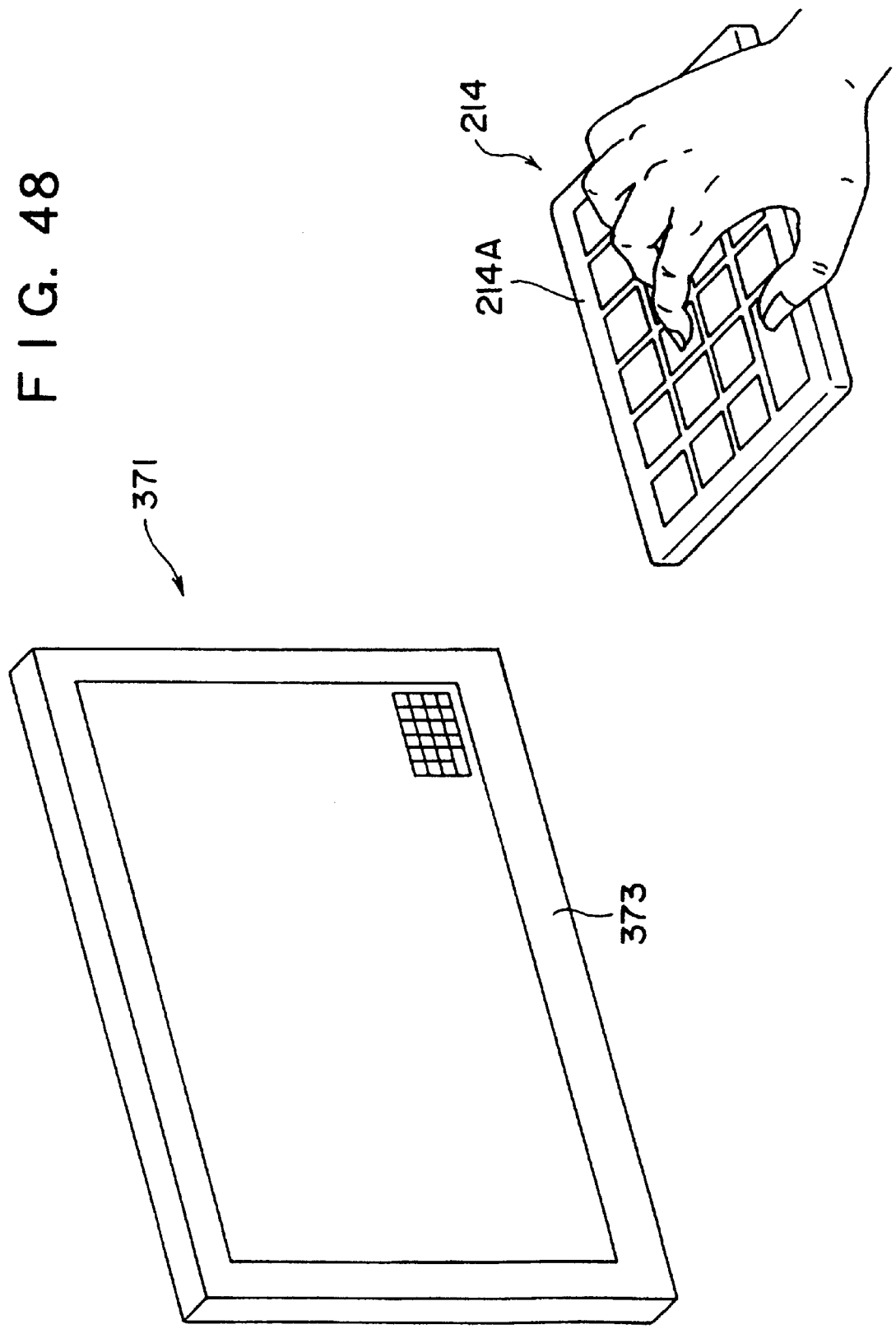
FIG. 48 is a perspective view showing still another embodiment of the screen display key input unit.

The key board 214A is structured to be accommodated in the main body 202, so that the key board 214A is accommodated in the carrying of the screen display key input unit 210 and can be taken out from the main body 202 in the operating, resulting in the outstanding screen display key input unit 201 in the operability and portability.

Where the key board 214A is optionally used, it is not limited to be used for the screen display key input unit 201 for the portable remote terminal (PDA). The key board 214A can be used for a desktop screen display key input unit 361, as shown in FIG. 47, including a main body 362 and a display 363, and can be for a screen display key input unit 371, as shown in FIG. 48, including a display device 373, such as a wall-mounted television or the like. In this case, when a channel arrangement, arranged on the keys with channels of the television, is defined in one of the key arrangements shown on the display device 373, a channel changing operation can be carried out on the key board 214A.

Where the key board 214A is combinedly used, a character inputted when any key of the keys 221 to 235 is pushed is displayed on the key input area 212 of the display 203, therefore, it is not needed to show characters on the key board 214A.

In the present invention, the arrangement of the character codes defined on the main keys 21 to 35 is not limited to the aforementioned embodiments, and can be appropriately defined in practice.

For example, FIG. 49 to FIG. 53 can be used as each key arrangement of Japanese, English, digit and symbol shown on the screen for the touch input.

Figure 49:
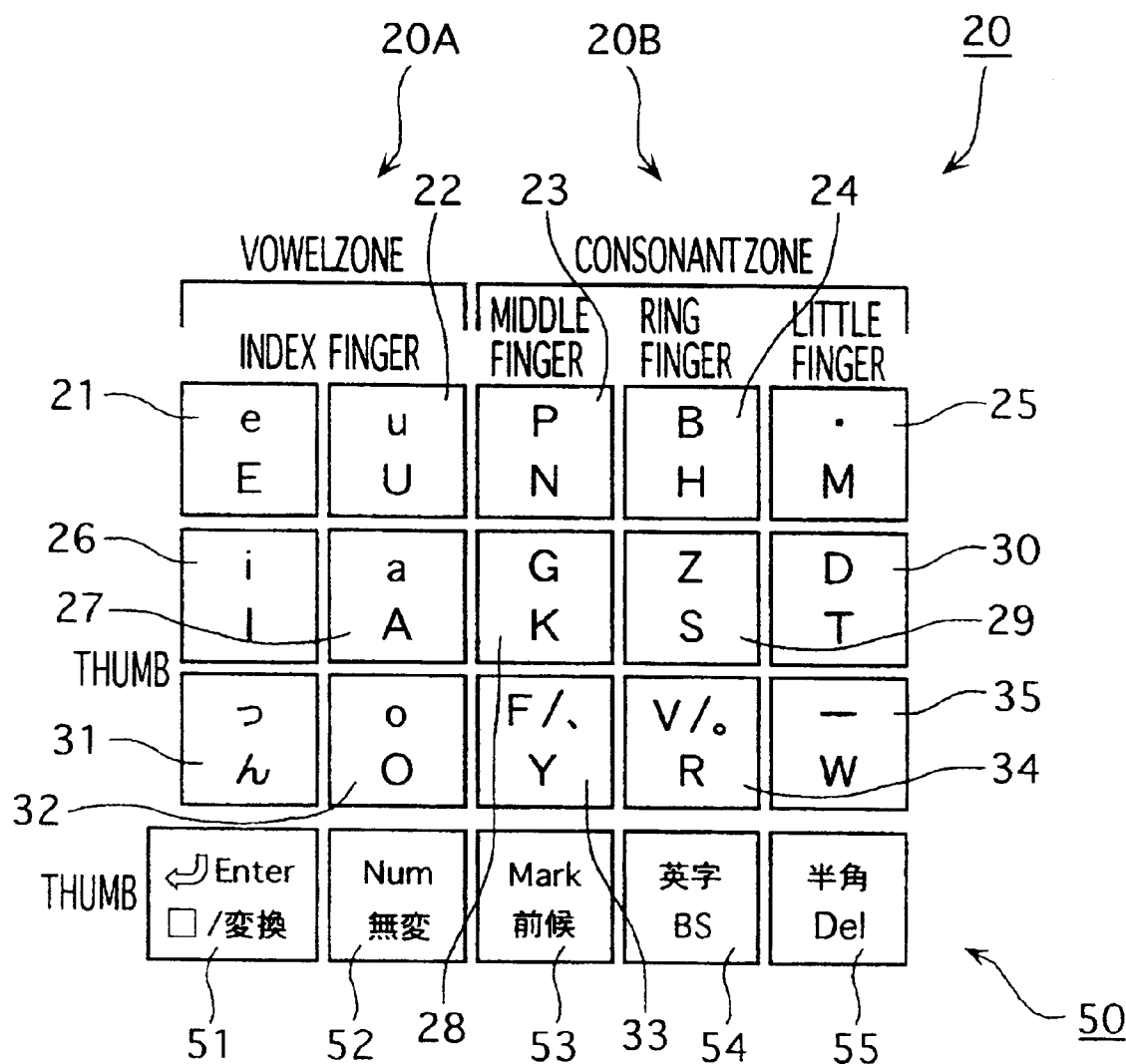
FIG. 49 is a plane view showing a Japanese input arrangement for the touch input.

Concretely, the main keys 21 to 35 of the Japanese key arrangement shown in FIG. 49 are arranged to basically correspond with the standard arrangement shown in FIG. 23. But, different points from the arrangement shown in FIG. 23 are that the shift positions (the second graphic character code) of the keys 21, 22, 26, 27, 31 and 32 of the vowel area 20A are respectively allocated characters "e, u, i, a, つ and o"; the shift position of the key 25 is allocated " • "; and the second shift positions (the third graphic character code) of the key 33 and 34 are allocated letters "F" and "V".

The support key (function key) area 50 is provided with five keys of: a key 51 having an enter (return) function, a kana-kanji conversion function and a space input function; a key 52 having a kana-kanji conversion function and a function for changing to a "Num (digit)" arrangement; a key 53 having a function for selecting the last conversion candidate in the kana-kanji conversion and a function for changing to a "Mark (symbol)" arrangement; a key 54 having a back space input function and a function for changing to an English key arrangement; and a key 55 having a delete (DEL) function and a function for chancing to a half-sized character mode.

Figure 50:
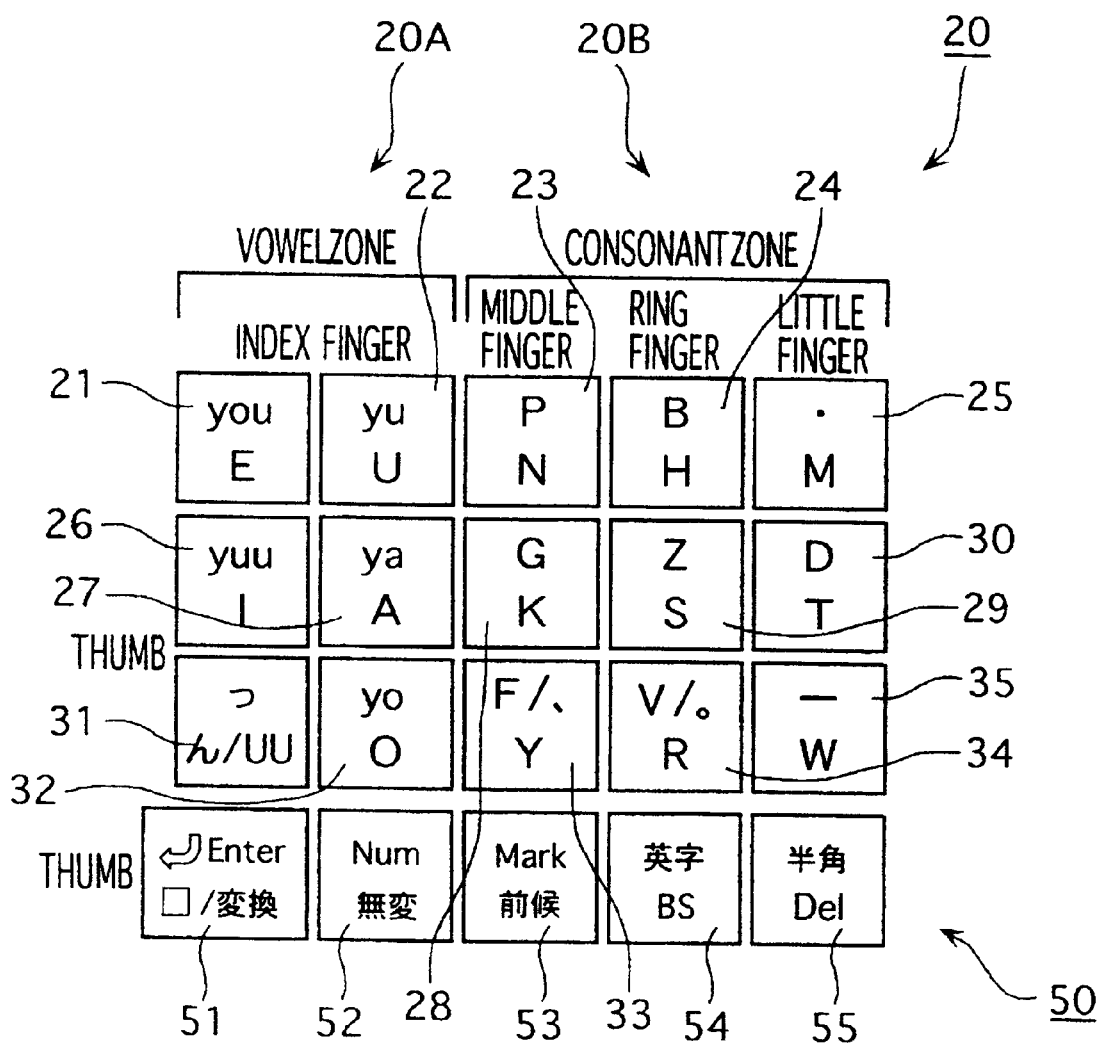
FIG. 50 is a plane view showing a Japanese high-speed arrangement for the touch input.

The main keys 21 to 35 of the Japanese high-speed arrangement shown in FIG. 50 are arranged to be basically corresponded to the high-speed arrangement shown in FIG. 28. But different points from the arrangement of FIG. 28 are that the shift positions (the second graphic character code) of the keys 21, 22, 26, 27, 31 and 32 in the vowel area 20A are respectively allocated characters "you, yu, yuu, ya, つ and yo"; the non-shift position of Li 4the key 31 is allocated letters "UU" as the third graphic character code; and the shift position of the key 25 is allocated a symbol " • ".

Figure 51:
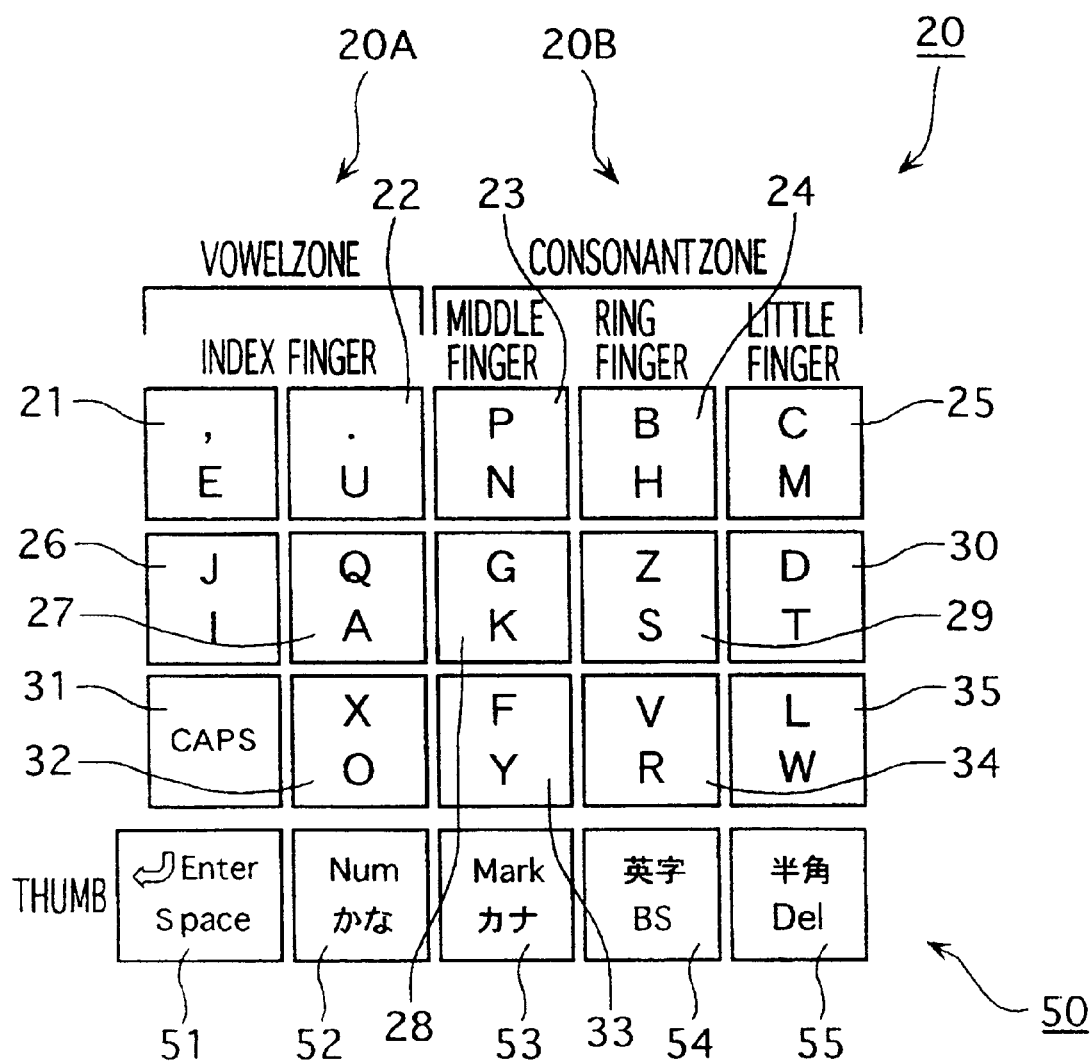
FIG. 51 is a plane view showing an English input arrangement for the touch input.

The main keys 21 to 35 of the English key arrangement shown in FIG. 51 are arranged to be basically corresponded to the arrangement shown in FIG. 25. But different points from the arrangement of FIG. 25 are that the shift positions (the second graphic character code) of the keys 21, 22, 26, 27 and 32 in the vowel area 20 are respectively allocated a comma ",", a period ".", a letter "J" and letters "Q" and "X"; the key 31 is allocated a "CAPS" key; and the shift positions of the keys 25 and 35 are respectively allocated letters "C" and "L".

The support keys 51 to 55 are similar to the Japanese standard arrangement shown in FIG. 49, but different points are that a "space" key is defined on the key 51, a "カナ (kana)" function for returning to the Japanese standard arrangement is defined on the key 52, and "つ(kana)" function for changing into the katakana input is defined on the key 53.

Figure 52:
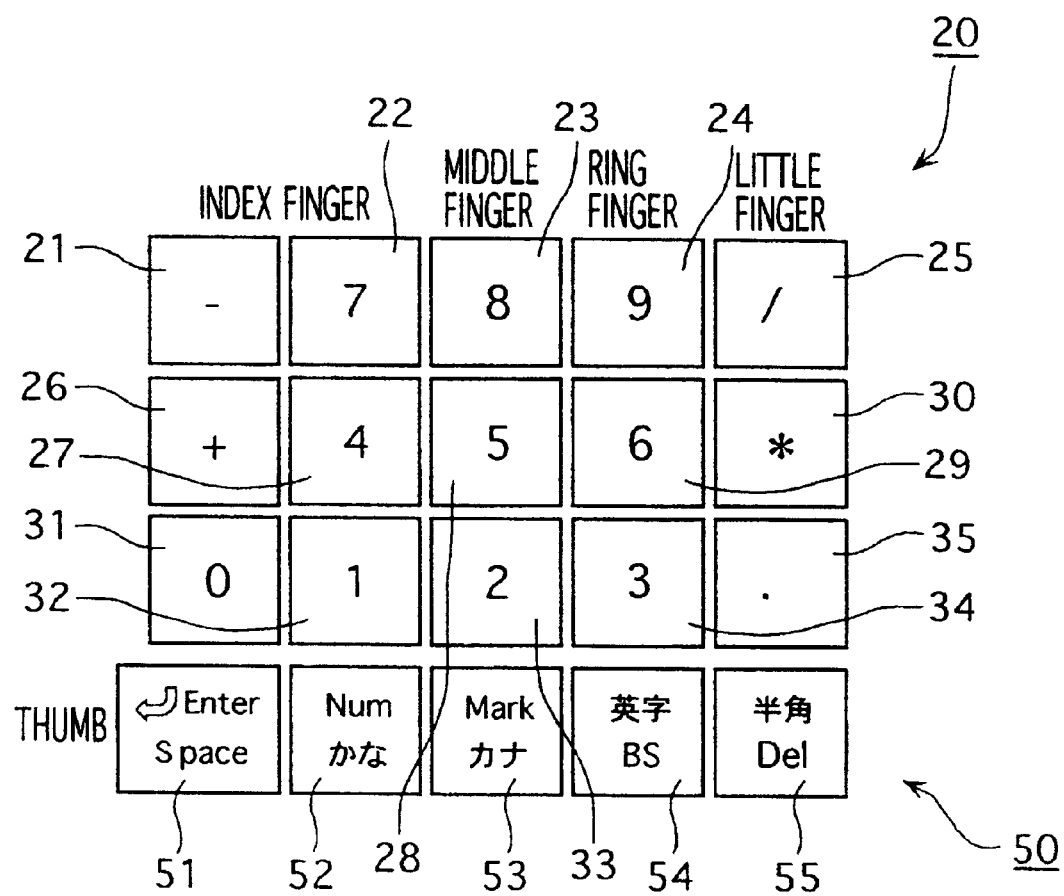
FIG. 52 is a plane view showing a digit input arrangement for the touch input.

In the digit key arrangement shown in FIG. 52, the keys for digits are arranged in the central three files of the main key area 20, the keys for arithmetic symbols are arranged in the leftmost file and the rightmost file. Concretely, the keys from the left to the right in the top rank of the main key area 20 are respectively allocated a symbol "−" on the key 21, a digit "7" on the key 22, a digit "8" on the key 23, a digit "9" on the key 24 and a symbol "/" on the key 25. The keys from the left in the middle rank are respectively allocated a symbol "+" on the key 26, a digit "4" on the key 27, a digit "5" on the key 28, a digit "6" on the key 29 and a colon symbol "*" on the key 30. Further, the keys from the left in the bottom rank are respectively allocated a digit "0" on the key 31, a digit "1" on the key 32, a digit "2" on the key 33, a digit "3" on the key 34 and a symbol "." on the key 35.

The support keys 51 to 55 are the same as the English key arrangement of FIG. 51.

Figure 53:
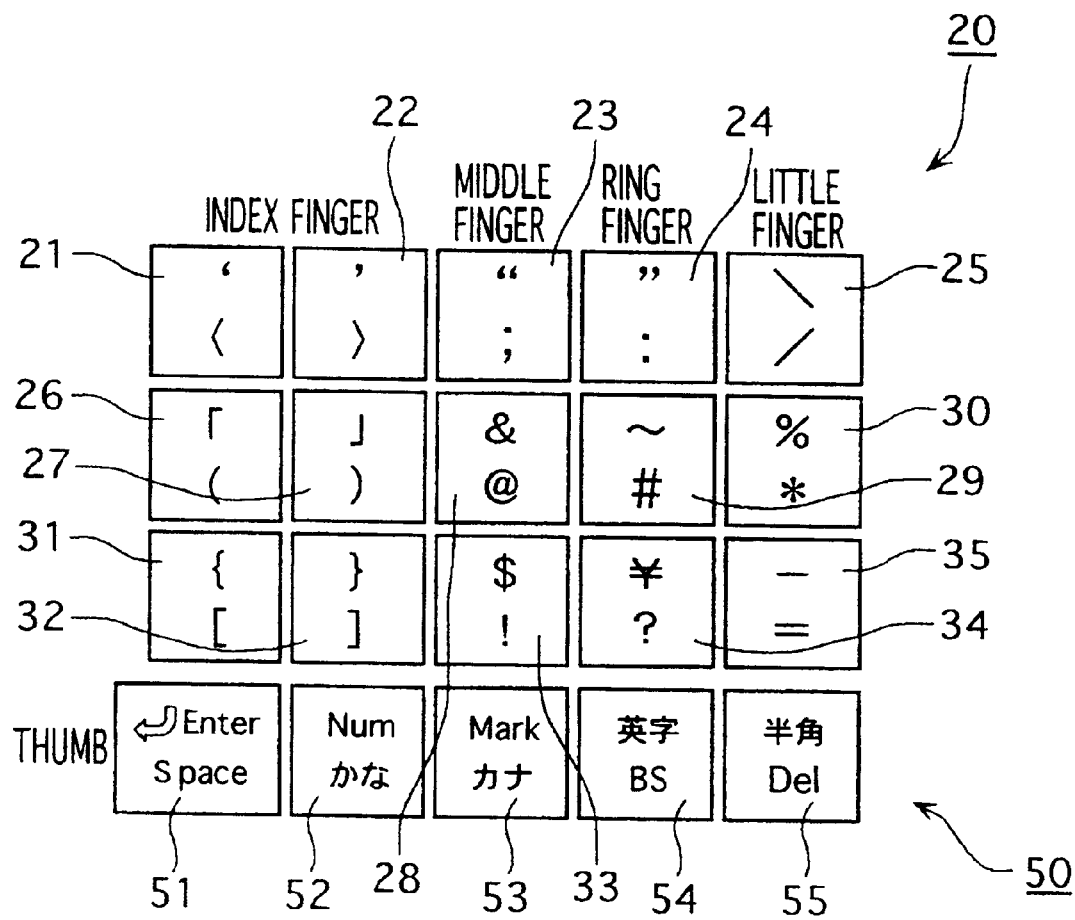
FIG. 53 is a plane view showing a symbol input arrangement for the touch input.

In the symbol key arrangement shown in FIG. 53, the keys for bracket symbols are arranged in the left two files of the main key area 20 and the keys for various symbols are arranged in the right three files. More specifically, the keys from the left to the right in the top rank of the main key area 20 are respectively allocated a bracket symbol "<" on the key 21, a bracket symbol ">" on the key 22, a semi-colon symbol ";" on the key 23, a colon symbol ":" on the key 24 and a symbol "/" on the key 25. The keys from the left in the middle rank are respectively allocated a bracket symbol "(" on the key 26, a bracket symbol ")" on the key 27, a qualifying symbol "@" on the key 28, a sharp symbol "#" on the key 29 and an asterisk symbol "*" on the key 30. Further, the keys from the left in the bottom rank are respectively allocated a bracket symbol "[" on the key 31, a bracket symbol "]" on the key 32, a qualifying symbol "!" on the key 33, a question symbol "?" on the key 34 and a symbol "=" on the key 35. Incidentally, the other symbols shown in FIG. 53 are respectively defined on the shift position of the keys 21 to 35 (the second graphic character code).

Incidentally, the support keys 51 to 55 are the same as the English key arrangement of FIG. 51.

Figure 54:
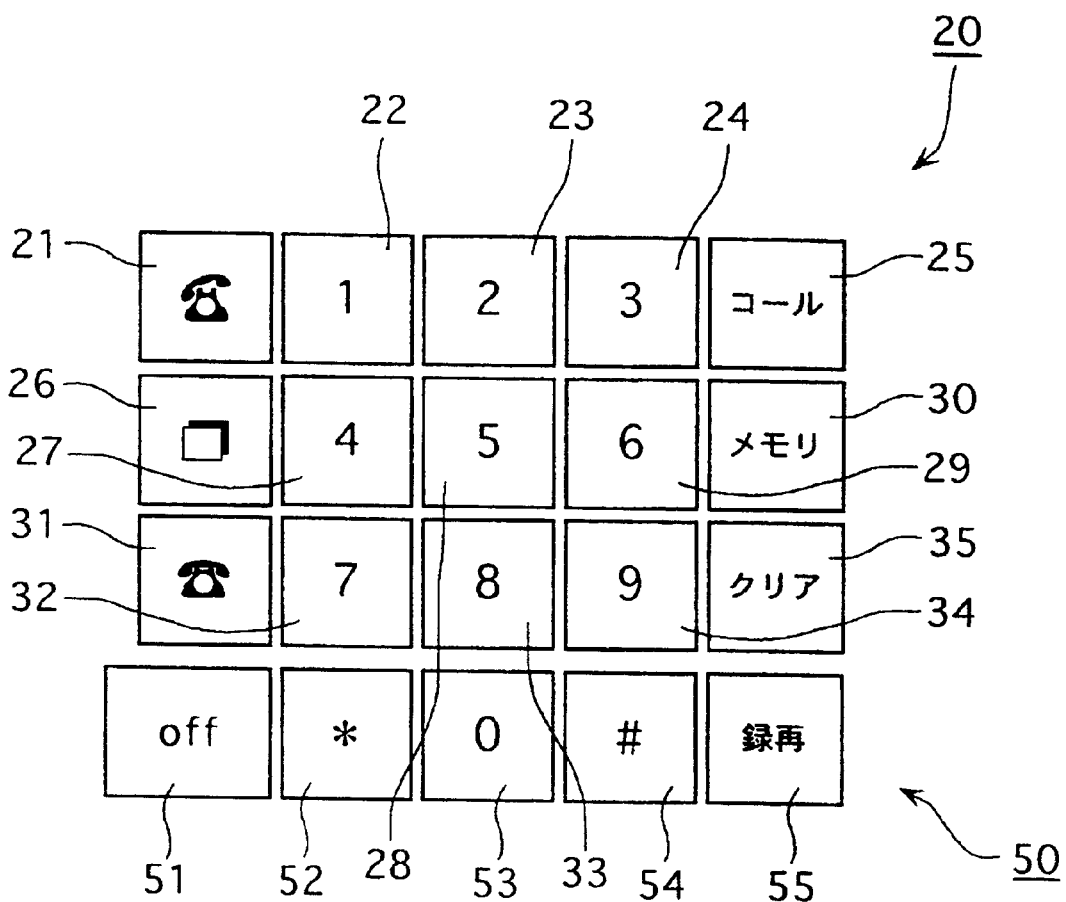
FIG. 54 is a plane view showing a telephonic arrangement for the touch input.

In the key arrangements shown in FIG. 49 to FIG. 53, the first and second graphic character codes can be inputted with two types of the touch input operation in the same way as the aforementioned embodiments.

Where a telephonic function is added to the screen display key input unit, as shown in FIG. 54, the key arrangement, defined with various keys suited for the telephonic function, is displayed, thereby the telephonic function may be used.

An aggregate of twenty keys of the main keys 21 to 35 and the support keys 51 to 55 are approximately the same as the number of buttons on a general telephone, so that the keys can be defined similar to the general telephone, resulting in the use like the general telephone.

Incidentally, in each of the aforementioned embodiments, for example, when characters are respectively defined on the right and left key areas of each of the keys 21 to 35, the left key area is settled as the first graphic character code and the right key area is settled as the second graphic character code, however, in contrast, the left key area may be settled as the second graphic character code and the right key area may be settled as the first graphic character code. Similarly, each non-shift position (the lower side) of the keys 21 to 35 is settled as the first graphic character code and each shift position (the upper side) is settled as the second graphic character code, however, in contrast, the non-shift position can be settled as the second graphic character code and the shift position can be settled as the first graphic character code.

As described thus far, the screen display key input unit according to the present invention is useful as an input unit in various information processors, in which being suitable for the use for the input unit incorporated into a compact information processor, such as various portable personal computers, an electric notebook, a portable remote terminal (PDA) and so on.

What is claimed is:

1. A screen display key input unit for selecting and inputting keys displayed on a screen, comprising:

keys displayed on the screen and being allocated at least first and second graphic character codes generating characters, digits and symbols;

key input means for designating each key area showing said respective keys; and selection processing means for outputting either the first or second graphic character code based on a decision where said key input means designates within the key area, wherein said key input means is touch-sensitive input means for touching the respective key area shown on the screen and said selection processing means includes criterion means for deciding whether said touch-sensitive input means shifts over a predetermined length with a continuous touch to the key areas irrespective of movement direction thereof and character generations means for outputting the first graphic character code allocated to the key when the criterion means decides that a moving distance of said touch-sensitive input is shorter than the predetermined length and outputting the second graphic character code allocated to the key when the criterion means decides that said moving distance is longer than the predetermined length.

2. The screen display key input unit according to claim 1, wherein said key input means is touch-sensitive input means for touching the respective key area shown on the screen and wherein said selection processing means includes criterion means for deciding whether said touch-sensitive input means keeps touching to the key area for a predetermined period of time and character generation means for outputting the first graphic character code allocated to the key when the criterion means decides that a touching period of time of said touch-sensitive input means is shorter than the predetermined period of time and outputting the second graphic character code allocated to the key when the criterion means decides that a touching period of time of said touch-sensitive input means is longer than the predetermined period of time.

3. The screen display key input unit according to claim 1, wherein said key input means includes touch-sensitive input means for touching the respective key area shown on the screen and a push-button provided outside the screen and wherein said selection processing means has character generation means for outputting the first graphic character code allocated to the key when the key area is simply touched with said touch-sensitive input means without pressing the push-button and outputting the second graphic character code allocated to the key when the key area is touched with said touch-sensitive input means with pressing the push-button.

4. The screen display key input unit according to claim 1, wherein said touch-sensitive input means is pen input means including a touch pen for touching the respective key area shown on the screen.

5. The screen display key input unit according to claim 1, wherein said touch-sensitive input means is touch screen input means for touching the respective key area shown on the screen with fingers.

6. The screen display key input unit according to claim 1, wherein said key input means is pointer input means provided with at least first and second buttons thereon, having a pointer shown on and moved within the screen for touching the respective key area shown on the screen and wherein said selection processing means includes criterion means for deciding which button provided on said pointer input means is pressed when the pointer placed within the key area and character generation means for outputting the first graphic character code allocated to the key when the criterion means decides that the first button of said pointer input means is pressed and outputting the second graphic character code allocated to the key when the criterion means decides that the second button of said pointer input means is pressed.

7. The screen display key input unit according to claim 1, wherein said key input means is pointer input means provided with a button thereon, having a pointer shown on and moved within the screen for touching the respective key area shown on the screen and wherein said selection processing means includes criterion means for deciding whether the button of said pointer input means is pressed or pressed with dragging of said pointer input means and character generation means for outputting the first graphic character code allocated to the key when the criterion means decides that the button of said pointer input means is pressed and outputting the second graphic character code allocated to the key when the criterion means decides that the button of said pointer input means is pressed with dragging of said pointer input means.

8. The screen display key input unit according to claim 1, wherein said key input means is pointer input means provided with a button thereon, having a pointer shown on and moved within the screen for touching the respective key area shown on the screen and wherein said selection processing means includes criterion means for judging the number of button pressing times within a predetermined period of time and character generation means for outputting the first graphic character code allocated to the key when the criterion means decides that the number of button pressing times is once and outputting the second graphic character code allocated to the key when the criterion means decides that the number of button pressing times is twice.

9. The screen display key input unit according to claim 1, wherein the screen is shown thereon with fifteen main keys to be arranged in 3 ranks lengthwise and 5 files breadthwise, and wherein each of the main keys is shown with is characters, symbols corresponding to at least the first and second graphic character codes.

10. The screen display key input unit according to claim 9, wherein the six main keys, arranged in the two files relative to any one of the right and left sides in a main key area provided with said fifteen main keys, are respectively allocated vowel keys for inputting letters "A", "I", "U", "E" and "O", showing vowel sounds of Japanese, and a syllabic nasal key for inputting a character "ん" of the syllabic nasal;

wherein the nine main keys, arranged in the other three files of the main key area, are respectively allocated consonant keys for inputting letters "K", "S", "T", "N", "H", "M", "Y", "R" and "W"; and wherein the keys, allocated letters "K", "S", "T", "N" and "H", are respectively allocated to input letters "G", "Z", "D", "P" and "B" in a shift state.

11. The screen display key input unit according to claim 9, wherein the five main keys of the six main keys, arranged in the two files relative to any one of the right and left sides in a main key area provided with said fifteen main keys, are respectively allocated letters "A", "I", "U", "E" and "O";

wherein the nine keys, arranged in the other three files in the main key area, are respectively allocated to input letters "K", "S", "T", "N", "H", "M", "Y", "R" and "W";

wherein the respective keys, allocated letters "A", "I", "U", "E" and "O", are allocated a letter "Q", a letter "J", a comma ",", a period "." and a letter "X" in a shift state; and wherein the respective keys, allocated letters "K", "S", "T", "N", "H", "M", "Y", "R" and "W", are allocated to input letters "G", "Z", "D", "P", "B", "C", "F", "V" and "L" in a shift state.

12. The screen display key input unit according to claim 9, wherein said fifteen main keys are respectively allocated to input a digit "0", a digit "1", a digit "2", a digit "3", a digit "4", a digit "5", a digit "6", a digit "7", a digit "8", a digit "9", symbol "+", a symbol "−", a symbol "×" or "*" a symbol "÷" or "/" and a symbol ".".

13. The screen display key input unit according to claim 9, wherein said fifteen main keys are respectively allocated to input, as the first and second graphic character codes, bracket symbols "[", "]", "(", ")", "<", ">", "[", "]", "{", "}", """, """, and """, a colon symbol ":", a semi-colon symbol ";", an asterisk symbol "*", a sharp symbol "#", an and symbol "&", a question symbol "?", a qualifying symbol "!", a symbol "/", a symbol "/", a symbol "~", a qualifying symbol "@", a dollar symbol "$", a yen symbol "¥", a hyphen "-", and a symbol "=".

14. The screen display key input unit according to claim 9,
wherein the six main keys, arranged in the two files relative to any one of the right and left sides in a main key area provided with said fifteen main keys, are respectively allocated vowel keys for inputting letters "A", "I", "U", "E" and "O", showing vowel sounds of Japanese, and a syllabic nasal key for inputting a character "ん" of the syllabic nasal;
wherein the nine keys, arranged in the other three files of the main key area, are respectively allocated consonant keys for inputting letters "K", "S", "T", "N", "H", "M", "Y", "R" and "W";
wherein the vowel keys allocated letters "A", "I", "U", "E" and "O", and a syllabic nasal key allocated a character "ん" are respectively allocated to input letters "AI", "UI", "UU", "EI", "OU", and "YUU" in a shift state; and
wherein the keys, allocated letters "K", "S", "T", "N", "H", "M", "Y", "R" and "W", are respectively allocated to input letters "G", "Z", "D", "P", and "B", a double consonant character "っ", one of Japanese Punctuation Mark "、", another Japanese Punctuation Mark "。" and a long vowel mark "—" in a shift state.

15. The screen display key input unit according to claim 9,
wherein said six main keys, arranged in the two fides relative to any one of the right and left sides in a main key area provided with said fifteen main keys, are respectively allocated vowel keys for inputting letters "A", "I", "U", "E" and "O", showing vowel sounds of Japanese, and a syllabic nasal key for inputting a character "ん" of the syllabic nasal;
wherein the nine keys, arranged in the other three files of the main key area, are respectively allocated consonant keys for inputting letters "K", "S", "T", "N", "H", "M", "Y", "R" and "W";
wherein the vowel keys allocated letters "A", "I", "U", "E" and "O", and a syllabic nasal key allocated a character "ん" are respectively allocated to input letters "ya", "yuu", "yu", "you" and "yo", and a double consonant character "っ" in a shift state; and
wherein the keys, allocated letters "K", "S", "T", "N", "H", "M", "Y", "R" and "W", are respectively allocated to input letters "G", "Z", "D", "P", and "B", a dot symbol ".", one of Japanese Punctuation Mark "、", another Japanese Punctuation Mark "。", and a long vowel mark "—" in a shift state.

16. The screen display key input unit according to claim 9, wherein at least one of said fifteen main keys is defined with the third graphic character code in addition to the other two graphic character codes, and wherein said selection processing means includes criterion means for determining which key selection operation of three types is carried out for selecting from the first to third graphic character codes inputted by said key input means, and character generation means for selecting and outputting any one of the first to third generated codes, defined on each of the keys, in response to the key selection operation determined by the criterion means.

17. The screen display key input unit according to claim 9, wherein at least one of said main keys is defined with the third graphic character code and the fourth graphic character code in addition to the other two graphic character codes, and wherein said selection processing means includes criterion means for determining which key selection operation of four types is carried out, and character generation means for selecting and outputting any one of the first to fourth generated codes, defined on each of the keys, in response to the key selection operation determined by the criterion means.

18. The screen display key input unit according to claim 9, wherein said main keys are respectively allocated to show letters "Q", "E", "T", "U", and "O" on each left half-area of the five keys from the left to the right in the top rank of said arranged fifteen main keys, letters "A", "D", "G", J7 , and "L" on each left half-area of five keys from the left to the right in the middle rank, and letters "Z", "C", "B", and "M" on each left half-area of four keys from the left to the right in the bottom rank, and wherein said keys, allocated to show "Q", "E", "T", "U", "O", "A", "D", "G", "J", "Z", "C" and "B" on the left half-areas thereof, are respectively allocated to show letters "W", "R", "Y", "I", "P", "S", "F", "H", "K", "X", "V" and "N" on the respective right hall-areas thereof.

19. The screen display key input unit according to claim 18, wherein the keys, allocated to show "L" and "M", are respectively allocated a long vowel mark "—|" and one of Japanese Punctuation Mark "、" on the right half-areas thereof, and wherein the key, arranged in the rightmost file of the bottom rank of said arranged main keys, is allocated to show another Japanese Punctuation Mark "。" on the left half-area thereof and a symbol on the right half-area thereof.

20. The screen display key input unit according to claim 18, wherein the keys, allocated to show "L" and "M", are respectively allocated a semi-colon symbol ";" and a comma symbol "," on the right half-areas thereof, and wherein the key, arranged in the rightmost file of the bottom rank of said arranged main keys, is allocated to show a period symbol "." on the left half-area thereof and a colon symbol ":" on the right half-area thereof.

21. The screen display key input unit according to any one of claim 1, further comprising arrangement change means for changing the arrangements of the generated graphic character codes when a character, a digit or a symbol and the key shown with the symbol, which are shown on the screen, is touched.

22. The screen display key input unit according to claim 1, further comprising a support key area provided in addition to a main key area, provided with fifteen keys arranged in 3 ranks lengthwise and 5 files breadthwise, to be provided therein with plural support keys, defined with various functions, adjacent to the main key area.

23. A screen display key input unit for selecting and inputting keys displayed on a screen comprising:
keys displayed on the screen and being allocated at least first and second graphic character codes generating characters digits and symbols;

key input means for designating each key area showing said respective keys; and selection processing means for outputting either the first or second graphic character code based on a decision where said key input means designates within the key area, wherein said key input means is touch-sensitive input means for touching the respective key area shown on the screen and said selection processing means includes criterion means for deciding whether said touch-sensitive input means pushes the key area under a predetermined pressure and character generations means for outputting the first graphic character code allocated to the key when the criterion means decides that a pressure degree applied by said touch-sensitive input means is lower than the predetermined pressure and outputting the second graphic character code allocated to the key when the criterion means decides that said pressure degree is higher than the predetermined pressure.

* * * * *